United States Patent [19]

Bokser

[11] Patent Number: 5,077,807

[45] Date of Patent: Dec. 31, 1991

[54] PREPROCESSING MEANS FOR USE IN A PATTERN CLASSIFICATION SYSTEM

[75] Inventor: Mindy R. Bokser, San Francisco, Calif.

[73] Assignee: Palantir Corp., Santa Clara, Calif.

[21] Appl. No.: 485,636

[22] Filed: Feb. 26, 1990

Related U.S. Application Data

[62] Division of Ser. No. 163,374, Apr. 25, 1988, which is a division of Ser. No. 786,035, Oct. 10, 1985, Pat. No. 4,773,099.

[51] Int. Cl.$^5$ .............................................. G06K 9/62
[52] U.S. Cl. .......................................... 382/14; 382/36
[58] Field of Search .................... 382/36, 14, 15, 37, 382/38, 34; 364/513

[56] References Cited

U.S. PATENT DOCUMENTS

| | | | |
|---|---|---|---|
| 3,601,811 | 8/1971 | Yoshino | 340/172.5 |
| 3,623,015 | 11/1971 | Schmitz | 340/172.5 |
| 3,638,196 | 1/1972 | Nishiyama | 340/172.5 |
| 3,810,162 | 5/1974 | Ewing | 340/172.5 |
| 3,950,733 | 4/1976 | Cooper | 340/172.5 |
| 4,044,243 | 8/1977 | Cooper | 235/152 |
| 4,254,474 | 3/1981 | Cooper | 364/900 |
| 4,319,331 | 3/1982 | Elbaum | 364/515 |
| 4,326,259 | 4/1982 | Cooper | 364/715 |
| 4,449,240 | 5/1984 | Yoshida | 382/15 |
| 4,451,929 | 5/1984 | Yoshida | 382/15 |
| 4,503,557 | 3/1985 | Maeda | 382/34 |
| 4,551,851 | 11/1985 | Kochert | 382/38 |
| 4,566,123 | 1/1986 | Yoshida | 382/15 |
| 4,589,142 | 5/1986 | Bednar | 382/37 |
| 4,611,347 | 9/1986 | Netravali | 382/27 |
| 4,618,988 | 10/1986 | Schiller | 382/5 |
| 4,670,848 | 6/1987 | Schramm | 382/15 |
| 4,682,365 | 7/1987 | Orita et al. | 382/14 |
| 4,760,604 | 7/1988 | Cooper et al. | 382/15 |

Primary Examiner—Leo H. Boudreau
Attorney, Agent, or Firm—Steven F. Caserza

[57] ABSTRACT

A method for preprocessing reference feature vectors representing patterns in order to form, for each selected pattern class, collections of regions. A hierarchy of possibility regions is formed, wherein all reference feature vectors of a pattern class are contained in each level of the hierarchy of possibility regions associated with the pattern class. This hierarchy is later used to exclude a pattern class from consideration if a feature vector representing an unknown pattern is not contained in some level of its associated hierarchy of possibility regions. A collection of certainty regions is used, wherein no reference feature vector not of a pattern classis contained within any certainty region associated with the pattern class. The certainty regions are later used to classify a feature vector representing an unknown pattern as belonging to a pattern class. A collection of confidence regions is used to identify, although not with certainty, an unknown input pattern, and assign a confidence value indicating the relative confidence associated with the possibility that this unknown input pattern belongs to the pattern class.

21 Claims, 33 Drawing Sheets

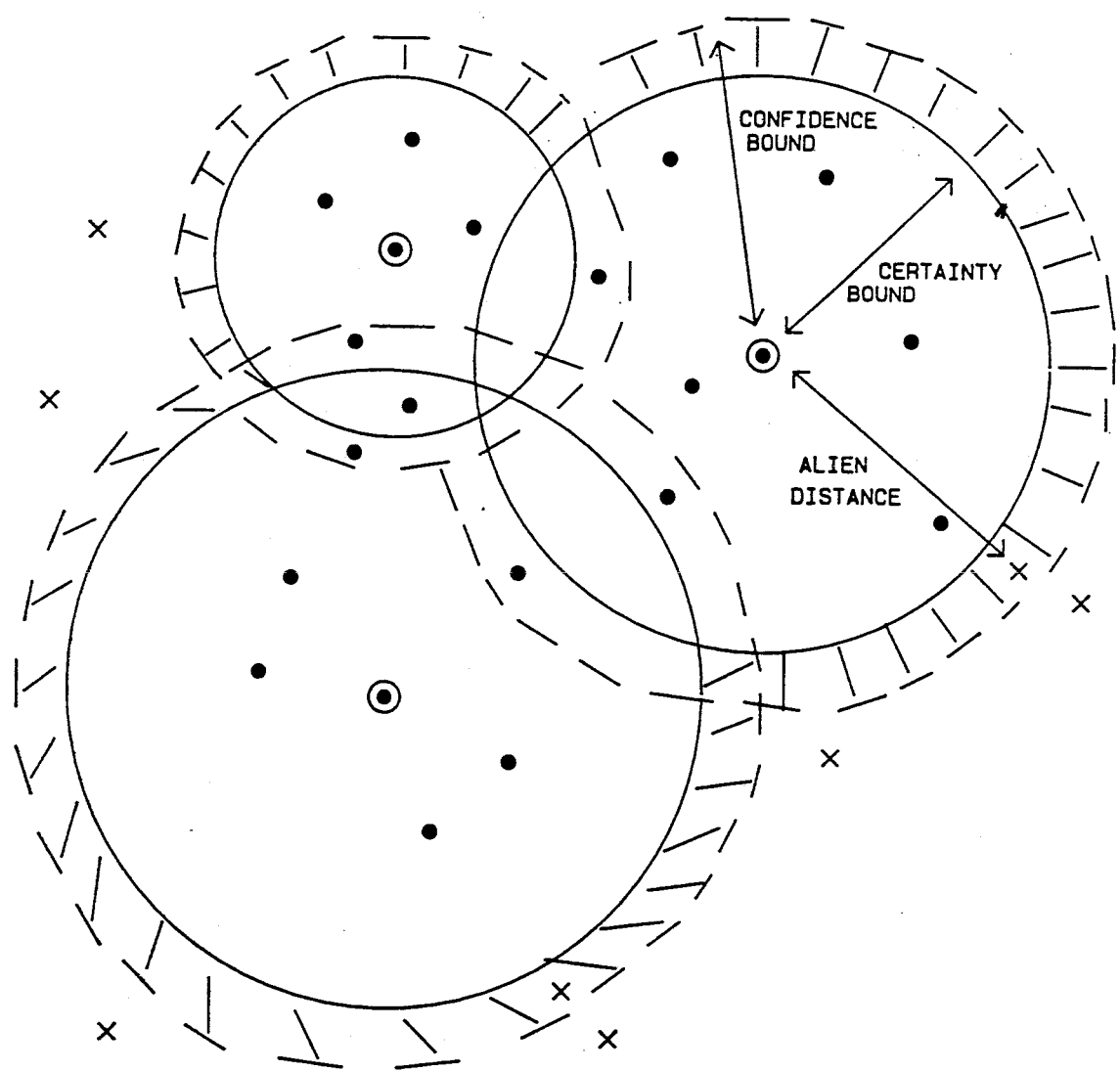

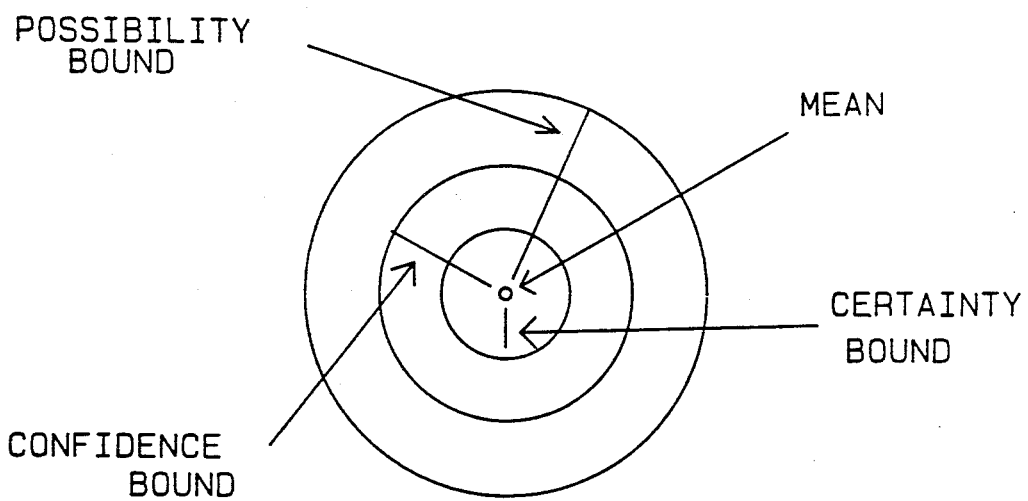
FIG 3A
RINGED-CLUSTER
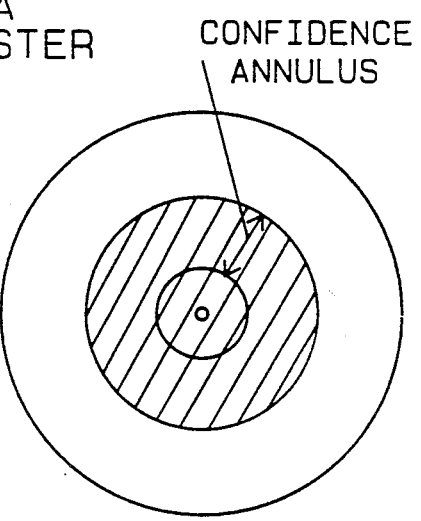
FIG 3B  CERTAINTY SPHERE
FIG 3C  CONFIDENCE SPHERE
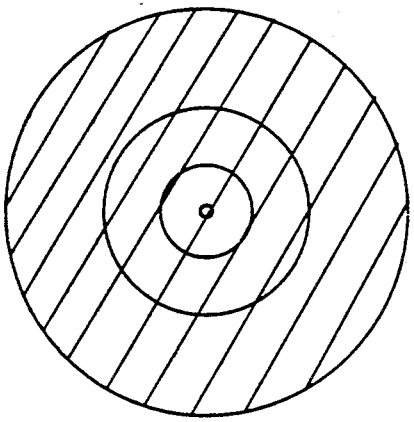
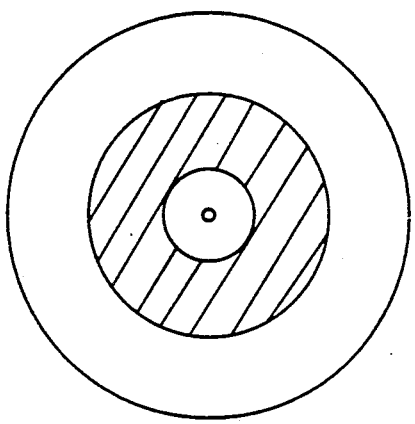
FIG 3D  POSSIBILITY SPHERE
FIG 3E  CONFIDENCE ANNULUS FIG 21A
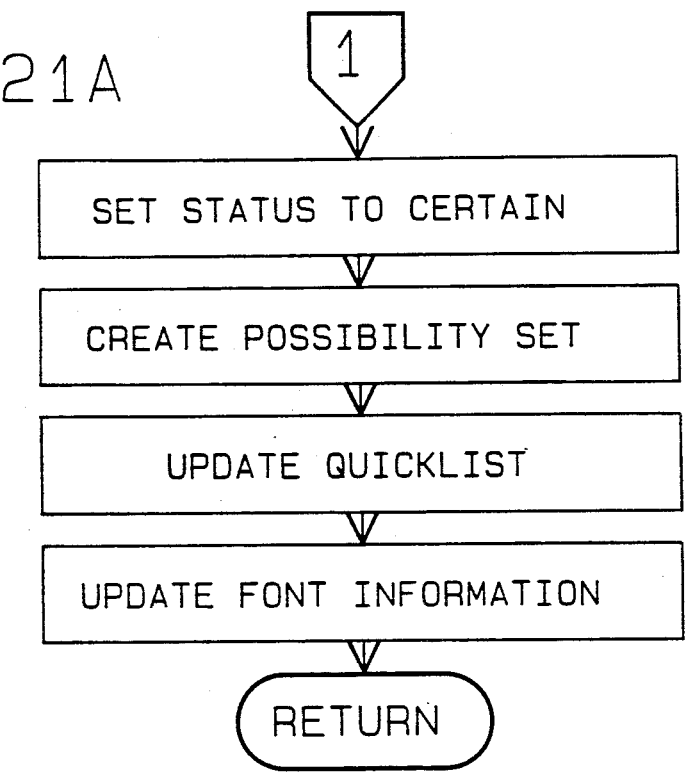
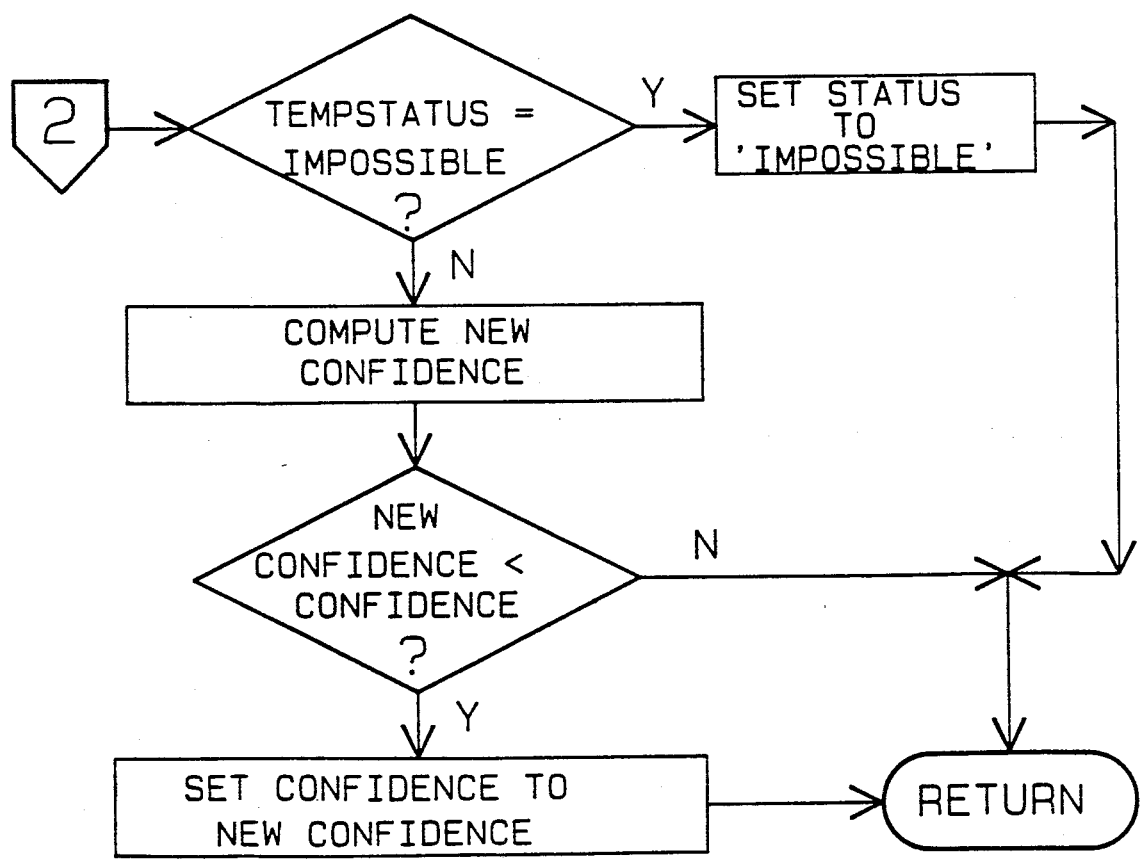

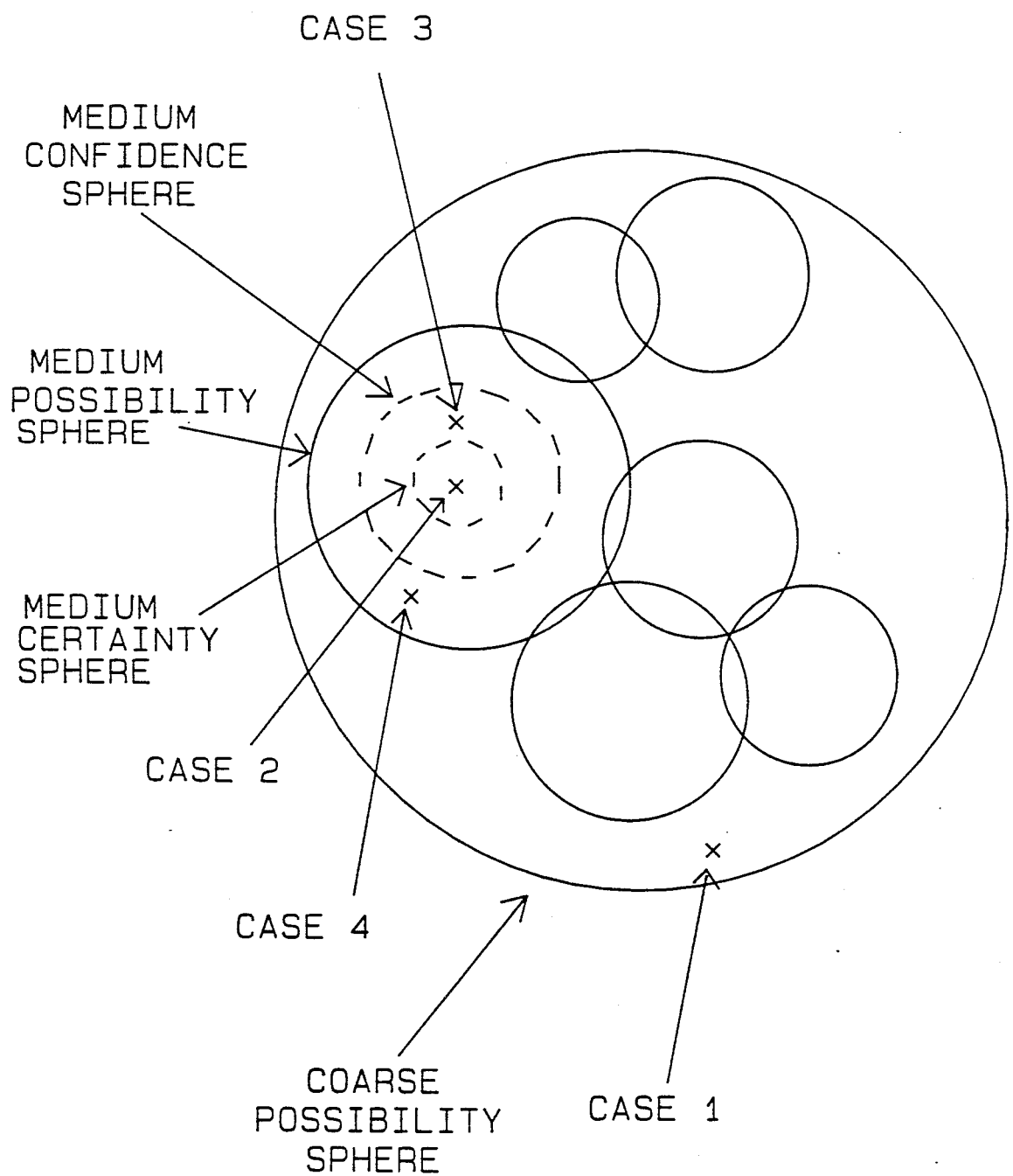

FIG 25A
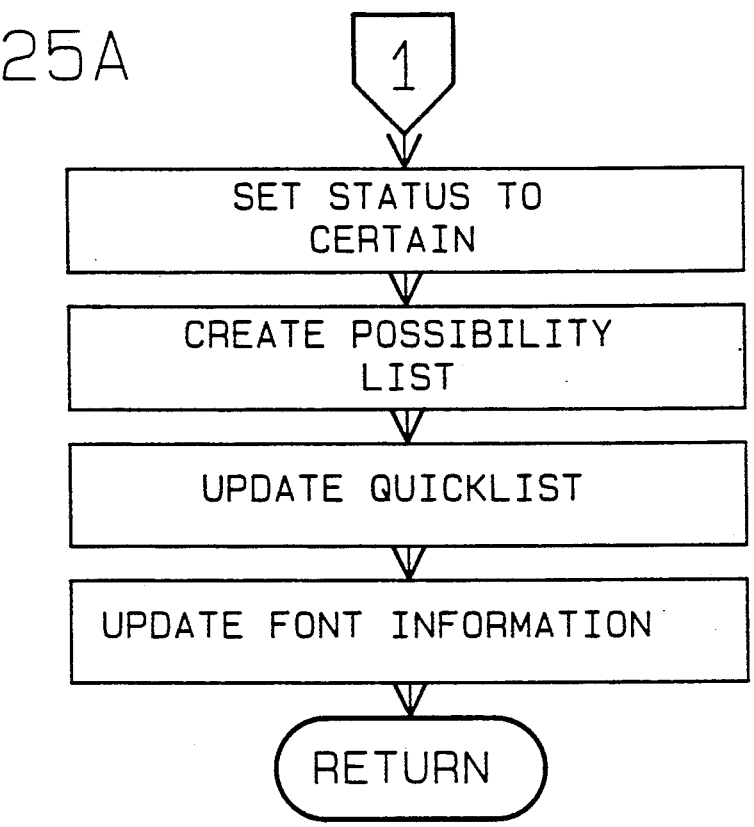
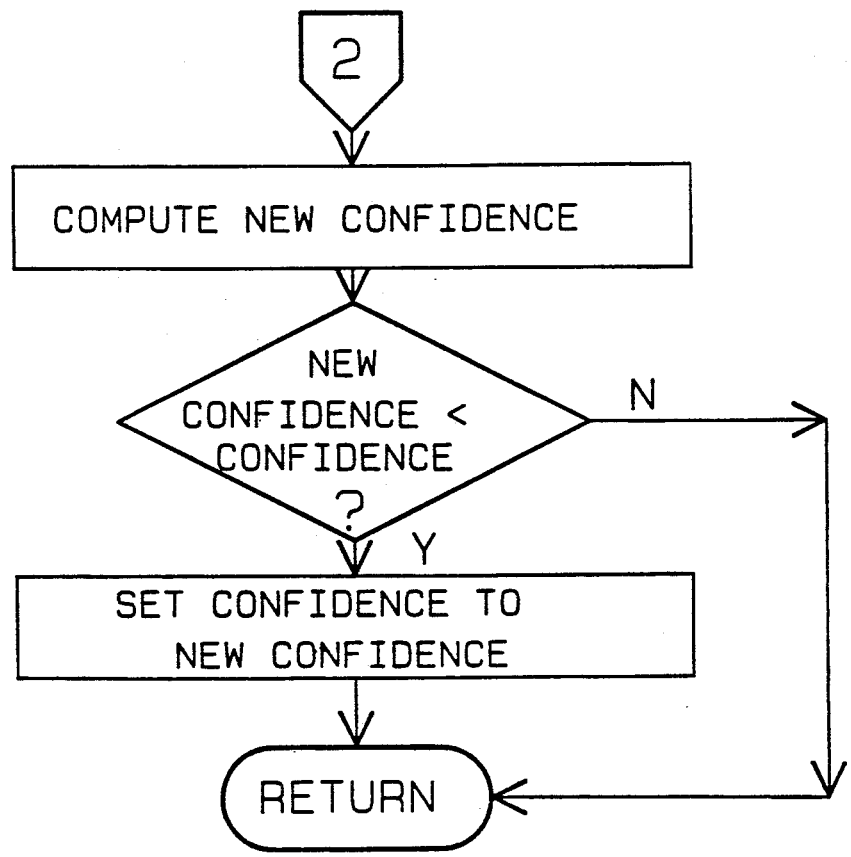

PREPROCESSING MEANS FOR USE IN A PATTERN CLASSIFICATION SYSTEM

This is a division of application Ser. No. 07/163,374, filed Apr. 25, 1988, which in turn is a division of application Ser. No. 07/786,035, filed Oct. 10, 1985, now U.S. Pat. No. 4,773,099.

BACKGROUND OF THE INVENTION

A wide variety of pattern recognition systems are known in the art. Each such system optically receives data depicting a pattern to be recognized, and performs certain tasks on this pattern in order to compare it to known patterns in order to "recognize" the input pattern. A basic flow chart depicting a pattern recognition system is shown in FIG. 1. The input pattern is the pattern which is desired to be recognized. Digitizer 12 converts input pattern 11 to a series of bytes for storage in system memory 13. These bytes are typically binary in nature, reflecting the fact that input pattern 11 is basically a black and white figure. Digitizers are well known in the art and typically are used in such devices as facsimile machines, electronic duplicating machines (as opposed to optical photocopy machines) and optical character recognition systems of the prior art. Memory 13 can comprise any suitable memory device, including random access memories of well-known design. Segmentation 14 serves to divide the image data stored in memory 13 into individual characters. Such segmentation is known in the prior art, and is described, for example, in *Digital Picture Processing*, Second Edition, Volume 2, Azriel Rosenfeld and Avinash C. Kak, Academic Press, 1982, specifically, Chapter 10 entitled "Segmentation".

Feature extraction 15 serves to transform each piece of data (i.e., each character) received from segmentation 14 in order to transform that data into a standard predefined form for use by identification means 16, which in turn identifies each character as one of a known set of characters. Output means 17 serves to provide data output (typically ASCII, or the like) to external circuitry (not shown), as desired.

Identification means 16 can be any one of a number of prior art identification means typically used in pattern recognition systems, including, more specifically, optical character recognition systems. One such identification means suitable for use in accordance with the teachings of this invention is described in U.S. Pat. No. 4,259,661, issued Mar. 31, 1981 to Todd, entitled "Apparatus and Method for Recognizing a Pattern". Identification means 16 is also described in *Syntactic Pattern Recognition and Applications*, K. S. Fu, Prentice Hall, Inc., 1982, specifically, Section 1.6, and Appendices A and B.

Inasmuch as this invention pertains to a method and structure for use as identification means 16 for use in an optical character system, this specification, including the description of prior art herein, is directed to identification mean 16, although it is to be understood that the teachings of this invention are equally applicable for use in pattern recognition systems recognizing patterns other than characters, or indeed even to systems used to recognize any information capable of being represented mathematically.

Prior art identification techniques include matrix overlay techniques, in which a feature vector containing pixels defining each bit of the unknown character is compared, for example, by an exclusive OR operation, with a feature vector defining the pixels in a known reference character. This is performed in sequence for a series of known reference characters, and the result of the exclusive OR operations which yields the minimum number of mismatched pixels between the unknown character and a reference character causes the unknown character to be recognized as that reference character.

Another prior art classification technique is a so-called "decision tree" technique. In this technique, a series of relevant questions is posed and answered by the input data defining the input pattern to be recognized. The results of the various answers to these questions results in a decision tree which, after a number of branches, results in the identification of the input pattern.

SUMMARY

According to the teachings of this invention, a unique method for identifying unknown input data, such as patterns or characters is provided. In order to classify unknown input characters, first, during a preprocessing phase, a large number of reference data is collected and analyzed in order to form "ringed clusters" for each class of input data. For example, if the input data are characters, a set of ringed clusters is associated with each character class, such as all "e". These ringed clusters are formed so as to be later used during the classification of an unknown input character.

In one embodiment of this invention, course ringed clusters are used such that all data of a given class are associated with a single course ringed cluster. Later, during the classification of unknown input data, these course ringed clusters are used to eliminate possible reference data as being the unknown input data if the unknown input data does not fall within that course ringed cluster.

In another embodiment of this invention, a set of medium ringed clusters is used for each class of reference data such that all data of a given class fall within the union of the set of medium ringed clusters. By using a set of medium ringed clusters, fewer "aliens" (data other than the selected data associated with the medium ringed clusters) are contained in the ringed clusters, thereby enhancing the ability to accurately recognize unknown input characters.

Another embodiment of this invention uses fine ringed clusters in which there are non known aliens contained within the union of fine ringed clusters of each given reference data class. This allows even greater accuracy in classifying unknown data input characters.

Another feature of this invention, ringed clusters include "certainty spheres" which are used to identify with certainty an unknown input character if it lies within such a certainty sphere.

As another feature of this invention, ringed clusters also include "confidence spheres" which are used to identify, although not with certainty, the unknown input character, and assign a confidence value indicating the relative confidence associated with the possibility that this unknown character corresponds to the reference data class of the ringed cluster.

Numerous other specific features of this invention will become readily apparent to one of ordinary skill in the art after a reading of the attached specification, claims and drawings.

BRIEF DESCRIPTION OF THE DRAWINGS

FIGS. 2a and 2b represents a plurality of reference character feature vectors and a plurality of ringed clusters associated therewith;

FIGS. 3a through 3e depict a plurality of ringed clusters, together with their associated means, certainty bounds, confidence bound, possibility bound, certainty sphere, confidence sphere, possibility sphere, and confidence annulus;

FIGS. 21 and 21a are flowcharts depicting one embodiment of the medium filter operation of the character filter of FIG. 19;

FIG. 22 depicts possible relationships between an unknown input character feature vector and a set of medium ringed clusters which have been previously constructed in accordance with the teachings of this invention;

FIGS. 25 and 25a are flowcharts depicting one embodiment of a fine analysis performed in accordance with the second pass operation of FIG. 17;

DETAILED DESCRIPTION

In accordance with the teachings of this invention, character classification is essentially performed in a two-step operation. First, prior to receipt of input data to be classified, reference data is input and analyzed in order to provide a data base containing a plurality of "ringed-clusters" of reference data feature vectors and associated bounds. It is this data base which is used during the optical character recognition process to classify the unknown characters being received.

It is to be understood that this invention is capable of being used regardless of the exact format and information contained within the feature vector defining the character being input.

Table of Contents

A. Collection of Reference Data
   A.1 Single Character Reference Set
   A.2 Bad-Segment Reference Set
   A.3 Preprocessing of Reference Data
      A.3.1 Compute Alien Distance, Bad Segment Distance
B. Clustering of Reference Data Feature Vectors During Preprocessing
   B.1 Certainty Sphere
   B.2 Confidence Sphere
   B.3 Confidence Annulus
   B.4 Possibility Sphere
   B.5 Types of Clusters
   B.6 Fine Ringed Cluster Generation Technique
   B.7 Medium Ringed Cluster Generation Technique
      B.7.1 Choose Medium Means
      B.7.2 Compute Possible Radii
   B.8 Coarse Ringed-Cluster Generation Technique
      mean
      certainty bound
      possibility radius
   B.9 Cluster Postprocessing
      B.9.1 Setting Confidence Bounds
      B.9.2 Setting Coarse Possibility Bounds
      B.9.3 Setting Medium Possibility Bounds
C. Classifying Unknown Input Characters After Preprocessing of Reference Data
   C.1 Compute Possibility Set
      C.1.1 Quick Check
      C.1.2 Get Character Candidate Lists
      C.1.3 Initial Pass
         C.1.3.1 Character Filter
            C.1.3.1.1 Coarse Filter C.1.3.1.2 Medium Filter
C.1.3.1.2.1 Update Best Error and "Very-Likely" Flag
C.1.3.1.2.2 Compute New Confidence
C.1.4 Second Pass
C.1.4.1 Fine Analysis Operation
C.1.5 Make Possibility Set-Uncertain
C.1.6 Bad Segment Check
C.1.7 Additional Bad Segment Check Techniques
C.1.7.1 Font-Dependent Bad Segment Check
C.1.7.2 Simple Join Check Operation
C.1.7.2.1 Set Landmark Values
C.1.7.2.1.1 Font-Dependent Method
C.1.7.2.1.2 Font-Independent Method
C.1.7.3 Decisive Join Check Technique

COLLECTION OF REFERENCE DATA

A "reference" is a data structure with the following fields, as described below.
1. feature vector
2. label
3. alien distance
4. bad-segment distance

Single Character Reference Set

A file of reference vectors is used to generate 'ringed-clusters', which in turn are used during classification of unknown input characters.

Figure 1:
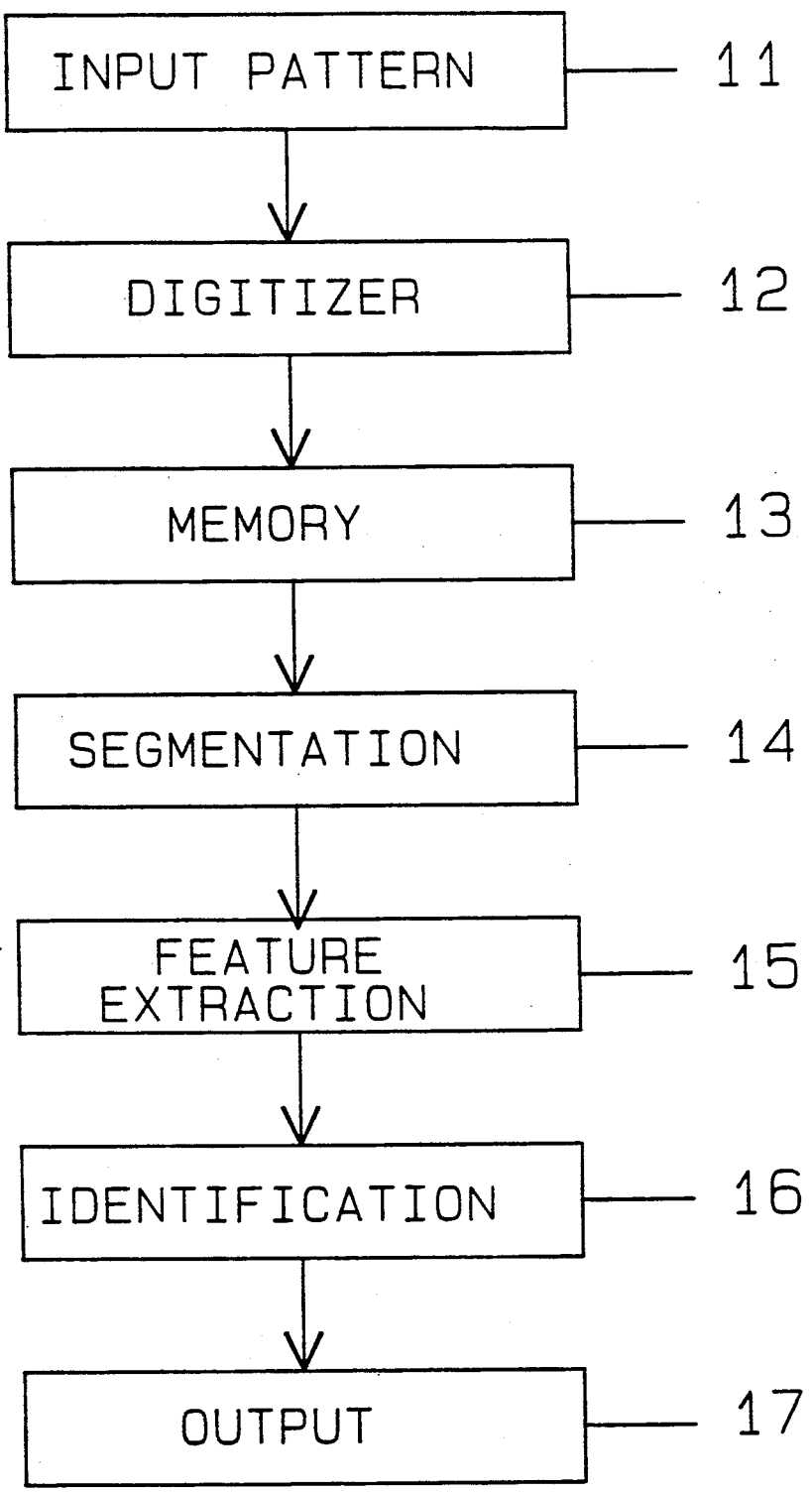
FIG. 1 is a block diagram prior art character recognition system.

To create these reference vectors, font sheets containing the single characters (including such characters as ½, %, etc.) desired to be recognized are digitized and segmented, as previously described with reference to FIG. 1. The label field of each segment is set to the ASCII value of the character represented by the segment. Each segment is then analyzed by the feature extraction module (FIG. 1) and the resulting feature vector is then converted into a reference by adding the label, alien distance, and bad-segment distance fields. At this stage, only the feature vector field and the label field of each reference are filled. As used in this specification, R is the set of all such single character reference vectors.

Since the method of this invention uses information contained in the feature vector of an unknown input character in order to classify the unknown input character, reference vectors corresponding to character classes which are indistinguishable from each other on the basis of the information contained in the "feature vectors" are processed further. In one embodiment, subline information is not contained in the feature vector and so, for example, 'c' and 'C' are deemed to be indistinguishable classes, and such further processing is as follows.

For each set of indistinguishable classes, a new "generic" class is defined and all references belonging to one of the indistinguishable classes are relabeled as that new class. For example, all references labeled 'c' or 'C' are relabeled as the new class 'generic c'. If, during classification, an unknown input character is classified as 'generic c', the character candidate 'generic c' is replaced with the two character candidates 'c' and 'C'. A decision as to which of these two character candidates is the correct label for the unknown input character is made by post-processing modules which use information other than the information in the feature vector. In one embodiment, such modules include a subline checker, which uses subline information, and a contextual postprocessor, which uses neighboring characters and knowledge of the English language (or other languages of concern) to make its choice.

Classes which have some indistinguishable members, but are not in general indistinguishable, are also processed further. For example, 'I', 'l', '1' are sometimes printed as just a vertical bar. In this case, a new 'generic vertical bar' class is defined. Reference characters which look visually like nothing more than a vertical bar are relabeled as this new geometric class. When alien distances (discussed below) are computed, reference vectors belonging to character classes containing references which were relabeled as a particular 'generic' class are not considered aliens. For example, 'I', 'l', and '1' are not considered aliens of 'generic vertical bar'.

If, during classification, an unknown input character is classified as a particular 'generic' class, this 'generic' class is replaced with the character candidates for which there were references relabeled as that 'generic' class. For example, if an unknown character is classified as 'generic vertical bar', this is replaced with the candidates 'I', 'l', '1'. These candidates are then sent on to other postprocessing modules, as mentioned above.

Bad-Segment Reference Set

In addition to classifying unknown input characters, the classification method of one embodiment of this invention is also designed to recognize when the unknown input character is, in fact, not a single, properly segmented character (i.e. is 'bad'). For example, the unknown input character may, in fact, be two or more joined characters (a 'join'). In order to accomplish this, a second reference set is created containing references made from 'bad' segments. Preferably the bad segment references chosen are those that are expected to be input most commonly to the classifier of this invention.

In one embodiment, bad segments input to the classifier are most often two joined characters. A bad segment reference set is built containing character pairs or 'digraphs'. This is accomplished by collecting font sheets containing the most common letter pairs in the English language. These sheets are then digitized, segmented with a segmentation means that does not break apart digraphs, labeled, and feature extracted. The resulting labeled feature vectors are converted into reference vectors. As used in this specification, B is the set of all such bad-segment references.

Preprocessing of Reference Data

For each reference in the single character reference set R, values are computed for the remaining two unfilled fields: alien distance and bad segment distance.

Figure 2B:
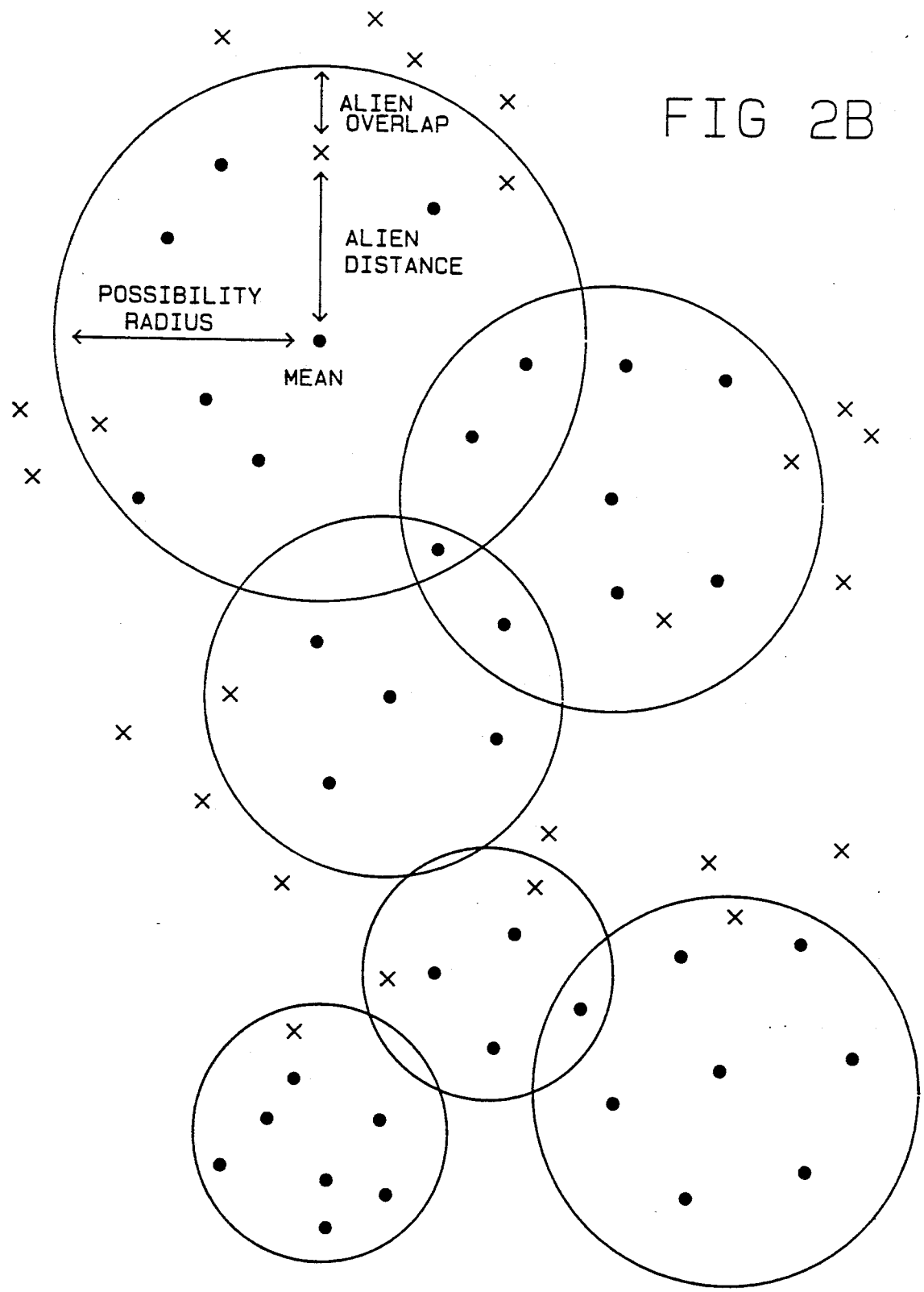

FIGS. 2a and 2b conceptually depict a plurality of reference character feature vectors. Those feature vectors indicated by dots are representative of feature vectors defining a single specific character (or 'generic' character). In other words, all the dots in FIGS. 2a and 2b represent feature vectors of reference characters belonging to the same class, such as all feature vectors representing a lower case "e" which are contained within the reference data. In contrast, all "non-e characters" are represented in FIGS. 2a and 2b as X's, and are referred to as "aliens". That is, two references $r_1$ and $r_2$ are aliens of each other if their labels are not equal.

Compute Alien Distance, Bad Segment Distance

The alien distance for a reference is the distance to its nearest alien. As used in this specification, the "distance" between two feature vectors is the square of Euclidean distance and defined by the following equation:

$$\text{distance}(\vec{v}, \vec{w}) = \sum_{i=1}^{n}(v_i - w_i)^2, \text{ where}$$

$\vec{v}$ is the vector $<v_1, V_2, \ldots V_n>$; and
$\vec{w}$ is the vector $<w_1, w_2, \ldots, w_n>$ The alien distance is defined by the following equation:

alien distance ($r_0$) =
minimum ({distance ($r_0 \cdot$ vector, $r \cdot$ vector)/$r \epsilon R \vee B$
and $r \cdot$ label $\neq r_0 \cdot$ label})

where
$r_0 \epsilon R$;
R is the single character reference set; and
B is the bad-segment reference set.

The bad segment distance for a reference is the distance to its nearest bad segment reference vector, and is defined by the following equation bad segment distance ($r_0$) =
minimum ({distance ($r_0 \cdot$ vector, $r \cdot$ vector)/$r \epsilon B$})

where
$r_0 \epsilon R$;
R is the single character reference set; and
B is the bad segment reference set.

The alien distance and bad segment distance of each reference in R is computed and stored in the alien distance field and bad segment distance field, respectively, prior to clustering.

Clustering of Reference Data Feature Vectors During Preprocessing

A 'ringed-cluster' (FIG. 3a) is a data structure with the following fields:

| | |
|---|---|
| a. mean | Feature vector at the center of the cluster, selected from one of the reference feature vectors. |
| b. label | ASCII value of the character represented by the ringed-cluster. |
| c. alien distance | Alien distance corresponding to mean of cluster. Used to establish certainty bounds. |
| d. bad segment distance | Bad segment distance corresponding to mean of cluster. |
| e. possibility bound | Radius of possibility sphere. |
| f. confidence bound | Radius of confidence sphere. |
| g. certainty bound | Radius of certainty sphere. |
| h. certainty radius | Not used during classification. Used to set confidence bound. |
| i. possibility radius | Not used during classification. Used to set possibility bound. |

Corresponding to each ringed cluster are three spheres (confidence sphere, possibility sphere, and certainty sphere) and a confidence annulus that lie in the n-dimensional feature vector space, FIGS. 3b–3e. FIGS. 3a–3e are two dimensional representations of the various N-dimensional regions in the N-dimensional feature vector space.

Certainty Sphere

The "certainty sphere" (FIG. 3b) is the n-dimensional sphere whose center is the mean of the ringed-cluster and whose radius is the certainty bound of the ringed-cluster. That is, a feature vector $\vec{v}$ lies in the certainty sphere if distance ($\vec{v}$, mean) < certainty bound.

Certainty spheres are later used during classification of unknown characters as follows: if the unknown input character feature vector lies within the certainty sphere of a ringed-cluster, the input feature vector is classified "with certainty" using the label of the ringed-cluster. The justification for so classifying the input feature vector is as follows: the certainty bound for that ringed-cluster is set to a value less than alien distance associated with the mean of that ringed-cluster, and thus no alien reference vectors lie in the certainty sphere.

Confidence Sphere

The "confidence sphere" (FIG. 3c) is the sphere whose center is the mean of the ringed-cluster and whose radius is the confidence bound of the ringed cluster.

Confidence Annulus

The "confidence annulus" (FIG. 3e) is the set of all feature vectors that lie inside the confidence sphere but outside the certainty sphere. That is, a feature vector $\vec{v}$ lies in the confidence annulus if Certainty bound ≦ distance ($\vec{v}$, mean) < confidence bound Confidence annuli are used during classification of unknown characters as follows: if the unknown input character feature vector lies within the confidence annulus of ringed-cluster with label x, then the character x is made a character candidate (possible character equal to the unknown character) and a confidence value is associated with it.

Possibility Sphere

The "possibility sphere" (FIG. 3d) is the sphere whose center is the mean of the ringed-cluster and whose radius is the possibility bound of the ringed-cluster. That is, a feature vector $\vec{v}$ lies in the possibility sphere if distance ($\vec{v}$, mean) < possibility bound Possibility spheres are later used during classification of unknown characters to eliminate characters from candidateship, in a manner more fully described below.

Types of Clusters

During the clustering stage, the reference set R previously described is used to generate three types of ringed-clusters:
fine ringed-clusters
medium ringed-clusters
coarse ringed-clusters.

As used in this specification, the possibility sphere corresponding to a coarse ringed-cluster is referred to as a "coarse possibility sphere".

Coarse ringed-clusters have the following important properties:

1. There is one coarse ringed-cluster per character.
2. For each character x, the corresponding coarse possibility sphere covers the set of all reference vectors with label x.

As used in this specification, a sphere S "covers" a set V of feature vectors if every vector $\bar{v}$ in set V lies in the sphere S. That is:

$$\text{distance } (\bar{v}, \bar{m}) < r \text{ for every } \bar{v},$$

where
$\bar{m}$ is the center of sphere S; and
r is the radius of sphere S.

This fact is used in classification of unknown characters as follows: if the unknown input character feature vector lies outside the coarse possibility sphere corresponding to a character x, then the character x is eliminated as a character candidate. That is, coarse possibility spheres are used to quickly filter out candidates.

Medium ringed-clusters have the following important properties:

1. For each character, there is a small number of corresponding medium ringed-clusters.
2. For each character x, the corresponding set of medium possibility spheres covers the set of all reference vectors with label x.

As used in this specification, a SET of spheres "covers" a set V of feature vectors if every vector $\bar{v}$ in the set V lies in at least one of the spheres. Medium possibility spheres are used during classification of unknown characters as follows: if the input vector lies outside *all* medium possibility spheres corresponding to a character x, then the character x is eliminated as a character candidate. That is, medium possibility spheres are used to quickly filter out candidates (although not as quickly as coarse possibility spheres).

Fine ringed-clusters have the following important properties:

1. For each character, there are a relatively large number of fine ringed-clusters.
2. For each character x, the set of fine certainty spheres corresponding to character x covers the set of all reference vectors with label x, i.e. every reference vector with label x lies in at least one fine certainty sphere corresponding to character x.
3. No known aliens are contained within any certainty sphere of any fine ringed cluster.

Three techniques for the clustering of reference data feature vectors during preprocessing of a vast quantity of reference data are described.

Fine Ringed-Cluster Generation Technique

The purpose of the fine ringed-cluster generation technique is to "map out" the universe of character feature vectors, using knowledge obtained from the reference set R. To each character, a set of fine certainty spheres in the n-dimensional feature vector space is assigned. The union of these certainty spheres is referred to as the character's "territory". Referring to FIG. 2a, the solid circles represent the fine certainty spheres for the given character. As earlier described, the dots represent reference feature vectors labeled as the given character and the x's represent reference feature vectors labeled as aliens.

The fine ringed cluster generation technique creates these fine certainty spheres with the following goals.

a. The number of certainty spheres used to map out the territory of a given character is as small as possible in order to reduce memory requirements and to speed classification of unknown characters.

b. The second goal is that the territory corresponding to a given character contain *no* alien feature vectors. Unfortunately, the only way to accomplish this goal would involve having a reference set containing all possible character feature vectors. In general, it is impractical to have such an all-inclusive reference set because the number of different possible character feature vectors is, for all practical purposes, infinite. For example, in one embodiment, a feature vector consists of 56 fields, and each field can have any of 128 different possible values, and thus there are $128^{56}$ different possible feature vectors. The fine ringed-cluster generation technique attempts to satisfy this goal by guaranteeing that no *known* alien feature vector lies in a given character's territory. Referring to FIG. 2a, the x's represent all *known* alien feature vectors, that is all alien feature vectors in the reference sets R and B. No known aliens lie in any of the certainty spheres which form the given character's "territory". In addition, as is depicted in FIG. 2a, the radius of each certainty sphere (certainty bound) is set to a value somewhat *less than* the distance from the center of the sphere to its nearest known alien. The reason for this is to take into account the fact that the reference sets R and B are not all-inclusive. That is it is possible that an alien feature vector lies closer to the center of a certainty sphere than the nearest *known* alien feature vector. Thus, the second goal is approximated by setting the certainty bound (radius of certainty sphere) of each fine ringed cluster by the equation $$\text{certainty bound} = (\text{certainty factor}) \times (\text{alien distance})$$

where the certainty factor is some positive number less than one and the alien distance is the distance from the mean of the fine ringed-cluster (center of its certainty sphere) to its nearest known alien. In one embodiment of this invention, the value of the certainty factor is set by Table 1.

TABLE 1

| alien distance | certainty factor |
|---|---|
| over 10,000 | 0.7 |
| 5,000–9,999 | 0.6 |
| under 5000 | 0.5 | c. The third goal of the fine ringed-cluster generation technique is that the territory assigned to a given character cover *all* possible feature vectors for that character. The reason for this third goal is its impact on classification. During classification, as soon as the unknown input feature vector is found to lie in a given character's territory, the unknown input character is classified as that character and classification for that input character is complete. Thus, if both this third goal and the second goal mentioned above are accomplished, correct classification of any unknown input character is always guaranteed. If, for example, the fine ringed-cluster generation technique succeeds in assigning territories in such a way that *all* possible feature vectors for the character lower-case "e" fall inside "e"s territory (third goal) and *no* lower-case "e" feature vectors fall inside any alien's territory (second goal above), then, during classification, if a feature vector representing lower-case "e" were input to the classification module, it would be found to lie in the "e" territory and would be classified correctly.

As was discussed with respect to the second goal above, it is impractical to accomplish this third goal because to do so requires a reference set containing *all* possible character feature vectors. However, this third goal is approximated using the reference set R. That is, the territory assigned to a given character by the fine ringed cluster generation technique contains all *known* (i.e. reference) feature vectors for the given character. Referring to FIG. 2a, all reference feature vectors for the given character, indicated by dots, are contained in at least one of the certainty spheres forming the given character's territory. Thus, in particular, if any *reference* feature vector is input to the classification module, then correct classification is guaranteed.

Since the reference set R is not all-inclusive, it is possible that there exist, for example, "e" feature vectors not contained in the "e" territory. Correct classification of such input feature vectors is still possible if the feature vector falls into one of "e" confidence spheres. The confidence sphere corresponding to a ringed-cluster is, in general larger than its certainty sphere. Values for the fine confidence bounds (radii of the fine confidence spheres) are set during the cluster post processing stage.

In general, then, the purpose of "mapping out" feature vector space in advance of classification is to:

a. increase classification accuracy;
b. increase classification speed;
c. reduce the amount of memory required relative to, for example, a nearest neighbor classification scheme. A nearest neighbor classification scheme, using the reference set used in one embodiment of the present invention would take approximately 4000 times as long to classify an unknown input character and would require approximately 50 times more memory.

The fields of the fine ringed-clusters which are used during classification are: mean, label, certainty bound, confidence bound. In one embodiment, the alien distance and bad segment distance fields are also used during classification. In this embodiment, the alien distance is used to assist in setting confidence values. The bad segment distance is used to assist in determining whether the unknown input character is "bad".

The fields of the fine ringed-clusters which are set by this clustering techniques are:
mean
label
certainty bound
alien distance
bad segment distance
certainty radius Values for the confidence bound fields are set during the cluster-post-processing stage, described later, using information from the alien distance, bad segment distance, and certainty radius fields.

Figure 4:
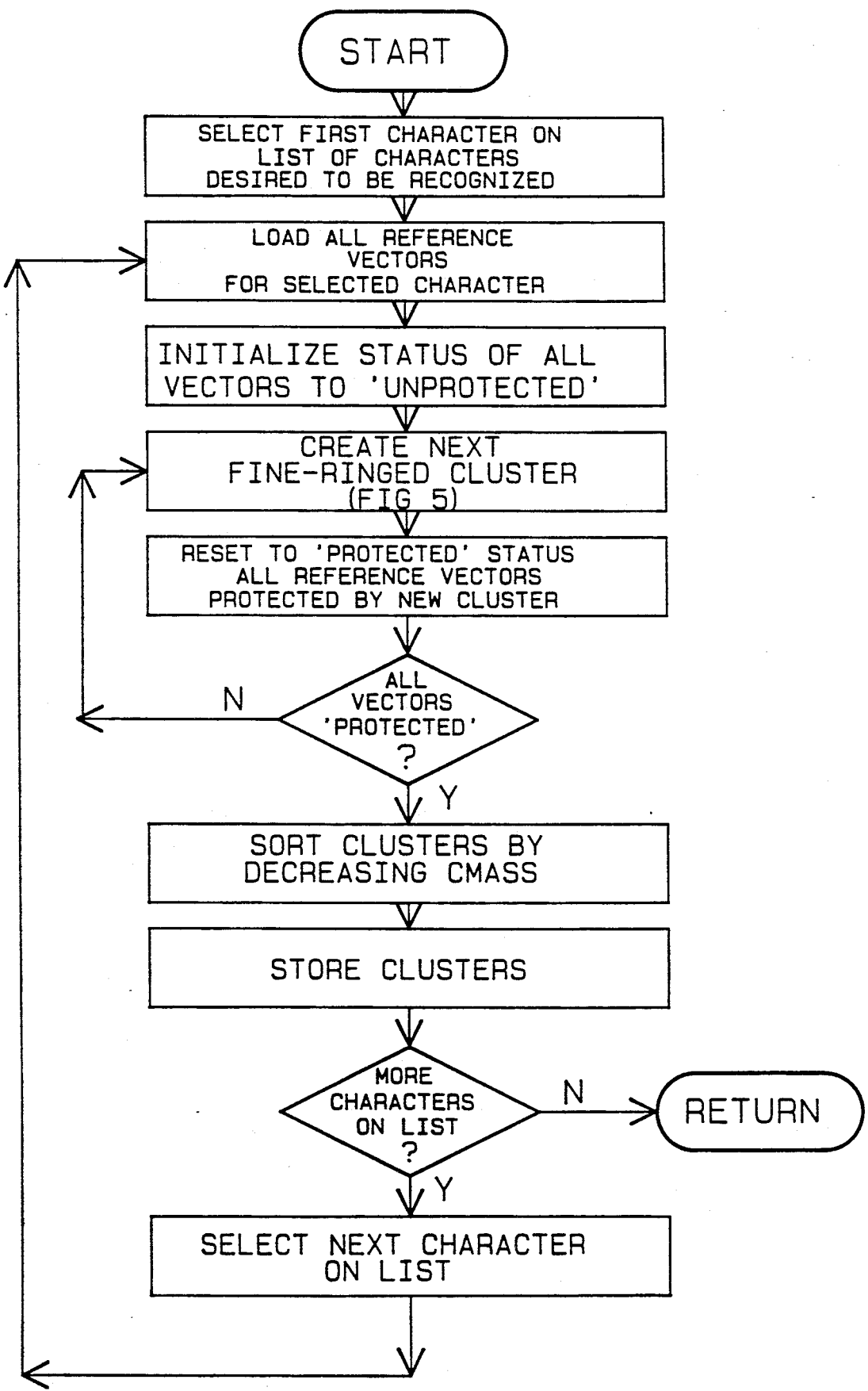
FIG. 4 is a flowchart depicting the fine ringed cluster generation technique of one embodiment of this invention.

FIG. 4 is a flow chart depicting the operation of the fine ringed-cluster generation technique. As shown in FIG. 4, this clustering technique steps through all the reference data, character by character. For example, first the character "A" is selected, fine ringed-clusters for the selected character are created, the next character is selected, its fine ringed-clusters are created, and so forth.

As shown in FIG. 4, in order to create fine ringed-clusters for each character, first all references for the selected character are fetched from a file and placed in memory. The status of each of these vectors is then initialized to "unprotected". As used in conjunction with the fine ringed cluster generation technque, a protected vector is a vector that lies within the certainty sphere of a fine ringed-cluster, that is:

$$\text{distance}(\text{vector}, \text{mean}) < (\text{certainty factor})(\text{alien distance}).$$

The next step of the fine ringed-cluster generation technique is to create a new fine ringed-cluster, described in more detail later with reference to FIG. 5.

The next step sets the status flag to "protected" for all vectors protected by the newly created fine-ringed cluster. It is then determined if all reference vectors for the selected character are protected. If so, the clusters are sorted by decreasing cmass, and stored. The cmass of a fine ringed cluster is the total number of reference feature vectors for the selected character that lie within the certainty sphere of that fine ringed cluster. The purpose of sorting the fine ringed clusters by decreasing cmass is to speed classification, since as soon as the input vector is found to lie within a certainty sphere, classification for that input vector is complete. Thus, the certainty spheres with the largest cmass have the highest probability of containing the input vector and are examined first during classification. The creation of fine ringed-clusters for the selected character is now complete and the next character is selected and its fine ringed-clusters are created. Conversely, if all reference vectors for the selected character are not "protected", the operation depicted in FIG. 4 is continued with the creation of additional fine ringed-clusters for the selected character.

Create Fine Ringed Cluster

Figure 5:
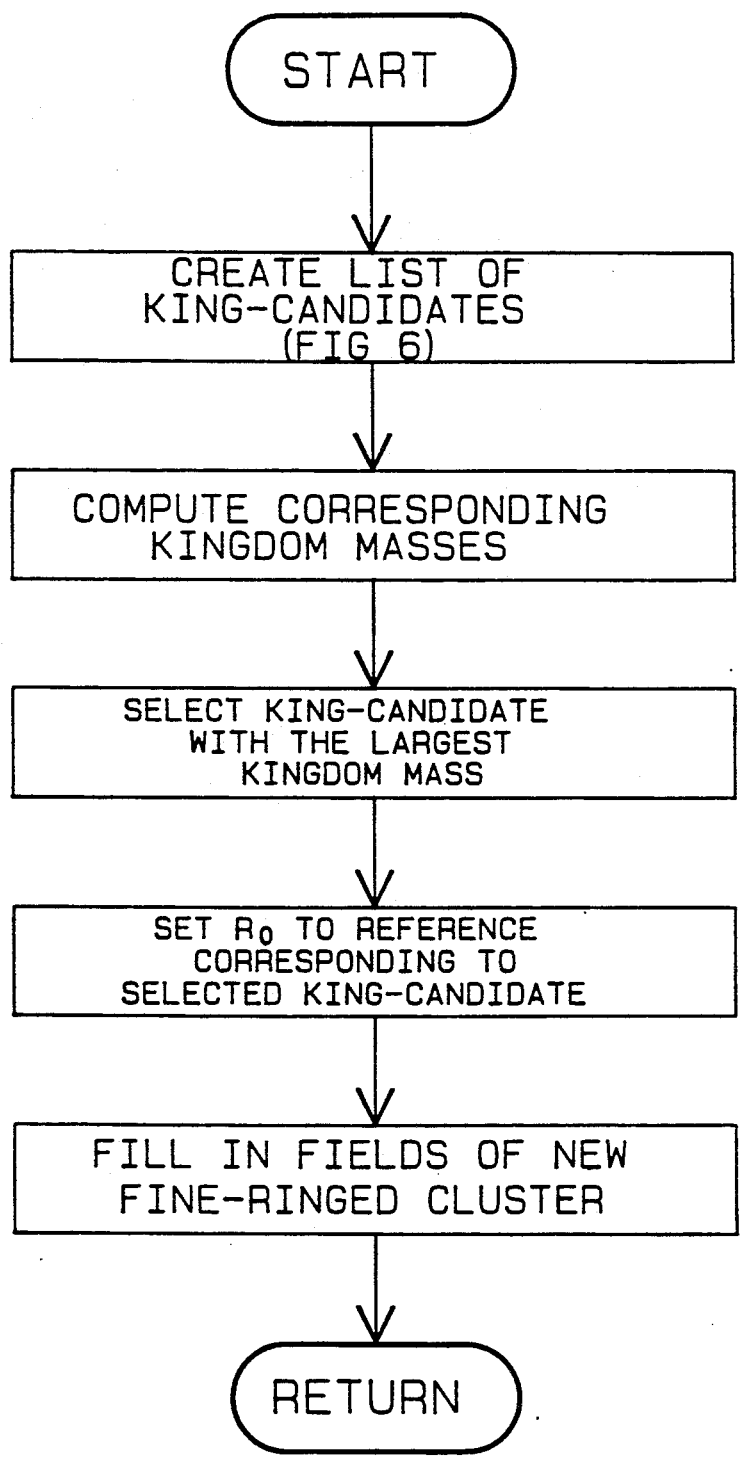
FIG. 5 is a flowchart depicting one embodiment of an operation for creating fine ringed clusters for a selected reference character.

FIG. 5 is a flowchart depicting the operation of making the next fine ringed-cluster. The first step is to create a list of king-candidates, which is discussed in more detail with reference to FIG. 6. As used in this specification, a king-candidate is a reference vector which might be used as the mean of a new fine ringed-cluster. Next, the kingdom mass corresponding to each king-candidate is computed. The kingdom mass is the number of as yet *unprotected* vectors that would be protected by the king-candidate. Note that the cmass, which counts the *total* number of reference vectors protected by the mean of a fine ringed-cluster, is not the same as the kingdom mass. The kingdom mass does not count those reference vectors protected by the king which are protected by the mean of an already created fine ringed-cluster. Next, the king is chosen as that king-candidate with the largest corresponding kingdom mass.

The reference whose vector has just been chosen as king is then used to fill the fields of a new fine ringed-cluster. The mean alien distance, bad segment distance, and label are copied from this reference to the new fine ringed cluster. The certainty bound is set by the equation $$\text{certainty bound} = (\text{certainty factor}) \times (\text{alien distance})$$

as earlier discussed. The certainty radius is set as follows:

1. Form the set of all reference vectors for the given character that fall inside the certainty sphere of the newly created fine ringed cluster.

2. Compute the distance from the mean to each such reference vector.

3. Set the value of the certainty radius to the largest such distance.

The certainty radius field, through not used during classification, is used during the cluster post processing stage to set a value for the confidence bound.

Create List of King Candidates

Figure 6:
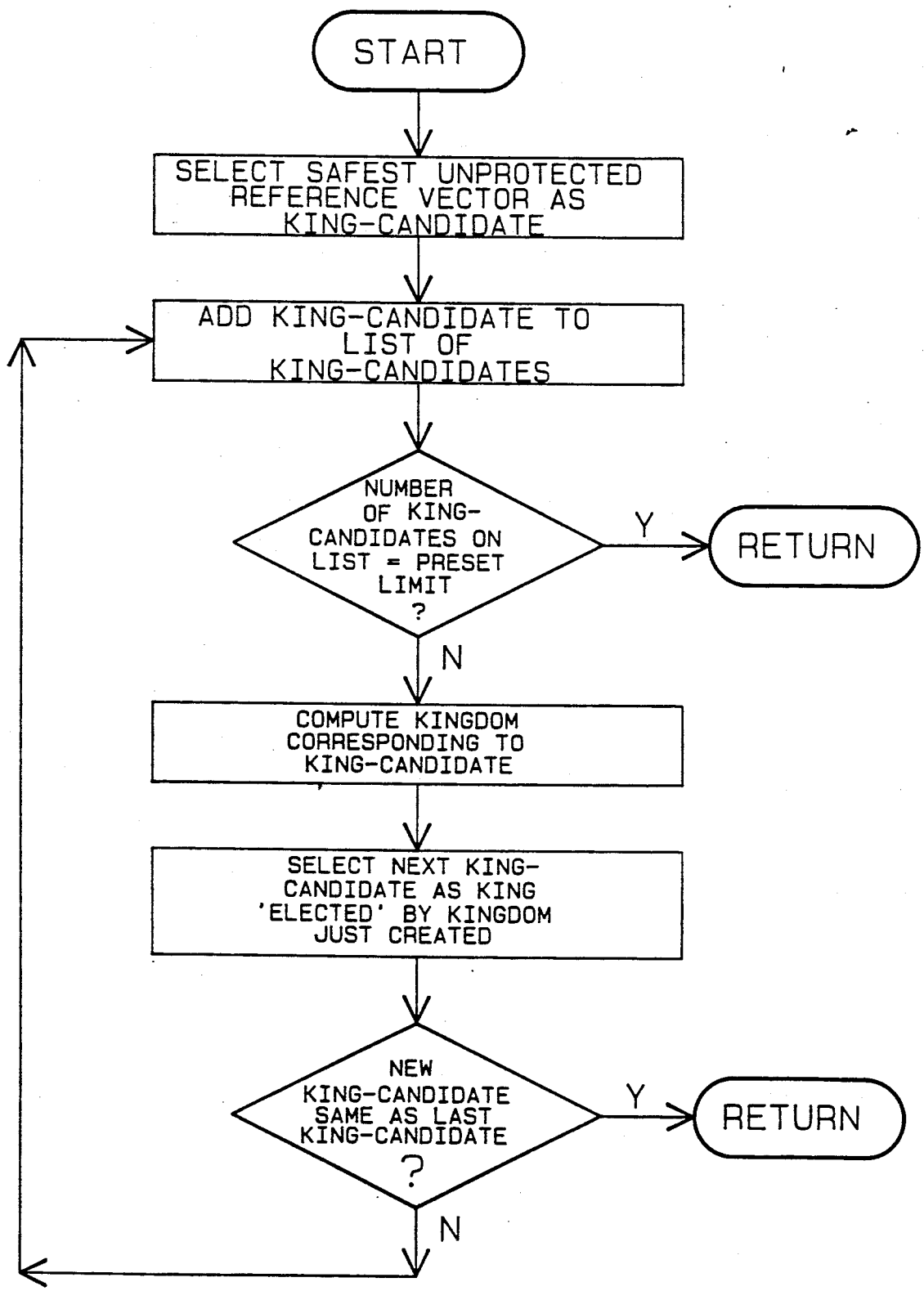
FIG. 6 is a flowchart depicting the operation of creating a new fine ringed cluster.

FIG. 6 is a flowchart depicting in more detail the operation of creating a list of king-candidates. The operation takes the following rough form:

king1→kingdom1→kingdom2→king 3

That is, given a king, we compute its corresponding kingdom. Given a kingdom, we allow the kingdom to "elect" a new king. To assist in the description of FIG. 6, the following definitions are provided:

king→kingdom

Given a king, its corresponding kingdom is the set of all as yet *unprotected* reference vectors which would be protected by the king, i.e.

distance (vector, king)<(confidence factor)×(alien distance)

The number of reference vectors in the kingdom is the kingdom mass, described earlier.

kingdom→king

A kingdom "elects" a king by the following process. First, the vector mean $\bar{m}$ of the vectors in the kingdom is computed by the following equation:

$$\bar{m}[i] = \frac{1}{K} \sum_{j=1}^{K} \bar{v}_j[i]$$

where
$\bar{m}$ is the vector-mean of the set $\bar{v}_1, \bar{v}_2, \ldots \bar{v}_K$; and
$\bar{v}[i]$ is the ith element of the vector $\bar{v}$.

After the vector-mean is computed, the distance from each member of the kingdom to the vector-mean is computed. The king "elected" by the kingdom is defind as that member of the kingdom closest to the vector-means.

Referring again to FIG. 6, the operation of creating the list of king-candidates proceeds as follows. The first king-candidate is set to the safest unprotected reference vector, i.e. to that unprotected reference vector whose alien distance is as large as possible. This king-candidate is then added to the list of king-candidates. Next, the kingdom corresponding to the king-candidate is computed (as described earlier). If the number of king-candidates has reached some preset limit, the operation of forming the list of king-candidates is complete, and a return is made to the create list of king candidates operation of FIG. 5. In one embodiment, the preset limit is equal to 20. If the number of king-candidates is still below the preset limit, a new king-candidate is selected as that king "elected" by the kingdom just created (as described earlier). If the newly elected king-candidate is the same as the last king-candidate, then the operation of forming the list of king-candidates is complete. Otherwise, the iteration continues beginning with the step of adding the newly elected king-candidate to the list of king-candidates.

Medium-Ringed-Cluster Generation Technique

FIG. 2b depicts, in a manner similar to that of FIG. 2a, a plurality of reference feature vectors. Those feature vectors indicated by dots represent feature vectors defining a single specific character, and all feature vectors represented by Xs are aliens. Also shown in FIG. 2b are six possibility spheres corresponding to the six medium ringed-clusters for the given character. The possibility spheres contain all of the feature vectors for the selected character and also contain a minimum number of aliens.

The purpose of the medium ringed-cluster generation technique is to construct, for each class of reference characters (such as all lower case "e") which are contained within the reference data, a small set of medium ringed-clusters. In one embodiment of this invention it has been determined that six medium ringed-clusters is an appropriate number, although any desired number may be used. The medium ringed-cluster generation technique constructs, for each character, a small set of ringed-clusters whose possibility spheres have the property that every reference feature vector of the selected character lies inside at least one of the possibility spheres. However, unlike the certainty spheres created by the previously described fine ringed-cluster generation technique, the possibility spheres generated by the medium ringed-cluster generation technique may overlap the alien subspace and thereby include aliens. However, this medium ringed-cluster generation technique is designed to minimize this overlap of alien subspace and thereby minimize the number of aliens contained in the possibility spheres created.

The fields of the medium ringed-clusters which are used during classification are:

mean
label
certainty bound
confidence bound
possibility bound

As mentioned earlier with respect to fine ringed clusters, the alien distance and bad segment distance are also used, in one embodiment, during classification.

A value for the possibility *bound* of a medium ringed-cluster (radius of medium possibility sphere) is not set by this medium ringed-cluster generation technique, but the value of the possibility bound is set during the cluster post processing stage using the value of the possibility radius. A value for the possibility radius of each medium ringed-cluster is set by this medium ringed-cluster generation technique. As is more fully described below, after the medium means have been chosen, each reference vector for the selected character is assigned to one of the medium means. The possibility radius corresponding to a medium mean is set to the radius of the smallest sphere centered at the medium mean that contains all of the reference vectors assigned to that medium mean. In this manner, the set of medium "strict" possibility spheres for a selected character is constructed so as to cover the set of all reference vectors for that selected character. As used in this specification, the "strict" possibility sphere corresponding to a medium or coarse ringed-cluster is the sphere whose center is the mean of the ringed-cluster and whose radius is the possibility radius of that ringed-cluster. In general, in order to take into account the fact that the reference set R is not all-inclusive, the possibility bound of a medium or coarse ringed-cluster is set, during the cluster post processing stage, to a value slightly higher than its possibility radius.

Thus, the possibility spheres used during classification are slightly larger than the "strict" possibiliity spheres created by this medium ringed-cluster generation technique.

The medium possibility spheres are used during the classification of unknown characters to filter out candidates, since if the unknown character feature vector lies outside all of the possiblity spheres associated with the medium ringed-clusters for a selected candidate, it is deemed impossible for the selected candidate to be the unknown character.

Note that, like fine ringed-clusters, medium ringed-clusters have values for the certainty-bound and confidence-bound fields. Medium ringed-clusters also, during classification, serve the functions of fine ringed-clusters in that they can be used to classify unknown input feature vectors with certainty or to assign confidence values.

In one embodiment of this invention, for the sake of minimizing computation time during this preprocessing of reference data and also to minimize the amount of memory required to store fine means, medium means, and coarse means, the medium means are selected from the already formed set of fine means. In this event the fields alien distance, bad segment distance, mean, label, confidence bound, and confidence radius, are copied to the medium ringed-cluster from the corresponding fine ringed-cluster. The possibility radius is computed by this medium ringed-cluster generation technique, and the possibility bound is filled during the cluster-post-processing stage.

Figure 7:
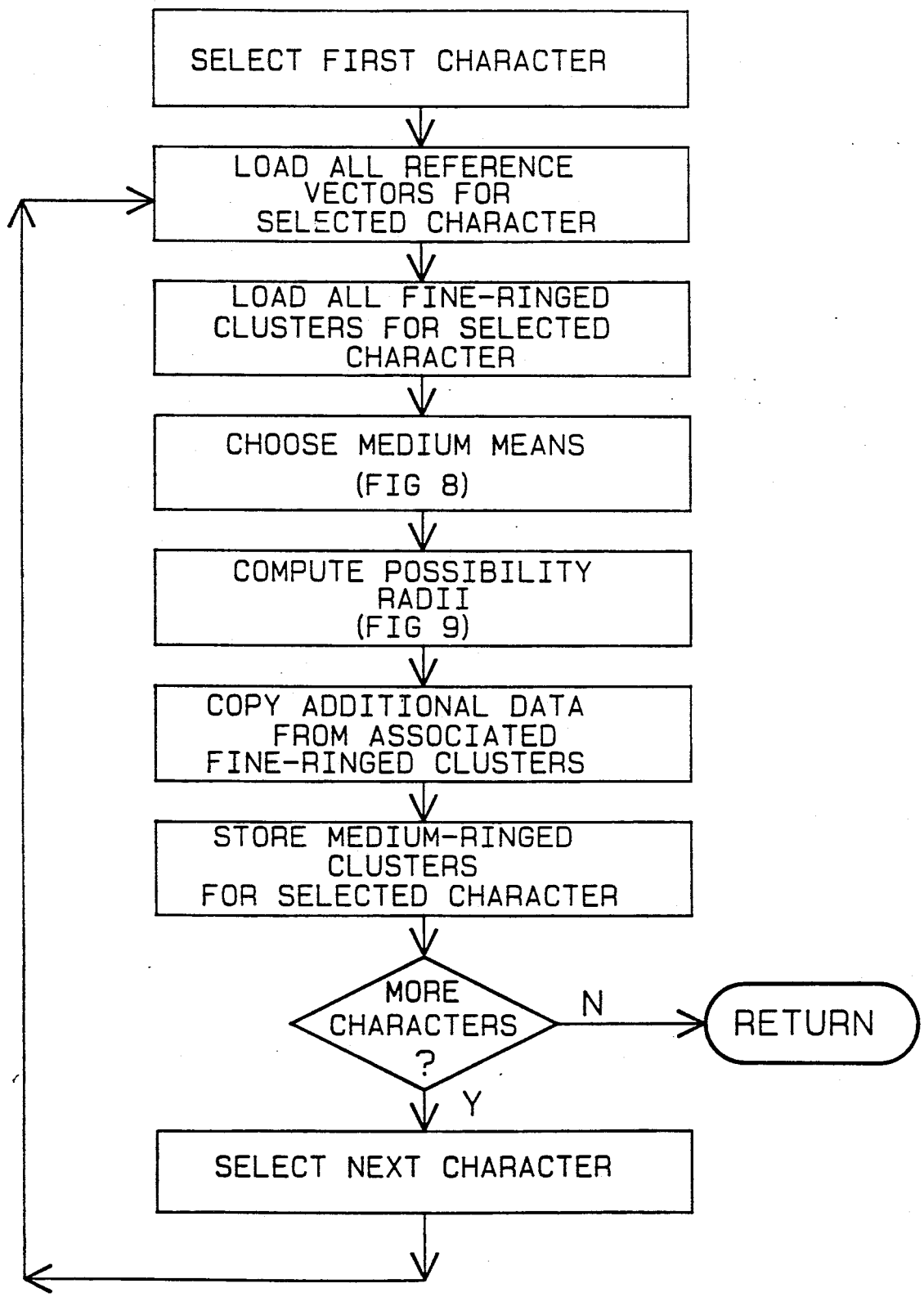
FIG. 7 is a flowchart depicting one embodiment of a technique for creating a list of king candidates as used in fine ringed cluster generation.

FIG. 7 is a flowchart depicting the medium ringed-cluster generation technique. During the medium ringed-cluster cluster generation technique, each character has its medium ringed-cluster generated in turn. Thus, initially, the first character to have its medium ringed-clusters generated is selected. All reference vectors for the selected character are then located into memory from the reference data file. Next, all fine ringed-clusters for the selected character are loaded into memory from a data file previously generated during the fine cluster generation operation. Next, the medium means are selected, as described more fully below with reference to FIG. 8. As previously described, each medium mean selected is chosen as the mean of an already existing fine ringed-cluster for the selected character. Also as previously described, in one embodiment of this invention, at most six such medium means are selected for each selected character. Next, the possibility radii are computed, one possibility radius for each medium mean as is described more fully below with reference to FIG. 9. Additional data, such as the confidence radius, alien distance, and bad segment distance, are copied into the data structure forming the medium ringed-clusters from the associated fine ringed-clusters. The medium ringed-clusters thus formed for the for the selected character are then stored in a data file for later use. The fine ringed clusters which have just been reassigned as medium ringed clusters are deleted from the file of fine ringed clusters. If there are additional characters which require the formation of medium ringed-clusters, the next character is selected and this operation reiterates beginning with the step of loading all feature vectors contained in the reference data set which represent the newly selected character.

Choose Medium Means

Given a medium "strict" possibility sphere, its "alien overlap", as depicted in FIG. 2b, is defined by:

$$\text{alien overlap} = \text{possibility radius} - \text{alien distance},$$

where possibility radius is the radius of the "strict" possibility sphere and alien distance is the distance from the means of the "strict" possibility sphere to its nearest alien. If the possibility radius is less than the alien distance, the alien overlap for that "strict" possibility sphere is defined as 0.

The operation of choosing the medium means requires a number of iterations. During a given iteration, a value is set for the "allowed alien overlap". An attempt is made to find a small set of "strict" possibility spheres with the following properties:

1) the "strict" possibility spheres cover the space of all reference vectors for the selected character.

2) The alien overlap of each "strict" possibility sphere does not exceed the value set in the current iteration for the allowed alien overlap.

A reference vector for the selected character is said to be protected, during a given iteration, by a medium mean candidate if $$\text{distance (mean, vector)} < \text{alien distance} + \text{allowed alien overlap}$$

where alien distance is the distance from the mean to its nearest alien. Note that the definition of "protected" as used in conjunction with this medium ringed-cluster generation technique is similar to but not the same as the definition of "protected" used in conjunction with the fine ringed-cluster generation technique.

Figure 8:
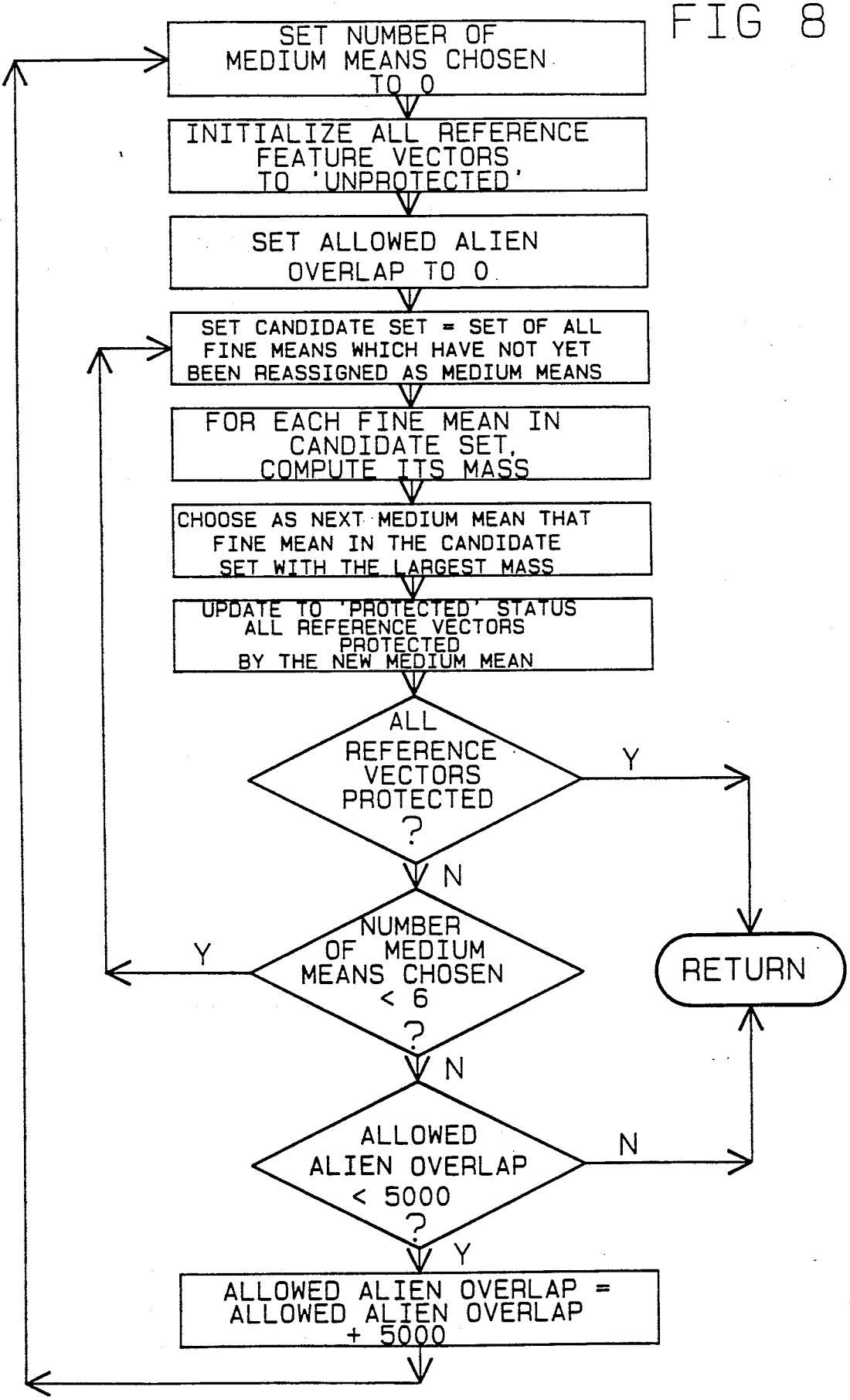
FIG. 8 is a flowchart depicting one embodiment of a medium ringed cluster generation technique as used in accordance with the teachings of this invention.

FIG. 8 is a flowchart depicting an algorithm suitable for use in selecting the medium means. Initially, the number of medium means chosen is initialized to zero. Next, all feature vectors contained in the reference data set which represent the selected character are initialized to the "unprotected" state. The allowed alien overlap distance is then set equal to zero.

As shown in FIG. 8, a candidate set is established to contain all fine means for the selected character which have not yet been reassigned (i.e. copied) as medium means. The mass of each medium mean candidate, i.e. of each fine mean contained in the candidate set just created, is then computed. As used in conjunction with this medium ringed-cluster generation technique, the "mass" of a medium mean candidate is the number of as yet unprotected reference vectors for the selected character which would be protected by that medium mean candidate. This definition of mass differs from the definition of kingdom mass, used in conjunction with the fine ringed-cluster generation technique, only in that the underlying definitions of "protected" differ.

After the mass of each medium mean candidate is computed, the next medium mean is chosen as that medium mean candidate which has the largest mass. With this next medium mean chosen, all reference feature vectors which are protected by this new medium mean are updated to the "protected" state. If all reference feature vectors for the selected character are protected, the operation of the choose medium means operati   is complete, and a return is made to the medium ringed-cluster operation of FIG. 7. Conversely if there remain reference vectors to be protected, and the number of medium means so chosen is less than, for example six, the choose medium means operation reiterates beginning with the step of setting the candidate set equal to the set of all fine means which have not yet been reassigned as medium means. On the other hand, if the number of medium means chosen is not less than six, it is determined if the maximum alien overlap is less than, for example, 5,000. If so, the maximum alien overlap is incremented, for example, by 1,000, and the choose medium means operation is repeated beginning with the step of setting the number of medium means chosen equal to zero. In this manner, another attempt is made to form a relatively small number of medium ringed-clusters, although more aliens will be included in the newly created medium "strict" possibility spheres.

On the other hand, if the maximum alien overlap is not less than 5,000, the medium means so chosen is used as is, and any unprotected reference feature vectors become protected during the compute possibility radii operation (discussed later). It is desired to keep the maximum alien overlap relatively small in order to prevent a large number of aliens from being included in the medium "strict" possibility spheres. A return is then made to the medium cluster operation of FIG. 7.

Compute Possibility Radii

Figure 9:
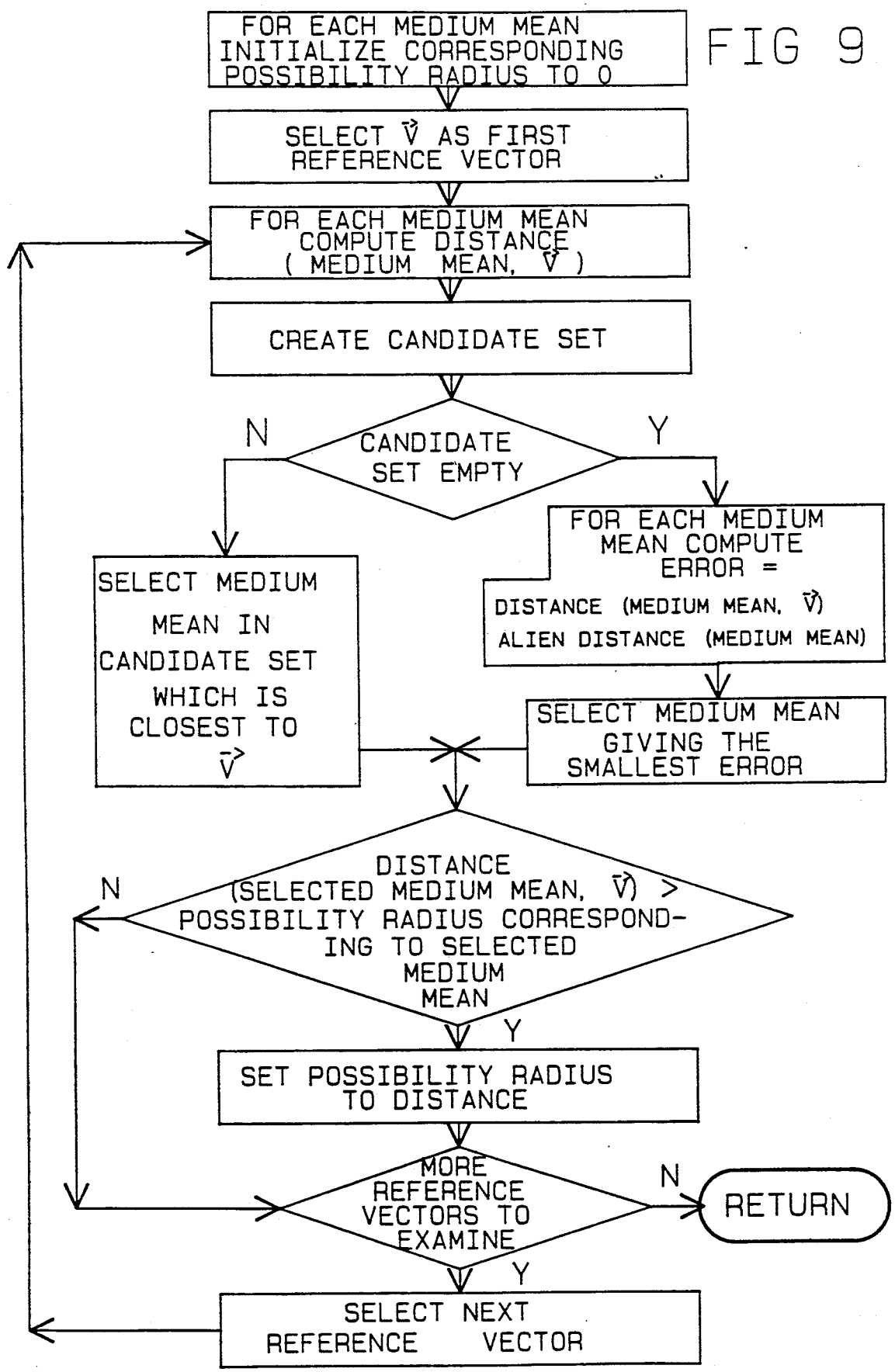
FIG. 9 is a flowchart depicting one embodiment of a technique for selecting medium means.

FIG. 9 is a flowchart depicting one embodiment of the compute possibility radii operation. First, for each medium mean formed by the choose medium means operation of FIG. 8, the corresponding possibility radius is initialized to zero. Next, the first reference feature vector of the selected character from the set of reference data is selected for assignment to one of the medium means. This assignment is first performed by computing the distance between the selected reference feature vector and each medium mean. A candidate set is then established to be the set of all medium means for which the distance so calculated is less than the alien distance of that medium mean. Next it is determined if the candidate set is empty. If so, for each medium mean, an error is calculated as being equal to the difference between the distance between the medium mean and the selected reference feature vector and the alien distance of that medium mean. The selected medium mean is set equal to that medium mean having the smallest error so calculated. Conversely, if the candidate set is not empty, the selected medium mean is set equal to that medium mean in the candidate set which is closest to the selected reference feature vector.

In either event, it is now determined if the distance between the selected medium mean and the selected reference feature vector is greater than the possibility radius corresponding to the selected medium mean. If so, the possibility radius corresponding to the selected medium mean is updated to equal the distance between the selected medium mean and the selected reference feature vector. If there are no reference feature vectors remaining to be examined, a return is made to the medium ringed-cluster generation operation of FIG. 7. Conversely, if there are additional reference feature vectors remaining to be examined, the next reference feature vector is selected and the compute possibility radii operation is reiterated beginning with the step of computing the distance between each medium mean and the newly selected reference feature vector.

Coarse Ringed-Cluster Generation Operation

The purpose of the coarse ringed-cluster generation operation is to construct, for each class of reference characters (such as all lower case "e") which are contained within the reference data, one coarse ringed-cluster. The fields of this coarse ringed-cluster which are used during classification are:

mean
label
certainty bound
possibility bound

As is discussed in conjunction with the fine and medium ringed-cluster generation techniques, in one embodiment the alien distance and bad segment distance fields are also used during classification.

The "strict" possibility sphere corresponding to the coarse ringed-cluster for the selected character has the property that every reference feature vector for the selected character lies within that "strict" possibility sphere. As mentioned in the discussion of the medium ringed-cluster generation operation, the "strict" possibility sphere corresponding to a coarse ringed-cluster is the sphere whose center is the mean of the ringed-cluster and whose radius is the possibility radius of that ringed-cluster. However, unlike the "strict" possibility spheres corresponding to medium ringed clusters, this "strict" possibility sphere may have a large degree of overlap with the alien subspace.

During the cluster post processing stage, the possibility bound of each coarse ringed-cluster is set to a value slightly larger than the possibility radius. As earlier discussed, the possibility sphere corresponding to a coarse ringed-cluster is the sphere whose center is the mean of the ringed-cluster and whose radius is the possibility bound of that ringed-cluster. The coarse possibility sphere is used during classification to filter out character candidates, since if the unknown character feature vector lies outside the coarse possibility sphere for a selected candidate, it is deemed impossible for the selected candidate to be the unknown character.

Note that, like fine ringed-clusters, coarse ringed-clusters have values for the certainty-bound field and thus coarse ringed-clusters, during classification, also serve the function of fine ringed-clusters in that they can be used to classify unknown input feature vectors with certainty. However, in one embodiment of the classification method of this invention, they are not used to assign confidence values.

For each character, the values of its coarse ringed-cluster are set as follows.

mean

The set of all references for the selected character are loaded into memory. The vector-mean of this set is then computed. The distance from this vector-mean to each of the reference vectors for the selected character is computed, and the mean of the coarse ringed-cluster is chosen as that reference vector closest to the vector-mean.

certainty bound certainty bound = (certainty factor × alien distance), where alien distance is the distance from the selected mean to its nearest alien, and certainty factor is a number between 0 and 1, as previously described.

possibility radius

The distance from the mean of the coarse ringed-cluster to each of the reference vectors for the selected character is computed. The possibility radius is set to the largest such distance.

Cluster Post Processing

After the fine, medium, and coarse ringed-clusters are created, values are set for confidence bounds of fine and medium ringed-clusters, possibility bounds of coarse ringed-clusters, and possibility bounds of medium ringed-clusters.

Setting Confidence Bounds

As earlier described, the "territory" assigned to each character by the fine ringed-cluster generation technique is the union of that character's fine certainty spheres. Each character's territory is constructed so as to contain all reference feature vectors for that character. Since some of the fine ringed-clusters are reassigned as medium ringed-clusters during the medium ringed-cluster generation technique, the "territory" corresponding to a character is redefined as the union of that character's fine and medium certainty spheres.

The compute confidence bounds operation sets a confidence bound value for each fine and medium ringed-cluster. This is done with the following goals, in order of decreasing importance.

For each character, all feature vectors for that character which do not lie in that character's territory should lie in at least one of that character's confidence annuli. The union of a character's confidence annuli is referred to as that character's "shoreline". Referring to FIG. 2a, the confidence spheres are indicated by the dotted circles. The shoreline is indicated by the shaded region. The reason for this first goal is its impact on classification. If, for example, a feature vector representing a lower-case "e" is input to the classification module, then even if that feature vector does not lie in the "e" territory, it may still be classified correctly if it lies in the "e" shoreline.

As discussed earlier in conjunction with the fine ringed-cluster generation technique, if the reference set R contained all possible character feature vectors, then each territory would contain all possible feature vectors for the given character, no feature vectors for aliens, and correct classification would always be guaranteed. The shoreline is necessary only because the reference set R is not all-inclusive. The size of the shoreline depends on how complete R is. That is, if the reference set R is a very good approximation to an all-inclusive reference set, it is not necessary to have a very wide shoreline.

In order to determine how complete the reference set R is, a second test reference set T is used. This second reference set is a single character reference set created from digitized pages different from the pages used to create the original single character reference set R. For each character, this test reference set is used to measure how well that character's territory covers the set of all possible feature vectors for that character. That is, if many test feature vectors for the selected character lie far from that character's territory, then it is concluded that the original reference set R was deficient in approximating the set of all possible feature vectors for the selected character, and relatively large values are assigned to that character's confidence bounds, giving that character a "wide shoreline".

b. In one embodiment, the classification module attempts to determine if the unknown input character is "bad". If the feature vector corresponding to a "bad" segment is input to the classification module, and if that input vector does not lie inside any character's shoreline or territory, then it is concluded by the classification module that the unknown input character is "bad". Thus, the second goal is that for each character, its shoreline contain as few bad segment feature vectors as possible.

c. The third goal is that each character's shoreline contain as few alien feature vectors as possible in order to reduce the risk of misclassification.

Figure 10A:
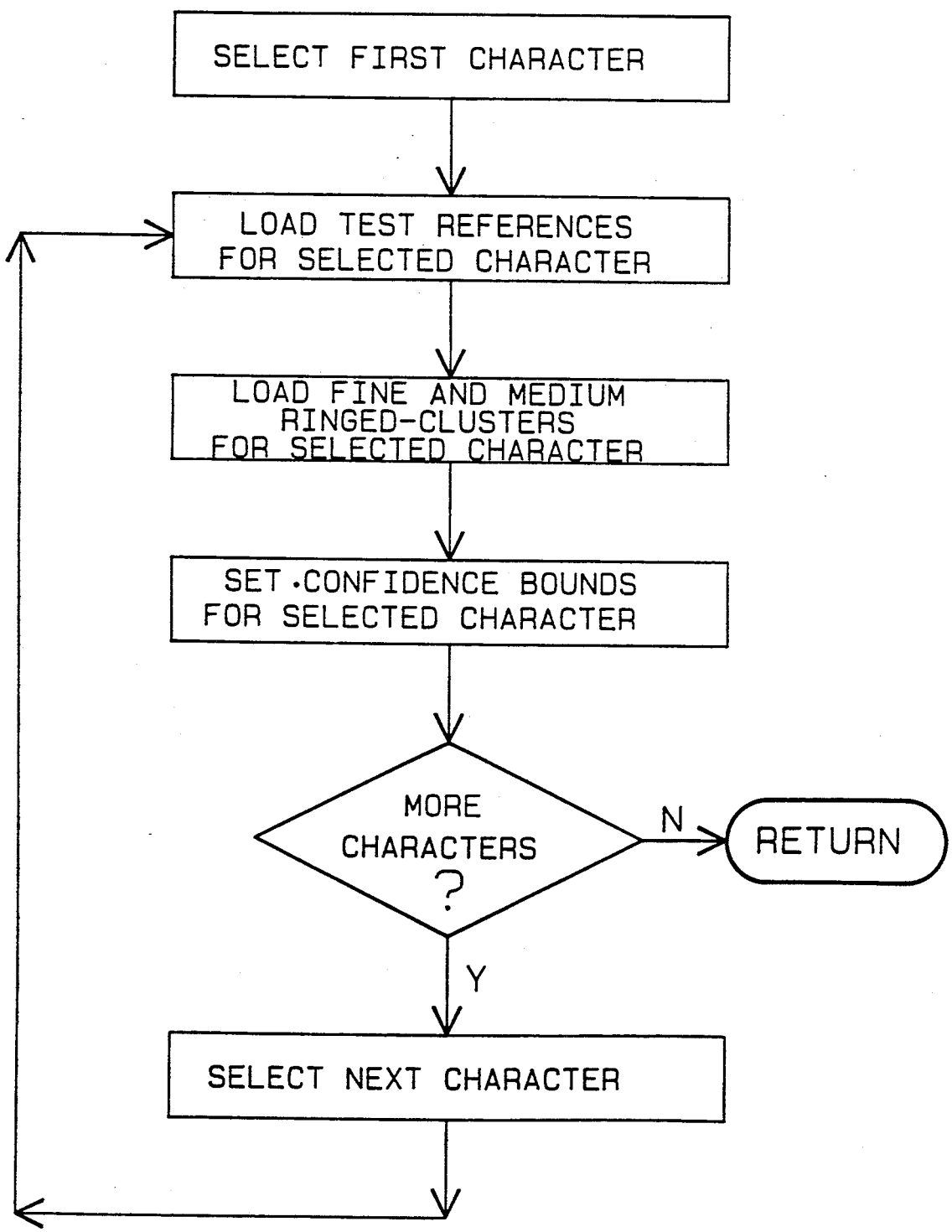
FIGS. 10a through 10d are flowcharts depicting the operation of calculating specific information associated with ringed clusters.

FIG. 10a is a flowchart illustrating the operation used to set confidence bounds. The first step is to select the first character to be examined. Next, all reference vectors from the test reference set T which are labeled as the selected character, are loaded into memory. Next, all medium and fine ringed-clusters corresponding to the selected character are loaded into memory.

The next step is to set a value for the confidence bound of each fine and medium ringed-cluster for the selected character. Three different techniques independently capable of setting these values are discussed later with reference to FIGS. 10b, 10c, and 10d. In all three cases, the confidence bound of each fine and medium ringed-cluster is set using the certainty radius of that ringed-cluster. As was described in conjunction with the fine ringed-cluster generation technique, the certainty radius (as opposed to the certainty bound) of a ringed-cluster is the radius of the smallest sphere, centered at the mean of the ringed-cluster, that contains all of the reference vectors in the set R for the selected character which are "protected" by that mean. In the techniques that are later described with reference to the flowcharts of FIGS. 10b and 10c the test reference set T is used to extrapolate, for each selected character, a single increment constant. This increment constant is used, in conjunction with the certainty radii, to set the confidence bounds by the equation $$\text{confidence bound} = \text{certainty radius} + \text{increment constant}$$

If this confidence bound value is less than the certainty bound, the confidence bound is reset to the certainty bound. Thus, for the techniques described in FIGS. 10b and 10c, the confidence sphere corresponding to a fine or medium ringed-cluster is at least as large as its certainty sphere and is, in general, set by expanding the "strict" certainty sphere by a uniform amount. As used in this specification, the "strict" certainty sphere corresponding to a ringed-cluster is the sphere whose center is the mean of the ringed-cluster and whose radius is the certainty radius (as opposed to certainty bound) of that ringed-cluster. The third technique depicted in FIG. 10d is similar to the first two, except that instead of using a single increment constant for each character, it uses three increment constants.

After the confidence bounds for the selected character are set, it is next determined if there are more characters to examine. If not, the operation of setting the confidence bounds is complete. If there are more characters to examine, the next character is selected and the operation reiterates beginning with the step of loading the test references for the selected character into memory.

Setting Confidence Bounds For Selected Character: Technique #1

Figure 10B:
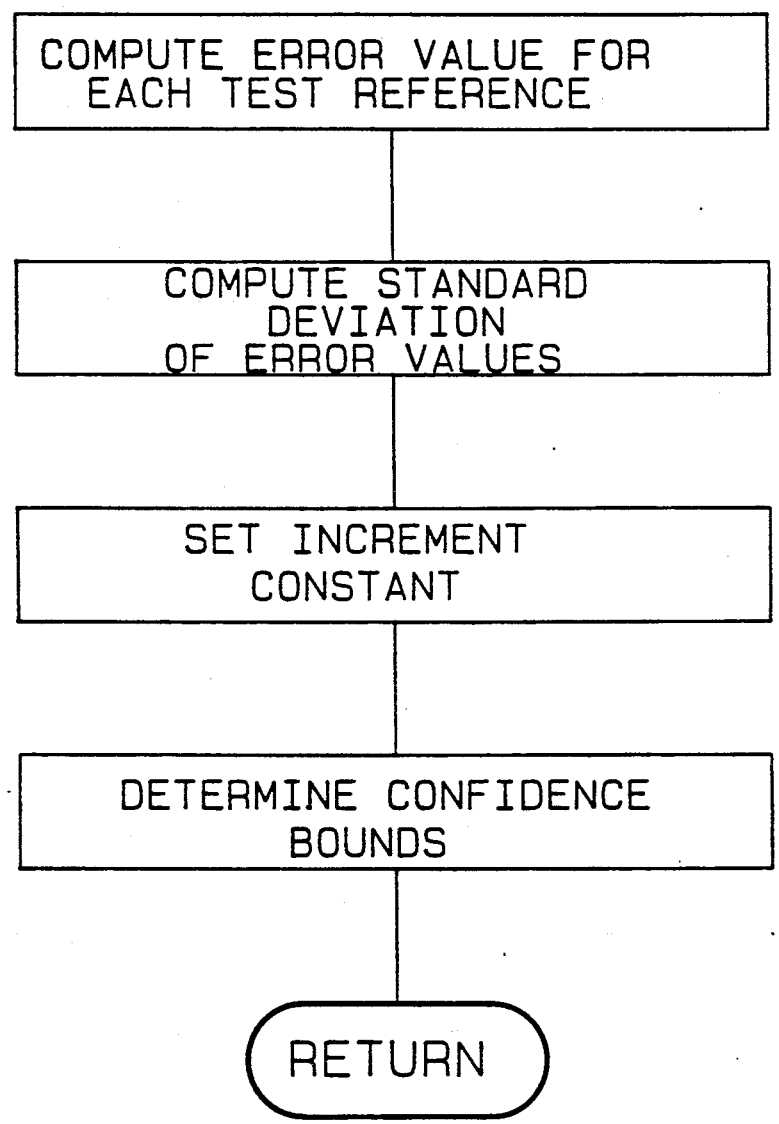

FIG. 10b depicts one embodiment for setting the confidence bounds for the selected character. The first step is to compute an error value for each test reference vector for the selected character. For each selected test reference vector, its corresponding error value is computed as follows. If the selected test reference vector lies inside the selected character's territory, that is if for some fine or medium ringed-cluster, the distance from the selected test reference vector to the mean is less than the certainty bound, then the error value for that selected test reference vector is set to 0. Otherwise the distance from the selected test reference vector to each fine or medium "strict" certainty sphere is computed by the equation distance=distance (test vector, mean)−certainty radius The error value for the selected test reference vector is set to the smallest such distance.

Next, the standard deviation of the non-zero error values is computed. The increment constant value is then set to some multiple of the standard deviation. In one embodiment, the increment constant value is set to three times the standard deviation. In a second embodiment, larger multiples are used for common characters than are rare characters. For example, if the selected character is "e", then the multiple used is three; if the selected character is "j", then the multiple used is two.

After the increment constant is set, the confidence bound field of each fine and medium ringed-cluster for the selected character is set by the equation confidence bound=max (certainty radius+increment constant, certainty bound)

Setting Confidence Bounds For Selected Character: Technique #2

Figure 10C:
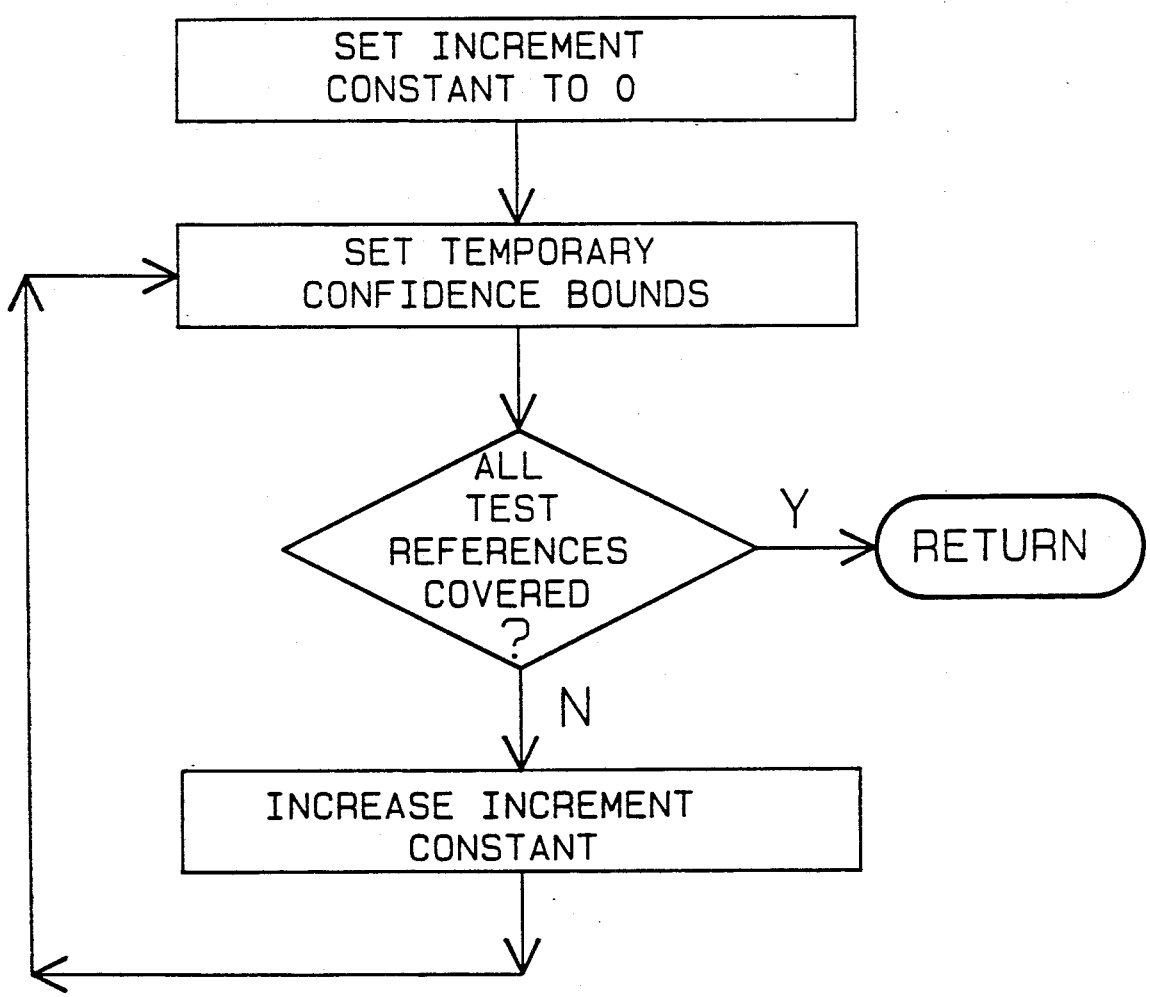
Figure 10D:
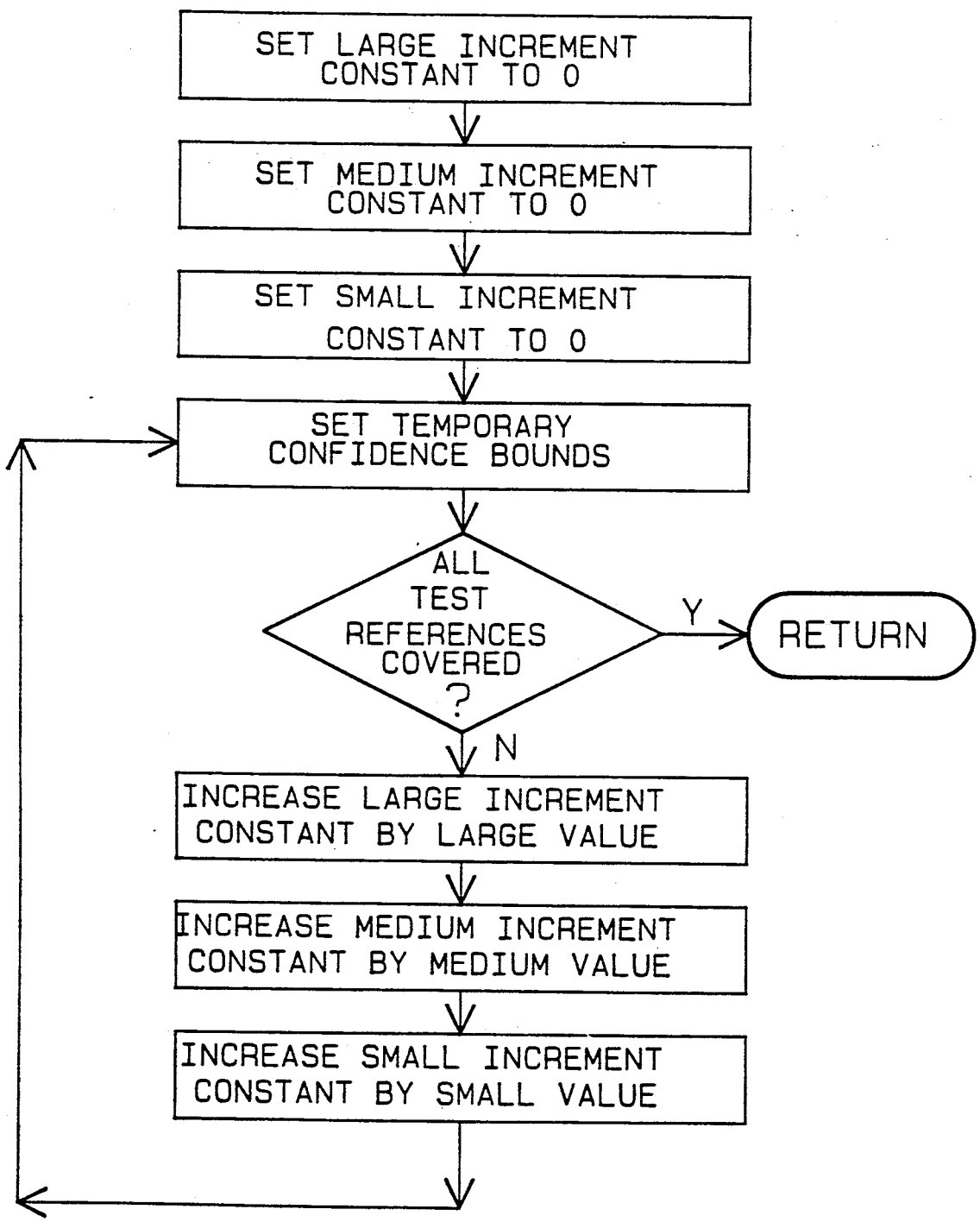

The second method for setting the confidence bounds for the selected character is depicted in the flowchart of FIG. 10c. Rather than using the standard deviation to set an increment constant value, this technique uses a non-parametric iterative method.

The first step is to set the increment constant to 0. Next, the increment constant is used to set a temporary value for each confidence bound using, as before, the equation confidence bound=max (certainty radius+increment constant, certainty bound)

Next it is determined if the test reference vectors for the selected character are covered. That is, it is determined if all test reference vectors for the selected character lie inside at least one confidence sphere. If so, the current temporary confidence bounds become permenant and the operation is complete. If not all test reference vectors are covered, the increment constant is increased by some preset amount (in one embodiment, 1000) and the operation reiterates beginning with the step of setting temporary confidence bounds, using the new increment constant.

Setting Confidence Bounds For Selected Character: Technique #3

The third method for setting the confidence bounds for the selected character is depicted in the flowchart of FIG. 10d. As discussed earlier, there are three goals in setting the confidence bounds:

a. cover all possible feature vectors for the selected character b. overlap the bad segment subspace as little as possible.

c. overlap the alien subspace as little as possible.

Though this first goal is still considered the most important, the second two goals are given more importance in this third technique than they were given in the two techniques described above.

This third technique is similar to the second technique described above, except that instead of using a single increment constant value to set the confidence bounds, it uses three increment constant values: the large, small, and medium increment constants.

The operation begins by initializing each of these three increment constant values to 0. Next, a temporary confidence bound value is assigned to each fine and medium ringed-cluster as follows. The temporary confidence bound value is first set to confidence bound=max (certainty radius+large increment constant, certainty bound)

If the resulting confidence sphere overlaps the alien subspace, that is if the confidence bound is greater than the alien distance for the give ringed-cluster, then the confidence bound is reset to confidence bound=max (certainty radius+medium increment constant, certainty bound)

If the resulting confidence sphere overlaps the bad segment subspace, that is if the confidence bound is greater than the bad segment distance for the given ringed-cluster, then the confidence bound is reset to confidence bound=max (certainty radius+small increment constant, certainty bound)

After a temporary confidence bound is assigned to each fine and medium ringed-cluster, it is next determined if all test reference vectors are covered, that is if all test reference vectors for the selected character lie in at least one of the fine or medium confidence spheres associated with the selected character. If so, the temporary confidence values become permenant and the operation is complete. If not all test reference vectors are covered, then each of the increment constants is increased. The large increment constant is increased by a large preset amount (in one embodiment, 1000). The medium increment constant is increased by a medium present amount (in one embodiment, 500). The small increment constant is increased by a small preset amount (in one embodiment, 250). The operation then reiterates beginning with the step of setting new temporary confidence bounds, using the new increment constants.

Setting Coarse Possibility Bounds

For each character, the possibility radius of its coarse ringed-cluster was determined, as earlier described, so that the correspor 'ing "strict" possibility sphere covered the set of all reference vectors in the set R for the selected character. Since the reference set R is not all-inclusive, the possibility bound of the coarse ringed-cluster is set to a value slightly larger than the possibility radius. That is, possibility bound = possibility radius + increment constant The increment constant is set, using either a parametric method similar to that described in conjunction with FIG. 10b, or a nonparametric method iterative method similar to that described in conjunction with FIG. 10c. In one embodiment, the increment constant used to set the possibility bound of a selected character's coarse ringed-cluster is dependent on the frequency in standard English usage of that selected character. For example, increment constant used for the "e" possibility bound is 3000; the increment constant for "j" possibility bound is 0.

Setting Medium Possibility Bounds

For each character, the possibility radii of its medium ringed-cluster were determined, as earlier described, so that the corresponding "strict" possibility spheres covered the set of all reference vectors in the set R for the selected character. Since the reference set R is not all-inclusive, the possibility bounds of the medium ringed-clusters are set to values slightly larger than the corresponding possibility radii. For each character, the test reference set T is used to extrapolate an increment constant in an iterative matter similar to that described earlier in conjunction with the flowchart of FIG. 10c. Each possibility bound for the selected character is then set by the equation possibility bound = possibility radius + increment constant

Classifying Unknown Input Characters After Preprocessing of Reference Data

The classification module produces, for each unknown input character, a possibility set which is a list of characters and associated confidences which the unknown character might be. Such possible characters are referred to in this specification as "character candidates." Generally, the possibility set contains a single character candidate, but it is possible for this possibility set to contain no character candidates or more than one character candidate.

A possibility set containing no character candidates, also referred to as a 'nonrecognition possibility set', indicates that the input character simply has not been recognized. In one embodiment of this invention, segments corresponding to nonrecognition possibility sets are, if desired, sent on for further processing. For example, further modules can be used to split segments corresponding to two or more characters (a 'join'), to filter out noise, or to glue together pieces of a character which are currently broken apart into more than one data segment (a 'split').

If no further processing is done on a segment corresponding to a nonrecognition possibility set, then this possibility set can, if desired, be sent on for postprocessing to, for example, a spelling corrector module which would use contextual information to replace the nonrecognition possibility set with a possibility set containing a single character candidate.

In one embodiment of this invention, the final text output corresponding to a nonrecognition possibility set is the '@' symbol so that a word processing operator can find all nonrecognized characters after the optical character recognition process is complete.

If the possibility set created contains more than one character condidate then, in one embodiment of this invention, the possibility set is sent on to other modules, such as a subline checker and context module, for post-processing, so that only one character candidate remains in the possibility set after this postprocessing is complete.

The possibility set created contains, in addition to a list of character candidates, a corresponding list of confidences which can be used to flag characters which were not recognized with certainty so that they can be examined by a word processing operator. The confidence values can also be used by the post processing modules described earlier to assist in choosing one of the character candidates.

Unknown input characters are classified using the precalculated coarse, medium, and fine ringed-clusters, earlier described. The classification module and clustering algorithms are designed to maximize the probability that the feature vector of the unknown input character falls inside the certainty sphere of at least one ringed-cluster. In this case, the unknown input is classified as the character candidate corresponding to that ringed-cluster. Typically, 97% of the unknown input characters are classified by certainty spheres. The classification module is designed to find such a certainty sphere as quickly as possible and to avoid examining as many ringed-clusters as possible. In one embodiment of this invention, there are 8000 ringed-clusters and typically 100 are examined for each unknown input. Thus classification is approximately 80 times faster than it would be if all ringed-clusters were examined.

For each unknown character to be classified, the input to the classification module is a feature vector and a geometry. The feature vector contains information defining selected features of the unknown character. Of importance, the technique of this invention operates properly regardless of how the feature vector is derived and what type of features are used to construct the feature vector. In one embodiment of this invention, the feature vector is formed as is disclosed in copending U.S. patent application Ser. No. 786,035 filed Oct. 10, 1985 on an invention of David Justin Ross, entitled "Feature Extraction Technique For Use In a Pattern Recognition System," which is hereby incorporated by reference.

Figure 11:
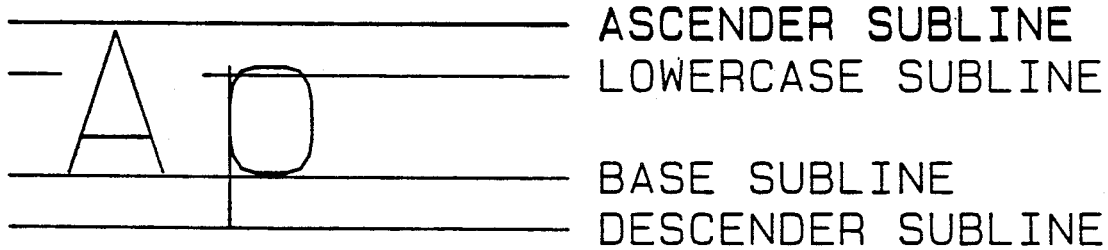
FIG. 11 depicts the ascender subline, lower subline, base subline and decenter subline associated with character information.

The geometry of the unknown character supplies the width and the height of the character, as defined by those "on" pixels forming the character, and subline information pertaining to the character. The subline information gives the distance from the top of the unknown character to each of the descender, base, lowercase, and ascender sublines. FIG. 11 depicts these sublines, and their relationships to various types of characters.

Figure 12:
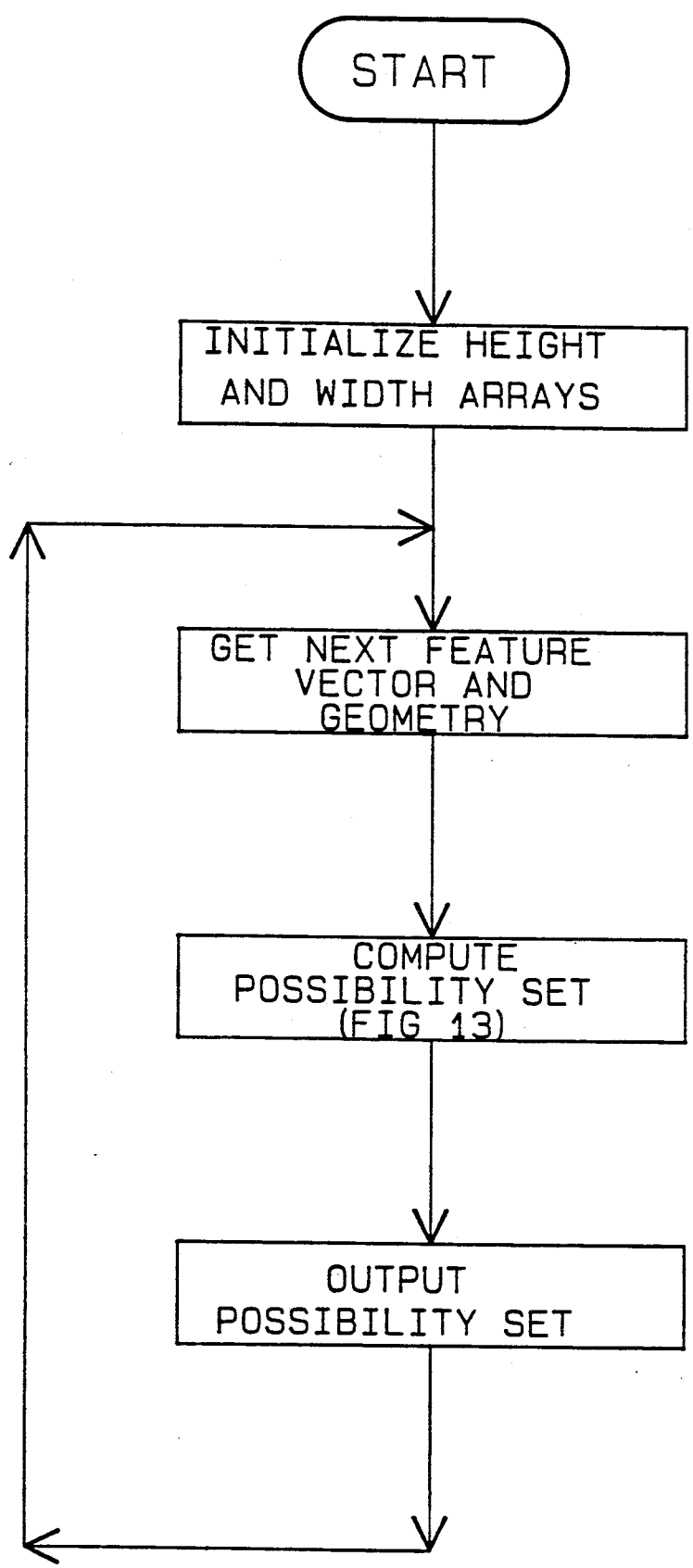
FIG. 12 is a flowchart depicting one embodiment of a character classification technique used in accordance with the teachings of this invention.

FIG. 12 is a flow chart depicting the classification module. The first step in the classification module is to initialize the height array and the width array. The height and width arrays are used during the bad segment check operation, discussed later in conjuction with the flow chart of FIG. 26, to assist in determining whether the unknown input character is, in fact, a single, properly segmented character. The height and width values for any given character candidate are the height and width, respectively, of the last input character that was recognized with certainty as the given character candidate. In one embodiment of this invention, the maximum possible height of an input character is 127 pixels, similarly the maximum possible width is 127 pixels. Each character candidate has its height and width values initialized to some number greater than 127, indicating that no input character has yet been recognized with certainty as that character candidate.

After this initialization step, the classification loop begins. The first step of the classification loop is to get both the geometry and feature vector of the unknown character. Next, the possibility set for the unknown character is created, as later described in conjunction with FIG. 13.

The last step is to output the possibility set to the next module for further processing and/or output to other circuitry as desired. The classification loop then reiterates by getting the geometry and feature vector for the next unknown character, computing the possibility set and outputting its possibility set.

Compute Possibility Set

Figure 13:
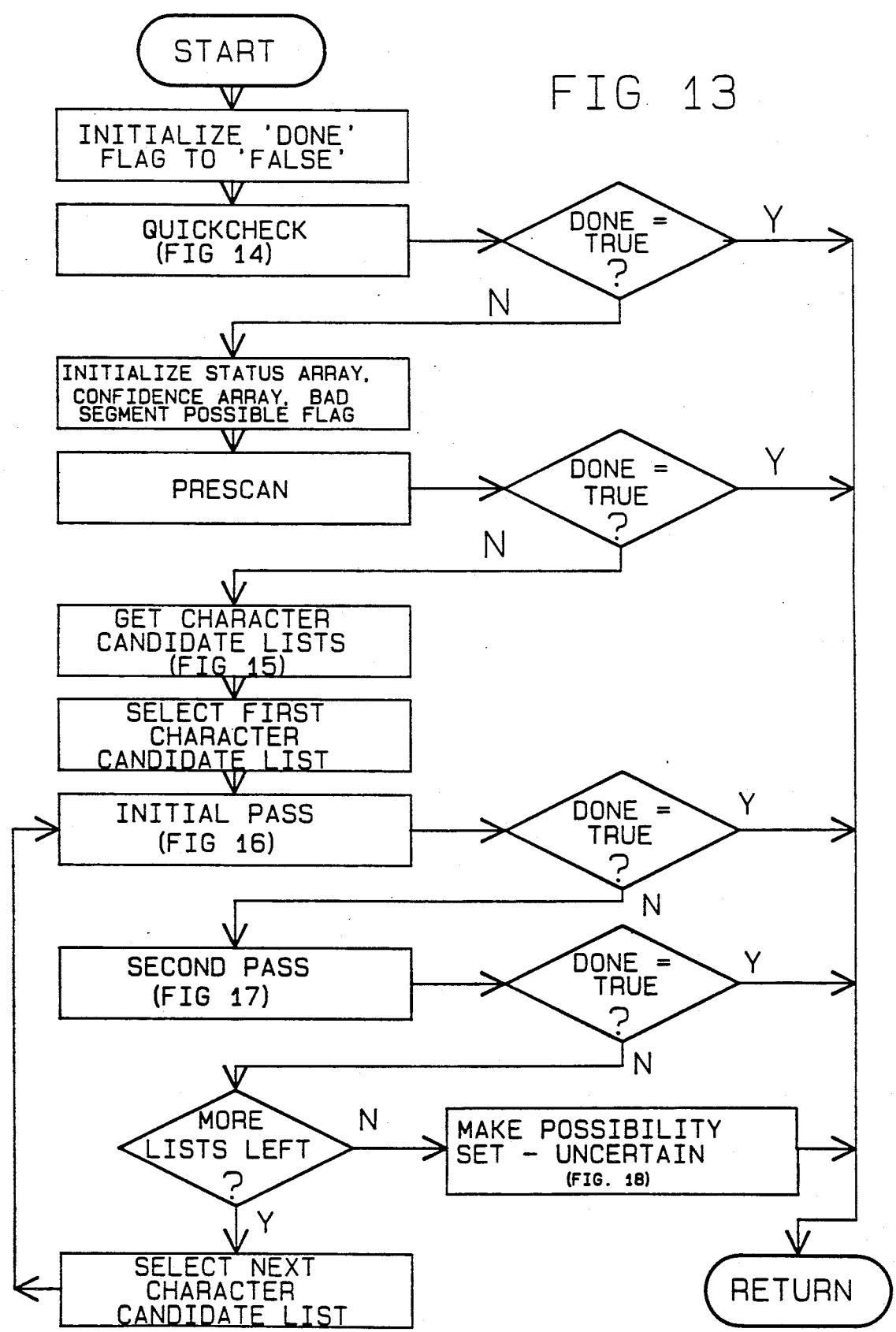
FIG. 13 is a flowchart of one embodiment of a technique for computing a possibility set in accordance with the teachings of this invention.

FIG. 13 is a flow chart depicting in more detail the compute possibility set operation of FIG. 12. The input to the compute possibility set operation is the feature vector and geometry of the unknown character. The first step is to initialize the 'done' flag to 'FALSE'. If, at any point during the compute possibility set operation, the done flag is set to 'TRUE', then this indicates that the unknown character has been recognized with certainty and a possibility set has been created. The compute possibility set operation is then complete.

The next step is the quickcheck operation. As is discussed below in conjunction with the flow chart of FIG. 14, the purpose of the quickcheck operation is to quickly classify the unknown character using information pertaining to input characters previously recognized with certainty. Processing time is greatly reduced by the quickcheck operation. If the quickcheck operation is successful in classifying the unknown character then a possibility set is created and the 'done' flag is set to 'TRUE'.

After the quickcheck operation is performed, the value of the 'done' flag is checked. If it is equal to 'TRUE', then the compute possibility set operation is complete and a return is made to the character classification operation of FIG. 12, which outputs the possibility set just created and reads in the feature vector and geometry of the next unknown character to be recognized. If, on the other hand, the 'done' flag is not equal to 'TRUE', then the next step is to initialize the status array, confidence array, and bad-segment-possible flag.

The status array is used during the compute possibility set operation of FIG. 13 to record, for each character candidate, its current status, which can take one of four possible values:

a. 'CERTAIN' The unknown input character has been classified with certainty as this character candidate.
b. 'POSSIBLE' It has so far been determined that it is possible that the unknown input character is this character candidate.
c. 'IMPOSSIBLE' It has been determined that it is impossible for the unknown character to be this character candidate.
d. 'UNKNOWN' No analysis has yet been done on this character candidate.

Each character candidate has its status value initialized to 'UNKNOWN'.

The confidence array is used during the compute possibility set operation to give, for each character candidate whose status is 'POSSIBLE', its current confidence value. In one embodiment of this invention, confidence values range from 1 to 254, with low confidence values corresponding to high confidence. The confidence value of 0 is reserved to indicate that the unknown character was classified with certainty. The confidence value of 255 is reserved to indicate that no confidence value has yet been assigned. Each character candidate has its confidence value initialized to 255.

The 'bad-segment-possible' flag is initialized to 'TRUE'. This flag may be modified by the coarse filter, medium filter, or fine analysis operations, described later. If the unknown character is not classified with certainty, the 'bad-segment-possible' flag is used by the bad-segment-check operation to assist in deciding whether the unknown character is, in fact, not a single, properly segmented character.

After the status array, the confidence array, and the 'bad-segment-possible' flag are initialized, the next step, in one embodiment of this invention, is the prescan operation. The purpose of the prescan operation is to afford the opportunity to modify the status values of character candidates by a simple decision procedure. In one embodiment, decision rules are established empirically, using the height, width, and subline information of the unknown character, to determine whether or not the unknown input is a period, comma, or dash. Following are two examples:

EXAMPLE #1:
Rule: If the height of the unknown character is less than 12, then the unknown character must be either a period, comma, or dash.

If the height of the given unknown character is, in fact, less than 12, then the prescan operation sets the status values of period, comma and dash to 'POSSIBLE' and all other status values to 'IMPOSSIBLE'. Note that this rule assumes a minimum point-size of the material being read.

EXAMPLE #2:
Rule: If the height of the unknown character is less than 11 and the aspect-ratio is greater than 1.7, then the unknown character must be a dash.

The aspect-ratio of a character is width/height. If, in fact, the height of the unknown character was less than 11 and its aspect-ratio at least 1.7, then the prescan operation sets the status value of dash to 'CERTAIN' and creates a possibility set containing dash.

In general, if the prescan operation sets the status value of a character to 'CERTAIN', then it also creates a possibility set containing that character and resets the value of the 'done' flag to 'TRUE'. This is the only step in the compute possibility set operation in which classification can take place without use of ringed-clusters. As illustrated above, if the prescan operation fails to set the status value of a character to 'CERTAIN', then it may still provide useful information by resetting some status values to either 'POSSIBLE' or 'IMPOSSIBLE'.

If, after the prescan operation, the 'done' flag is equal to 'TRUE', the compute possibility set operation is complete and a return is made to the compute possibility set operation of FIG. 13. Otherwise, if the 'done' fl is not equal to 'TRUE', further processing of the unknown character is performed.

As one novel feature of this invention, the first step of this further processing is to obtain one or more character candidate lists. The first list contains character candidates that are considered more likely to be the unknown character than those in the second list, etc. Within each list, the character candidates at the beginning of the list are considered more likely than those character candidates at the end of the list. Each list produced by the get character candidate lists operation (FIG. 15) is examined in turn. Examination terminates if a character candidate on a list is determined with certainty to be the unknown character. In this manner, the most likely character candidates are evaluated first, thereby speeding operation in the case that the unknown character is classified with certainty. This almost always is the case if the reference set used to generate ringed clusters is sufficiently complete.

Once the lists are obtained by the get character candidates lists operation, the first character candidate list is selected for evaluation. Evaluation begins with the initial pass operation.

The initial pass operation, described below in conjunction with FIG. 16, examines each character candidate on the selected character candidate list relatively quickly and modifies its status to either 'CERTAIN', 'POSSIBLE', or 'IMPOSSIBLE'. The initial pass operation serves to, if possible, filter out character candidates on the selected character candidate list and to classify the unknown input character with certainty.

If, for a given character candidate, the initial pass operation concludes that it is impossible for the unknown input character to be the character candidate, then the status value of that character candidate is changed to 'IMPOSSIBLE'. In this manner, some candidates on the selected character candidate list (in fact, most of the candidates on the list) are filtered out and therefore are not examined by the more time-consuming second pass operation, which is discussed below. If, for a given character candidate, the initial pass operation decides with certainty that the unknown input character is the character candidate, a possibility set is created containing that particular character candidate and the 'done' flag is set to 'TRUE'. For characters whose status value is set to 'POSSIBLE' by the initial pass operation, a corresponding confidence value, stored in the confidence array, is also assigned.

After the initial pass operation, if the 'done' flag is equal to 'TRUE', that is if the initial pass operation was successful in recognizing the unknown character with certainty, then the compute possibility set operation is complete and return is made to the character classification algorithm of FIG. 12. If, on the other hand, the 'done' flag is not set to 'TRUE', then the compute possibility set operation continues by performing a second pass operation on the selected character candidate list.

The second pass operation, described below in conjunction with FIG. 17, examines in depth each character candidate on the selected character candidate list whose status has not been changed to 'IMPOSSIBLE' by the initial pass operation. As with the initial pass operation, if the second pass operation concludes with certainty that the unknown character is a character candidate on the selected character candidate list, then a possibility set is created containing that character candidate and the 'done' flag is set to 'TRUE'. The confidence values of characters whose status is 'POSSIBLE,' may also be updated. Other characters may have their status updated to 'IMPOSSIBLE'.

Figure 18:
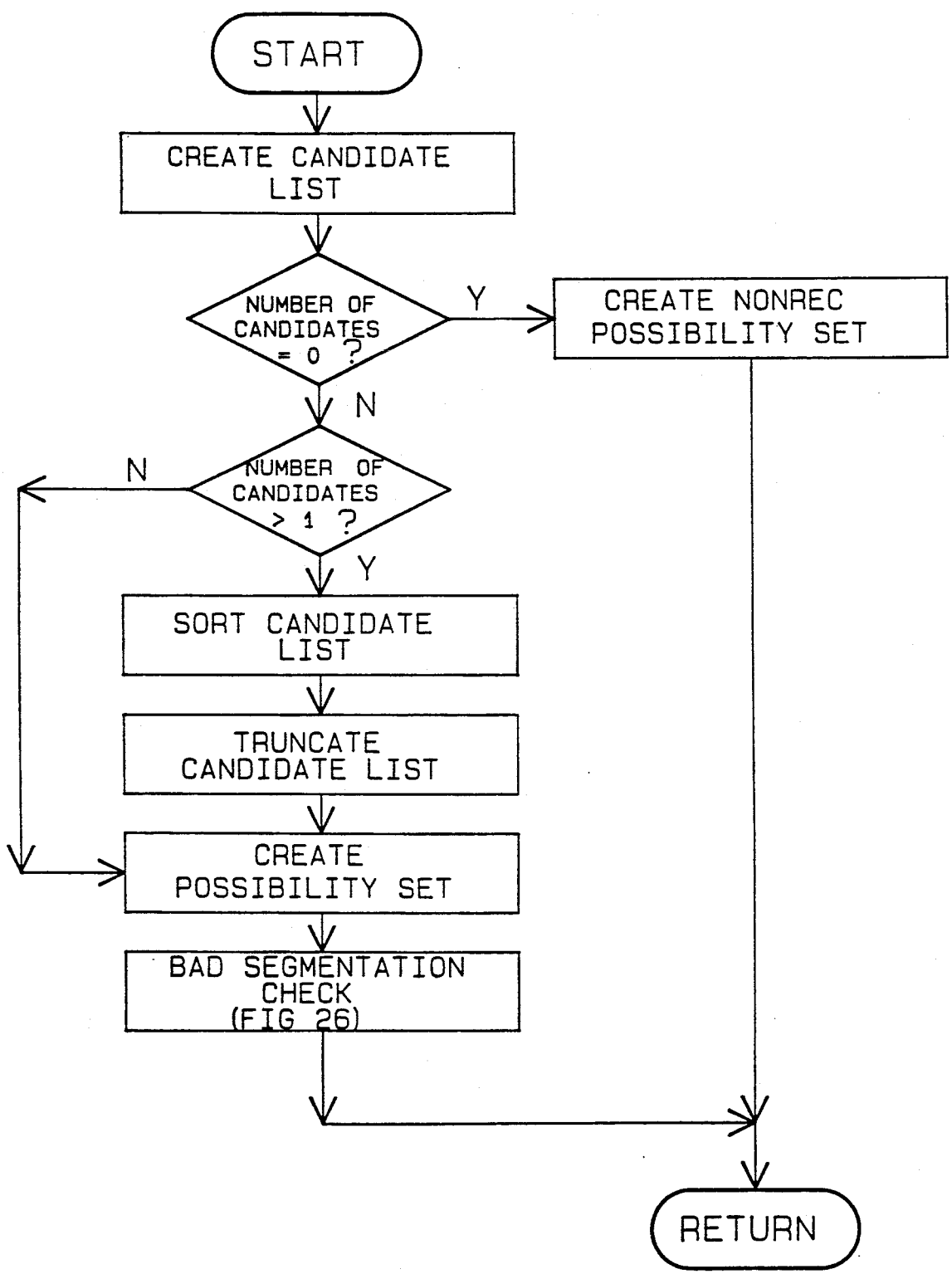
FIG. 18 is a flowchart depicting one embodiment of a technique for creating a possibility set containing uncertain characters in accordance with the teachings of this invention.

Examination of the selected character candidate list is complete after the second pass operation. If the 'done' flag is equal to 'TRUE', then the compute possibility set operation is complete and a return is made to the character classification algorithm of FIG. 12. If the 'done' flag is not set to 'TRUE', then none of the characters on the selected character candidate list is deemed 'CERTAIN'. If there are additional character candidate lists, the next list is selected and the operation is reiterated beginning with the initial pass on the newly selected character candidate list. On the other hand, if all character candidate lists have already been examined, then the unknown input character has not been recognized with certainty and a possibility set is created by the make possibility set-uncertain operation (FIG. 18).

Of importance, the make possibility set-uncertain operation does not necessarily include all character candidates whose status value is 'POSSIBLE'. The possibility set omits those character candidates having very low confidence as compared with other 'POSSIBLE' character candidates. In one embodiment of this invention, the make possibility set-uncertain operation also attempts to determine whether the unknown character is, in fact, not a single, properly segmented character and, if so, the unknown character is sent to other means, not shown, for further processing, such as noise removal and join-separation. After noise is removed from a character, the 'clean' character is then run through the compute possibility algorithm of FIG. 13. Similarly, after two or more characters have been separated, each of the separated characters is run through the compute possibility set algorithm of FIG. 13 in order to identify the now unjoined characters.

Quick Check

Figure 14:
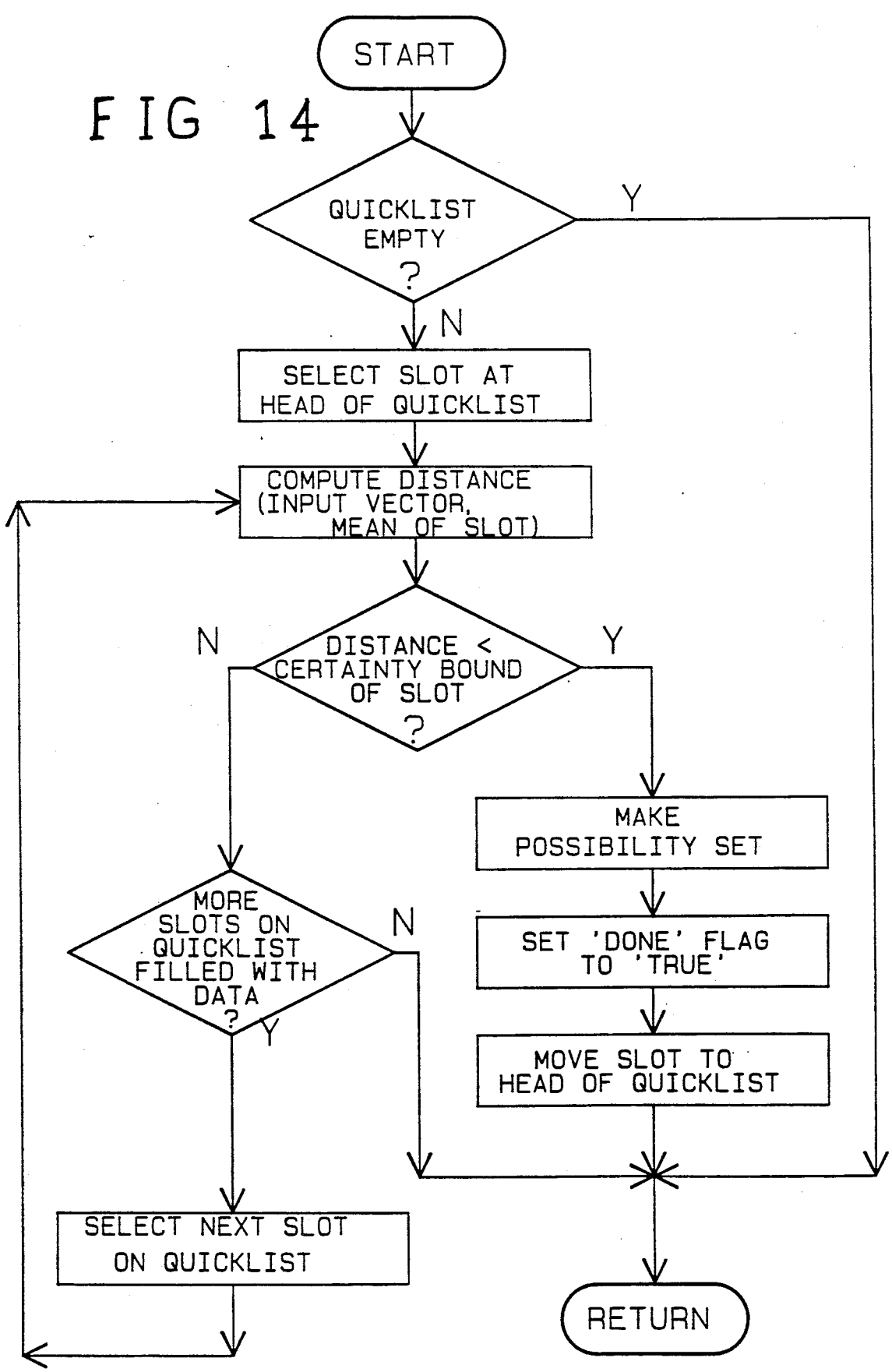
FIG. 14 is a flowchart of one embodiment of a "quick check" operation used to greatly enhance the speed of classifying unknown input characters.

The quickcheck subroutine, depicted in the flow chart of FIG. 14, attempts to quickly classify the current unknown character using information pertaining to input characters previously classified with certainty. If, for example, some "e" is recognized with certainty because it falls within the certainty sphere of a particular ringed-cluster, then if a second "e" is input which looks very similar to this first "e", as would be the case if they both came from the same type font, it is likely that the same ringed-cluster could be used to recognize this second "e" with certainty. The quickcheck operation makes use of this observation by using a list ("quicklist") of ringed-clusters which have been successful in classifying previous input characters with certainty.

Since the amount of data in the quicklist is relatively small, the quickcheck operation itself is very fast. Unless the input page is a ransom note, that is a page in which, for example, no two "e" images look very similar, the quickcheck operation will succeed in classifying most input characters with certainty. This is true even if the page has multiple fonts. Thus, the quickcheck operation greatly increases speed of recognition.

The quicklist is a circular buffer containing a plurality of slots. In one embodiment of this invention, there are 70 slots in the quicklist and each slot contains the following three items:

a. address location in memory of the mean of the ringed-cluster
b. certainty-bound of the ringed-cluster c. label (character candidate) of the ringed-cluster The quickcheck operation runs through the quicklist to see if, for any slot on the quicklist, the distance from the feature vector of the unknown character to the mean associated with that slot is less than the certainty bound associated with that slot. If so, the quickcheck operation has succeeded in classifying the unknown character with certainty.

The quicklist is updated as follows. Whenever an unknown input character is classified with certainty in the remainder of the computer possibility set algorithm of FIG. 13, the relevant information from the ringed-cluster used to identify the unknown character is placed at the head of the quicklist, with the previous data of the quicklist being pushed one slot further into the quicklist.

Note that this does not cause duplication in the quicklist. If a particular ringed-cluster is used in the remainder of the compute possibility set algorithm of FIG. 13 to classify an unknown character with certainty, then the relevant information pertaining to that ringed-cluster cannot already appear on the quicklist. Otherwise, the quickcheck operation would have been successful and the remainder of the compute possibility set algorithm of FIG. 13 not executed. The quicklist can also be updated by the quickcheck operation itself. If the unknown character is identified with certainty during the quickcheck operation, the data contained in the quicklist which has been used to identify the unknown character is moved to the head of the quicklist. In this manner, data pertaining to input characters most recently identified with certainty, whether in the quickcheck operation itself or elsewhere in the compute possibility set algorithm of FIG. 13, appears at the head of the quicklist and is checked first by the quickcheck operation. Note that since the quicklist is a circular buffer, as the quicklist fills data at the tail of the buffer is overwritten, i.e. is dropped from the quicklist. The data at the tail of the buffer, however, is data which has not recently been used to identify unknown input characters with certainty. If there is a type font change on the input page, then data pertaining to a previous type font tends to get dropped from the quicklist, as data pertaining to the new type font is added to the quicklist.

Referring to FIG. 14, quickcheck operation begins by checking to see if any entries have yet been made in the quicklist. If the quicklist is empty, the quickcheck operation terminates and returns to the compute possibility set operation of FIG. 13. Otherwise, the slot at the head of the quicklist is selected.

Next, the distance between the feature vector of the unknown character and the mean associated with the selected slot is computed. If that distance is less than the certainty bound associated with the selected slot, then the quickcheck operation has succeeded in classifying the unknown character with certainty. In this case, a possibility set is created containing the character candidate associated with the current slot, the 'done' flag is set to 'TRUE', the current (i.e. successful) slot is moved to the head of the quicklist, and a return is made to the compute possibility set algorithm of FIG. 13. Conversely, if the distance is not less than the certainty bound, then the quickcheck operation continues by checking to see if there are more slots on the quicklist filled with data to be examined.

If there are no more slots to be examined, then the quickcheck operation has not succeeded in classifying the unknown character and a return is made to the compute possibility set algorithm of FIG. 13. If there are more slots, then the next slot on the quicklist is selected and the operation reiterates, beginning with the step of computing the distance between the feature vector of the unknown character and the mean associated with the selected slot.

Get Character Candidate Lists

The get character candidate lists operation (FIG. 15) provides, for a given unknown character being examined, a series of one or more lists of character candidates to check. The first list contains character candidates that are considered more likely to be the unknown character than those in the second list, etc. Within each character candidate list, the candidates at the front of the list are considered more likely than those candidates at the end of the list. The purpose of ordering the character candidates to be examined by some measure of a priori probability is to increase recognition speed, since classification for the unknown character terminates as soon as its feature vector is found to fall inside a certainty sphere.

In one embodiment, the character candidate lists are prepared by considering subline type and frequency of occurrence in English usage. For a given unknown character, its geometry supplies the information necessary to categorize that unknown character by subline type. Referring to FIG. 11 and Table 2, below, there are nine possible character types, based on sublines.

TABLE 2

| Type of Character | UPPER SUBLINE | | | | LOWER SUBLINE | | | |
|---|---|---|---|---|---|---|---|---|
| | Ascender Line | Lower Case Line | Base Line | Descender Line | Ascender Line | Lower Case Line | Base Line | Descender Line |
| a | | X | | | | | X | |
| A | X | | | | | | X | |
| y | | X | | | | | | X |
| * (superscript) | X | | | | X | or X | | |
| * (subscript) | | | X | or X | | | | X |
| . (period) | | | X | | | | X | |
| - (hyphen) | | X | | | | X | | |
| Q | X | | | | | | .. | X |
| Miscellaneous (none of the above) | | | | | | | | |

For example, the subline type of a character whose upper subline is equal to the lowercase line and whose lower subline is equal to the base line is the "a" type.

For each subline type, a set of lists is prepared in advance and stored in memory. As an example, Table 3 shows the lists associated with the "a" subline type.

TABLE 3

| "a"-type list #1: | 'e' | 't' | 'a' | 'o' | 'i' | 'n' |
| | 's' | 'r' | 'c' | 'u' | 'm' | 'w' |
| | 'v' | 'x' | 'z' | ';' | ':' | |

TABLE 3-continued

"a"-type list #2:

| 'h' | 'l' | 'd' | 'f' | 'p' | 'g' |
|---|---|---|---|---|---|
| 'y' | 'b' | ':' | ';' | 'k' | 'T' |
| 'I' | 'A' | '.' | 'H' | '"' | 'M' |
| 'B' | 'W' | 'q' | 'J' | 'R' | 'N' |
| 'F' | 'E' | 'D' | 'L' | 'G' | 'J' |
| '2' | ')' | '(' | '?' | '9' | '5' |
| 'Y' | 'K' | '3' | '4' | '6' | '8' |
| '7' | '!' | '$' | 'Q' | '/' | '&' |
| 'ff' | 'fi' | 'fl' | 'ft' | 'ffi' | 'ffl' |
| '%' | ']' | '[' | '<' | '>' | '=' |
| '+' | '#' | '*' | '`' | ',' | '_' |
| '¦' | | | | | |

List number 1 contains those character candidates which have the "a" subline type. List number 2 contains all other character candidates. The character candidates within each list are ordered by frequency of English usage (or other languages of interest). In one embodiment, due to the possibility of error in the subline information, the get character candidate lists operation does not use subline information in order to rule out any character candidates. If, for example, the subline type of the unknown character is the "a" type, then list #1 above is first examined by the compute possibility set operation of FIG. 13. If no character candidate on this list is determined with certainty to be the unknown character, then list #2 above is examined, even though the subline type of the character candidates in list #2 does not match the subline type of the unknown character.

Figure 15:
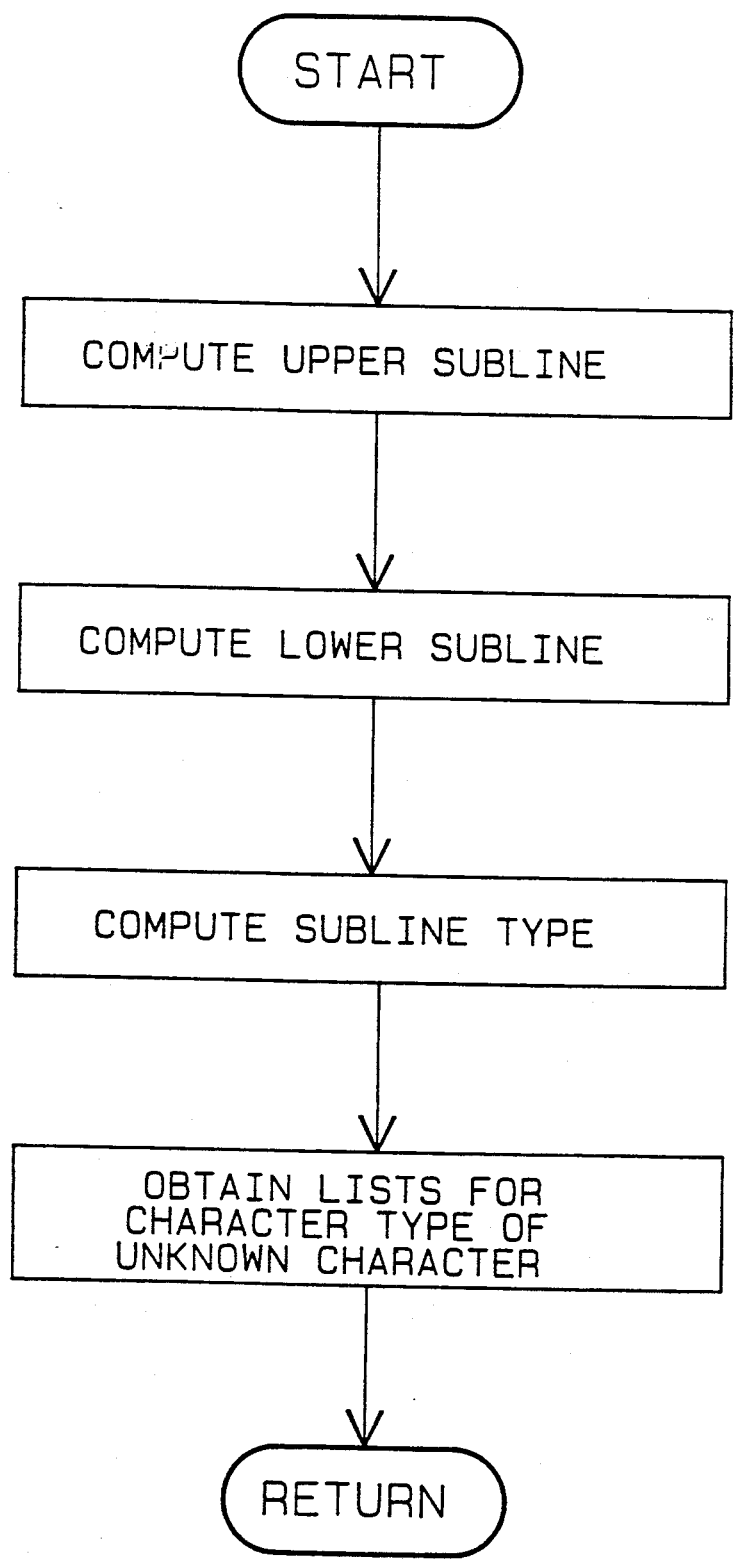
FIG. 15 is a flowchart depicting a "get list" operation of one embodiment of this invention.

FIG. 15 depicts one embodiment of the get character candidate lists operation. The first two steps are to compute the upper and lower sublines of the unknown character. This is computed using the subline information provided in the geometry of the unknown character, earlier described. Next the subline type of the unknown character is determined. The number of character candidate lists and the list of character candidates lists for each subline type have been precomputed and stored in memory.

Initial Pass

Figure 16:
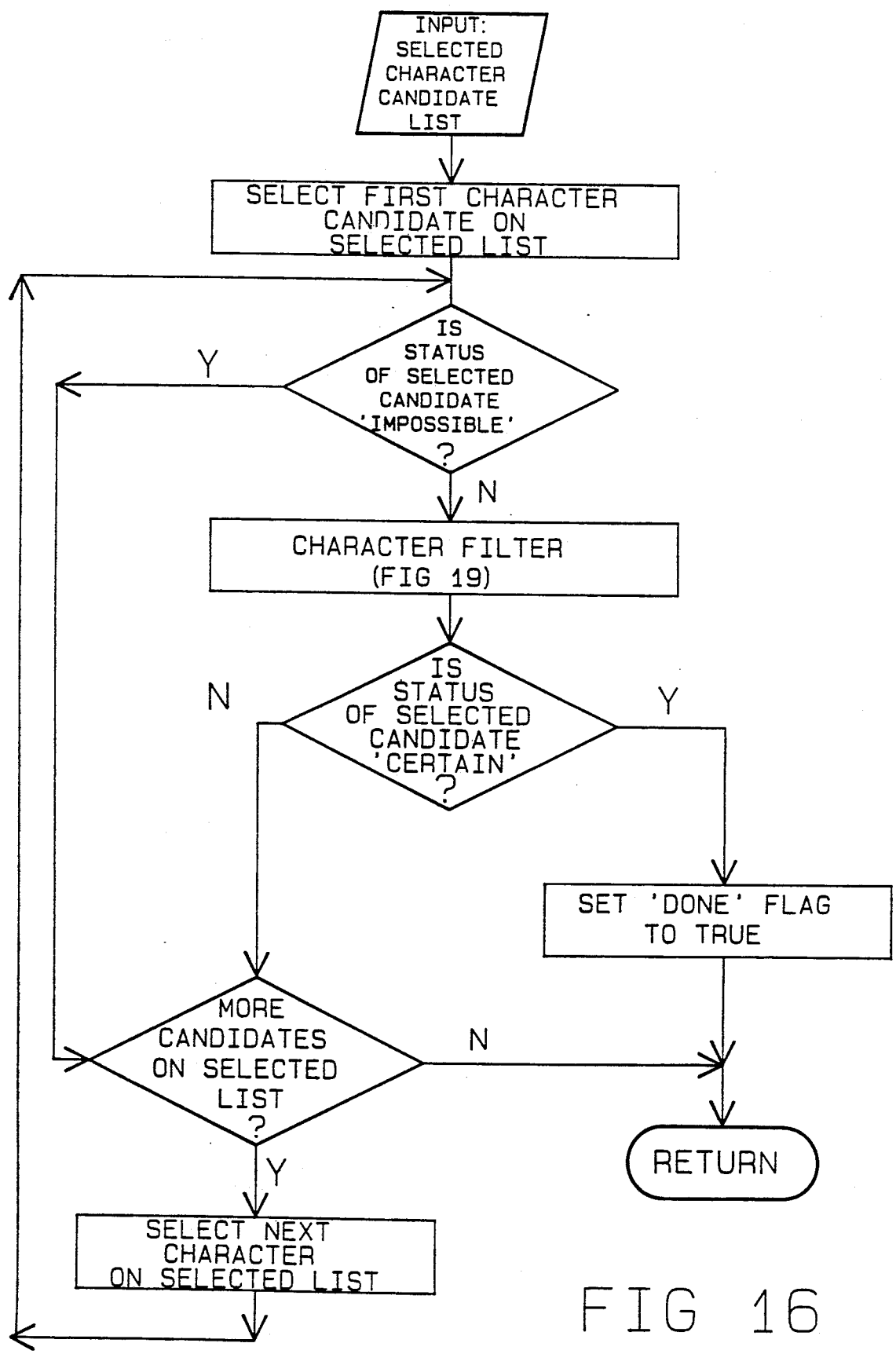
FIG. 16 is a flowchart depicting the "initial pass" operation used in accordance with one embodiment of this invention in order to classify unknown input characters.

FIG. 16 is a flow chart depicting the initial pass operation, previously described in conjunction with the compute possibility set operation of FIG. 13. The input to the initial pass operation is a character candidate list to be examined. The first candidate on the character candidates list is selected as the character candidate to be examined. Next, the status value for the selected character candidate, stored in the status array, is checked.

If the status value for the selected character candidate is 'IMPOSSIBLE', that is, if it has been previously determined that the unknown input character is not the selected character candidate, then no further analysis is done on the selected character candidate and the initial pass operation continues with the step of checking to see if there are more character candidates on the input character candidate list to examine.

Figure 19:
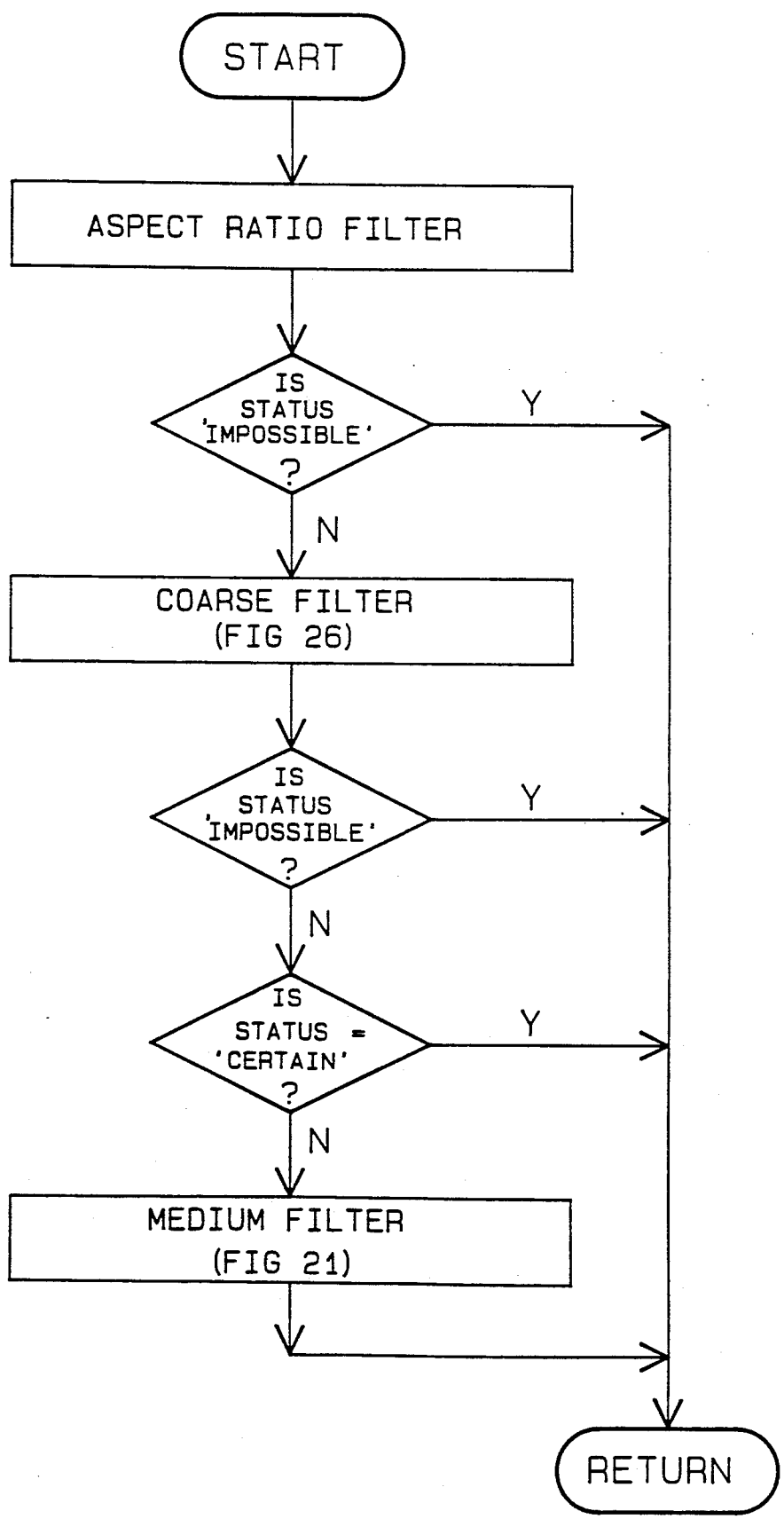
FIG. 19 is a flowchart depicting one embodiment of a character filter operation used in accordance with the teachings of this invention.

If the status value for the selected character is not 'IMPOSSIBLE', then the character filter operation, which is described below with reference to FIG. 19, is performed. The character filter operation sets the status value for the selected character to 'CERTAIN', 'POSSIBLE', or 'IMPOSSIBLE'. If the status is set to 'CERTAIN', then a possibility set containing the selected character candidate is created by the character filter operation. If the status is set to 'POSSIBLE' then a confidence value for the selected character is computed by the character filter operation and stored in the confidence array.

After the character filter operation, the status value for the selected character candidate is checked to see if it has been changed to 'CERTAIN'. If so, the 'done' flag, indicating that the unknown input character has been classified with certainty and a possibility set has been made, is set to 'TRUE' and the initial pass operation is complete and return is made to the compute possibility set operation of FIG. 13. If the status value for the selected character has not been changed to 'CERTAIN', then it is next determined if there are additional candidates in the selected character candidate list which must be examined.

If there are more candidates on the selected character candidate list to examine, the next candidate in the selected list is selected, and the initial pass operation reiterates, beginning with the step of checking the status value for the newly selected candidate. Conversely, if there are no more character candidates remaining on the selected character candidate list, the initial pass operation is complete and a return is made to the compute possibility set operation of FIG. 13.

Character Filter

One embodiment of the character filter operation referred to in the initial pass operation of FIG. 16 is depicted in more detail in the flow chart of FIG. 19. The input to the character filter operation is a character candidate whose current status value, stored in the status array, is either 'POSSIBLE', or 'UNKNOWN'. The character filter operation attempts to reset this status value to either 'CERTAIN' or 'IMPOSSIBLE'. If, at any point during the character filter operation, the status value is changed to either 'CERTAIN' or 'IMPOSSIBLE', the character filter operation terminates and a return is made to the initial pass operation of FIG. 16. If the character filter operation fails to either eliminate the character candidate as being "impossible" or to classify the unknown character with certainty as the character candidate, then the status value is set to 'POSSIBLE' and an associated confidence value may be computed and stored in the confidence array.

Referring to FIG. 19, the character filter operation actually comprises three separate filters: the aspect ratio filter, the coarse filter, and the medium filter. The aspect ratio filter obtains the character height and character width information from the unknown character geometry information and calculates the aspect ratio (width divided by height). The aspect ratio filter operation then compares the aspect ratio of the unknown character with the previously calculated and stored minimum and maximum aspect ratios for the character candidate being examined. If the aspect ratio of the unknown character is less than the minimum aspect ratio or greater than the maximum aspect ratio of the previously-stored data, it is determined that it is impossible for the unknown input character to be the character candidate, and the aspect ratio filter operation sets the status value for the character candidate being examined to 'IMPOSSIBLE'. In this case, the character filter operation is complete and returns to the initial pass operation of FIG. 16 for examination of additional character candidates in the selected character candidate list.

If, on the other hand, the aspect ratio of the unknown character falls within the precalculated aspect ratio range of the character candidate, the status value for the character candidate is set to 'POSSIBLE', and a coarse filter operation is next performed.

The coarse filter operation, described in more detail later with reference to FIG. 20, uses the previously calculated and stored coarse ringed-cluster for the selected character candidate. If the input feature vector lies inside the certainty sphere corresponding to this coarse ringed-cluster, then it is deemed certain that the unknown input character is the character candidate. A possibility set is made containing the selected character candidate and the status value for the character candidate is set to 'CERTAIN'. If the input feature vector lies outside the possibility sphere corresponding to the coarse ringed-cluster for the selected character candidate, then it is deemed impossible for the unknown input character to be the character candidate, and the status value for the character candidate is set to 'IMPOSSIBLE'.

After the coarse filter operation, the status value for the selected character candidate can have one of three possible values: 'CERTAIN', 'POSSIBLE', or 'IMPOSSIBLE'. If, after the coarse filter operation, the status value for the selected character candidate is 'IMPOSSIBLE', the character filter operation is complete and return is made to the initial pass operation of FIG. 16 for examination of additional character candidates in the selected list. If the status value is 'CERTAIN', then once again the character filter operation is complete and return is made to the initial pass operation. If the status value is 'POSSIBLE', then the character filter operation continues by performing a medium filter operation.

The medium filter operation (described in more detail later with reference to FIG. 21) uses the previously calculated and stored medium ringed-clusters corresponding to the selected character candidate. If the feature vector of the unknown character lies outside all of the medium possibility spheres corresponding to these medium ringed-clusters, it is determined that it is impossible for the unknown character to be the selected character candidate and the status value for the selected character candidate is set to 'IMPOSSIBLE'. If the input feature vector lies inside at least one of the corresponding medium certainty spheres, then it is decided that it is certain that the unknown character is the selected character candidate, in which case a possibility set is made containing the selected character candidate and the status value for the selected character candidate is set to 'CERTAIN'. If the input feature vector lies inside at least one medium confidence annulus but outside all medium certainly spheres, then a confidence value for the selected character candidate is computed and stored in the confidence array.

After the medium filter operation is complete, return is made to the initial pass operation of FIG. 16.

Coarse Filter

Figure 20:
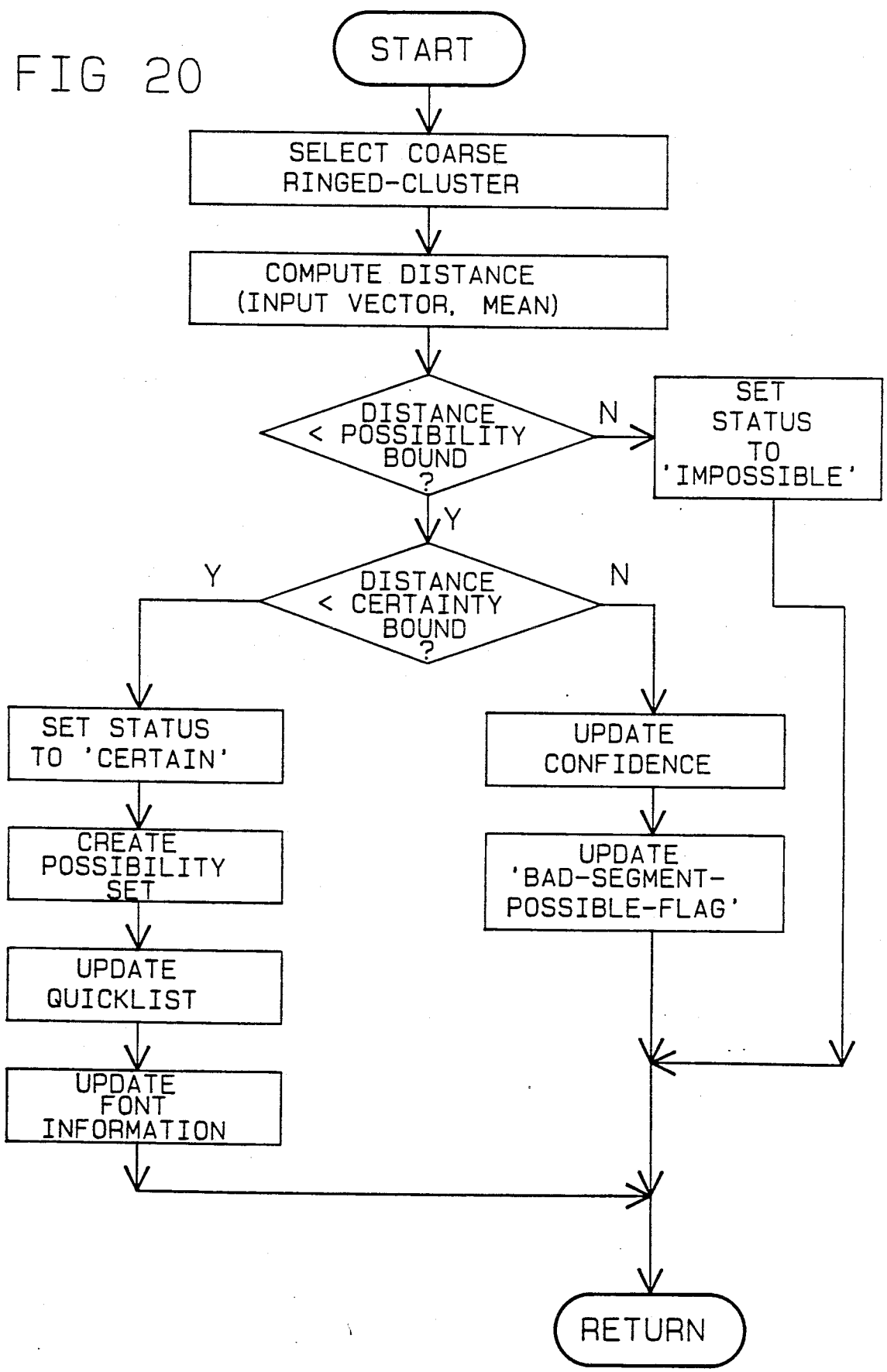
FIG. 20 is a flowchart depicting one embodiment of the coarse filter operation depicted in the character filter of FIG. 19.

FIG. 20 is a flowchart depicting in more detail the coarse filter operation described in conjunction with the character filter operation of FIG. 19. The input to the coarse filter operation is a character candidate whose status value, stored in the status array, is 'POSSIBLE'. That is, the character candidate was not deemed 'IMPOSSIBLE' by either the prescan operation (FIG. 13) or the aspect ratio filter (FIG. 19). During the coarse filter operation the coarse ringed-cluster for the selected character candidate, which has been precalculated as earlier described and stored in memory, is used to determine whether it is certain, possible, or impossible that the unknown input character is the selected character candidate. The fields of the coarse ringed-cluster which are stored in memory and used during the coarse filter operation are:

mean
possibility bound
certainty bound
alien distance
bad-segment distance

Referring to FIG. 20, the first step of the coarse filter operation is to select the coarse ringed-cluster for the selected character candidate. The distance between the input feature vector and the mean of the coarse ringed-cluster is then computed. Next, it is determined if this distance is less than the possibility bound corresponding to the selected coarse ringed-cluster. If not, it has been determined that it is impossible for the unknown input character to be the character candidate, since the possibility sphere corresponding to the coarse ringed-cluster for a given character candidate is constructed so as to contain all the reference feature vectors for that character candidate, and its radius is increased to take into account the fact that the reference set was not all-inclusive. The status value for the character candidate is set to 'IMPOSSIBLE' and a return is made to the character filter operation of FIG. 19 for analysis of additional character candidates.

If the distance is less than the possibility bound, it is next determined if this distance is less than the certainty bound of the coarse ringed-cluster. If so, it has been determined with certainty that the unknown character is the selected character candidate. The status value for the character candidate is set to 'CERTAIN' and a possibility set is created containing the character candidate. In addition, there are two more operations performed before return is made to the character filter operation of FIG. 19: update the quicklist and update font information. These two operations are performed whenever a character is recognized with certainty.

The update quicklist operation is performed by inserting at the head of the quicklist a slot with the following three fields filled:

mean address
certainty bound
label

The mean address is the address in memory of the mean of the ringed-cluster used to recognize the unknown input character with certainty. The certainty bound is the certainty bound of that ringed-cluster. The label is the label (character candidate) of the ringed-cluster. This information is used by the quickcheck operation earlier described.

The update font information operation consists of updating the height and width values for the character candidate that was just used to classify the unknown input character with certainty to equal the height and width of this unknown input character. For future input characters which are not classified with certainty, these height and width values are used to assist the bad-segment-check operation in deciding if the input character is improperly segmented.

Referring again to FIG. 20, if the distance from the feature vector of the unknown character is less than the possibility bound associated with the selected coarse ringed-cluster, but is not less than the certainty bound, it has been determined that it is possible that the unknown input character is the selected character candidate, in which case the status value for the character candidate retains its 'POSSIBLE' value. Before returning to the character filter operation of FIG. 19 for further analysis of the character candidate, two more operations are performed.

First, the confidence value for the character candidate, stored in the confidence array, is updated. In the current embodiment of the coarse filter operation, this update occurs only if the distance from the feature vector of the unknown character to the mean of the selected ringed-cluster is less than the alien distance of the ringed-cluster. Recall that, as a conservative measure, the certainty bounds of ringed-clusters are set to values somewhat less than the alien distance. If the distance to the mean is not less than the certainty bound, but is less than the alien distance, then it is considered "very likely" that the unknown character is the character candidate and is assigned a confidence value indicating very high confidence. In one embodiment, low confidence values indicate high confidence. A confidence value of 0 is reserved to indicate that the unknown character was classified with certainty, and a confidence value of 1 is reserved to indicate "very likely". Thus, if the distance to the mean is less than the alien distance, the confidence value for the character candidate is set to 1.

Second, the value of the bad-segment-possible flag is updated. If the distance from the feature vector of the unknown character to the mean of the selected character candidate is less than the bad-segment-distance of the selected coarse ringed-cluster, that is, the feature vector lies inside a sphere in feature vector space which did not contain any bad-segment reference vectors, the value of the bad-segment-possible flag is set to 'FALSE'.

Medium Filter

Figure 21:
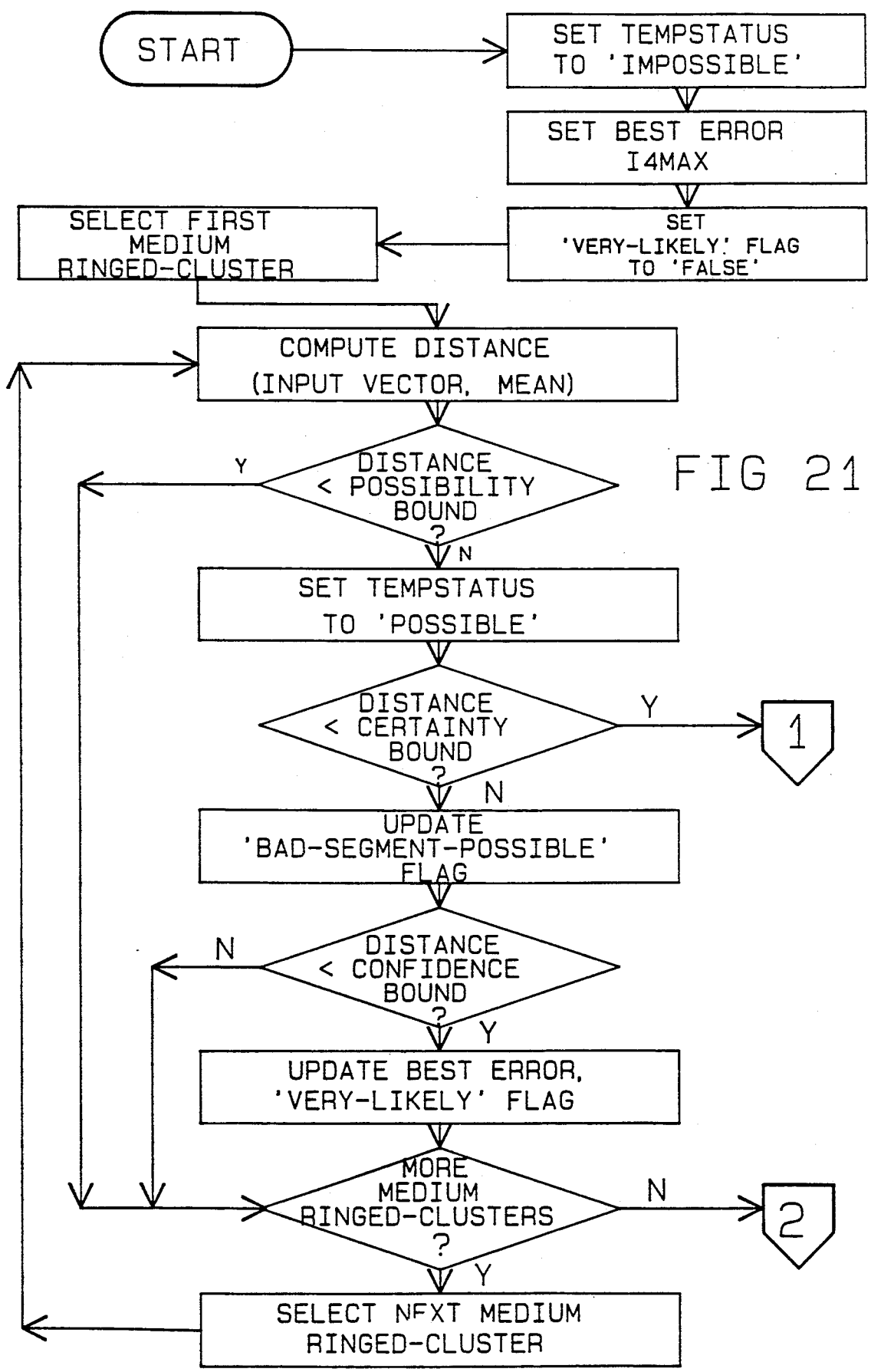

The medium filter operation referred to in the character filter operation of FIG. 19 is depicted in more detail in the flow chart of FIG. 21. The input to the medium filter operation is a character candidate whose current status value, stored in the status array, is 'POSSIBLE'. The medium filter uses the medium ringed-clusters associated with this character candidate in order to reevaluate the status of the character candidate. As previously discussed, associated with each character candidate is a small set of precalculated medium ringed-clusters (in one embodiment, typically six). The fields of the medium ringed-clusters which are stored in memory and used during the medium filter operation are:

mean
certainty bound
possibility bound
confidence bound
alien distance
bad-segment distance FIG. 22 depicts the four possible relationships that can exist between the unknown character feature vector and the medium ringed-clusters. While FIG. 22 is a two-dimensional figure, it is important to keep in mind that the feature vector and means are vectors representing points in multidimensional space, FIG. 22 shows the coarse possibility sphere within which the unknown character feature vector must lie, since it would otherwise have been ruled out during the coarse filter operation.

Case 1 depicts the case where the unknown character feature vector lies outside all of the medium *possibility* spheres corresponding to the medium ringed-clusters for the selected character candidate. As earlier defined, the medium possibility sphere corresponding to a medium ringed-cluster is the multidimensional sphere whose center is the mean of the medium ringed-cluster and whose radius is the possibility bound of the medium ringed-cluster. The medium possibility spheres for each character are constructed, during the clustering stage, to cover the space of all reference vectors for that character. These spheres are expanded slightly during the cluster-post-processing stage to take into account the fact that the reference set was not all-inclusive. If, as in case 1, the input feature vector lies outside all the possibility spheres for the character candidate being examined, then it is concluded that it is impossible for the unknown character to be the character candidate.

Case 2 depicts the case where the unknown character feature vector lies inside at least one medium *certainty* sphere corresponding to a medium ringed-cluster for the character candidate. As earlier defined, the medium certainty sphere corresponding to a medium ringed-cluster is the sphere whose center is the mean of the ringed-cluster and whose radius is the certainty bound of the ringed-cluster. The medium certainty spheres for each character are constructed, during the clustering stage, to contain reference vectors for that character, but no alien reference vectors. If, as in case 2, the unknown character feature vector lies inside at least one medium certainty sphere for the character candidate being examined, then it is concluded that the unknown character is the character candidate. In this event a possibility set containing the character candidate is constructed.

Case 3 depicts the case where the unknown character feature vector lies inside at least one medium confidence annulus corresponding to the medium ringed-clusters for character candidate being examined, but does not lie within any medium certainty sphere. As earlier defined, the medium confidence sphere corresponding to a medium ringed-cluster is the sphere whose center is the mean of the ringed-cluster and whose radius is the confidence bound of the ringed-cluster. The medium confidence annulus corresponding to a medium ringed-cluster is the set of feature vectors that lie within the medium confidence sphere of that medium ringed-cluster but outside its medium certainty sphere. If, as in case 3, the unknown character feature vector lies inside at least one medium confidence annulus, but does not lie within any medium certainty sphere, it is concluded that it is possible that the unknown character is the character candidate being examined, and a confidence value for the candidate is calculated.

Case 4 depicts the case where the unknown character feature vector lies inside at least one medium possibility sphere, but not inside any medium confidence sphere. In this case, it is concluded that it is possible that the unknown character is the character candidate but a confidence value is not assigned to the candidate. A confidence value will be assigned during the second pass operation, described below with reference to FIG. 17.

Referring now to FIG. 21, the medium filter operation begins with four initialization steps. The first initialization step sets a temporary status variable to 'IMPOS- SIBLE'. If, during the medium filter operation, it is determined that the unknown character feature vector lies inside at least one medium possibility sphere for the character candidate being examined, the temporary status is then changed to 'POSSIBLE'. The second initialization step is to set a best error variable to a maximum value. In one embodiment of this invention, the best error variable is a four-byte variable which is initialized to the largest positive integer which can be represented in those four bytes. For each medium confidence annulus containing the feature vector of the unknown character, the distance from the feature vector to the corresponding medium certainty sphere is calculated and a best error value is set equal to the minimum of these distances. This best error value is used to compute a confidence value for the character candidate. The third initialization step is to set a 'very-likely' flag to 'FALSE'. If the distance from the feature vector of the unknown character to the mean of some medium ringed-cluster for the character candidate is less than the corresponding alien distance, then the 'very-likely' flag is set to 'TRUE'. The value of the flag is checked before a confidence value is assigned. The fourth and final initialization step is to select for examination the first medium ringed-cluster for the character candidate.

The selected medium ringed-cluster is now examined as follows. First, the distance between the unknown character feature vector and the mean of the selected medium ringed-cluster ("mean distance") is calculated.

If this mean distance is not less than the possibility bound of the medium ringed-cluster, that is, if the unknown character feature vector does not lie within the possibility sphere of the selected medium ringed-cluster, then examination of the current medium ringed-cluster is complete. The medium filter operation continues by examining the next medium ringed-cluster for the selected character candidate.

If, on the other hand, the mean distance is less than the possibility bound of the selected medium ringed-cluster, the temporary status variable is set to 'POSSIBLE'. It is next determined if the mean distance is less than the certainty bound of the current medium ringed-cluster. If yes, that is, if the unknown character feature vector lies inside the certainty sphere of the current medium ringed-cluster, then it has been determined with certainty that the unknown character is the character candidate being examined. In this case, the status of the character candidate is set to 'CERTAIN', a possibility set is made containing the character candidate, the quicklist and font information are updated as earlier described, and a return is made to the character filter operation of FIG. 14.

If, on the other hand, the mean distance is not less than the certainty bound, the bad-segment-possible flag is updated. If the mean distance is less than the bad-segment distance corresponding to the selected medium ringed-cluster, the bad-segment-possible flag is set to 'FALSE'.

Next, the mean distance is compared with the confidence bound of the selected medium ringed-cluster. If the mean distance is less than the confidence bound, both the best error variable and 'very-likely' flag are updated, as is more fully described in conjunction with the flow chart of FIG. 23. Both the best error variable and the 'very-likely' flag are used to compute a confidence value in the case that the feature vector of the unknown character does not fall inside a medium certainty sphere corresponding to the character candidate.

Examination of the current medium ringed-cluster is now complete. If there are more medium ringed-clusters for the character candidate to be examined, the next medium ringed-cluster is selected, and the process reiterates beginning with the step of computing the distance between the unknown input character feature vector and the mean of the medium ringed-cluster.

On the other hand, if there are no more medium ringed-clusters for the character candidate to be examined, then it is next determined if the temporary status variable is still set to 'IMPOSSIBLE'. If so, it has been determined that the unknown input character cannot possibly be the character candidate, the status value for the character candidate is set to 'IMPOSSIBLE', and a return is made to the character filter operation of FIG. 19. If the temporary status variable is not set to 'IMPOSSIBLE', then it has been determined that it is possible for the unknown input character to be the character candidate. The status for the character candidate retains its 'POSSIBLE' value. A new confidence value is computed, using the best error variable and the 'very-likely' flag, as is more fully described in conjunction with the flow chart of FIG. 23. If the new confidence value is less than (i.e. more confident than) the value corresponding to the character candidate stored in the confidence array, then the value stored in the confidence array is updated to equal this new confidence value.

Update Best Error and 'Very-Likely' Flag

Figure 23:
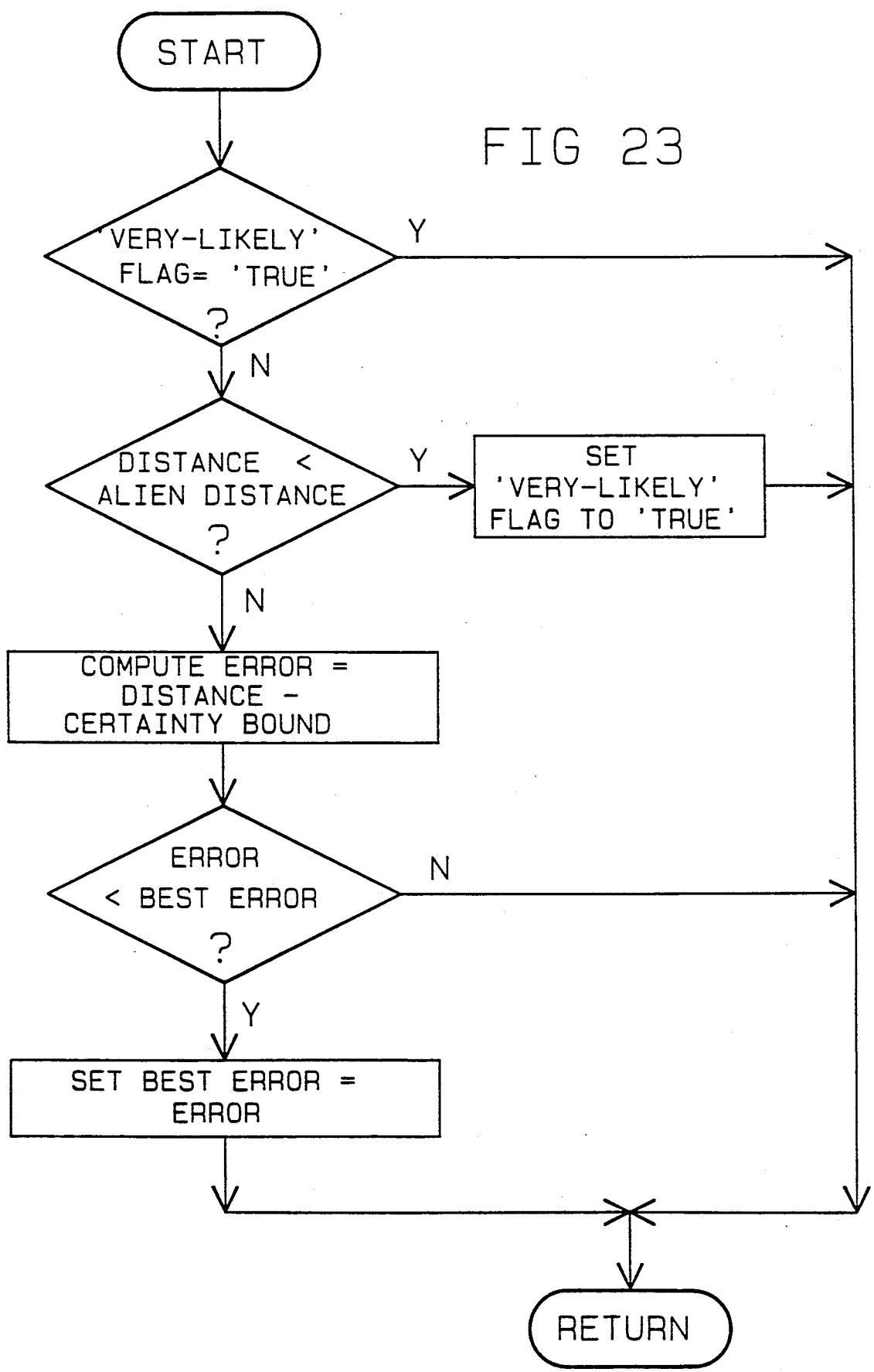
FIG. 23 is a flowchart depicting the operation of updating best error and very likely flags.

The update best error and 'very-likely' flag operation, depicted in the flow chart of FIG. 23, is called by both the medium filter (FIG. 21) and fine analysis (FIG. 25) operations. Its purpose is to update the best error and very-likely flag, which are used to compute a confidence value. In general, only the best error value is used to compute the confidence value. However, if the 'very-likely' flag is equal to 'TRUE', then the confidence value is set to 1, indicating very high confidence.

The operation first checks to see if the 'very-likely' flag should be updated. If it is already equal to 'TRUE', then no improvement in the confidence value could be made by further analysis of the current ringed-cluster, and the operation is complete. Otherwise, the mean distance between the feature vector of the unknown character and the mean of the ringed-cluster is compared with the alien distance of that ringed-cluster. If the mean distance is less than the alien distance, the 'very-likely' flag is reset to 'TRUE' and the operation is complete.

The operation next checks to see if the best error value should be updated. This is done by first setting an error value equal to the difference between the mean distance and the certainty bound of the ringed-cluster. If this error is less than the previously stored best error, the best error value is updated to equal this newly calculated error.

Compute New Confidence

Figure 24:
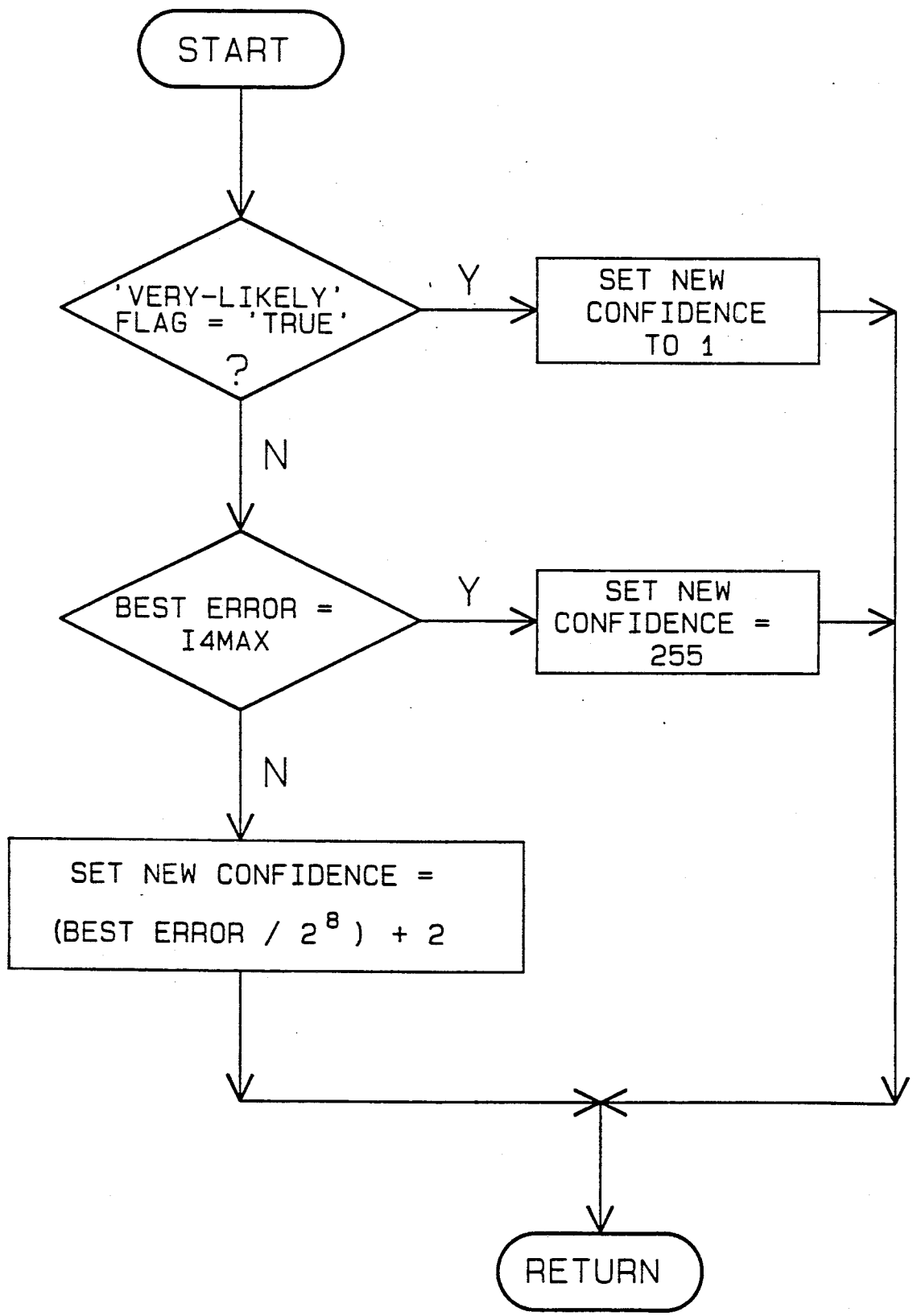
FIG. 24 is a flowchart depicting one embodiment of a technique for computing a new confidence value as used in coarse and medium filters of FIGS. 20 and 21, respectively.

FIG. 24 depicts one embodiment of the compute new confidence operation, which is called by both the medium filter (FIG. 21) and fine analysis (FIG. 25) operations. It is used to compute a confidence value in the case that the input feature vector did not fall within a certainty sphere, but did fall within at least one confidence annulus. The best error and 'very-likely' flag are used to set this confidence value.

If the 'very-likely' flag is equal to 'TRUE', then the new confidence value is set equal to 1, and the operation is complete. Otherwise, if the best error field is set to its initialized maximum possible value, then the feature vector of the unknown character did not fall within a confidence sphere, the new confidence is set to 255, indicating "no confidence", and the operation is complete.

Otherwise, the new confidence value is computed using the equation new confidence value=(best error/$2^8$)+2

A confidence value of 0 is reserved to indicate that the unknown character was recognized with certainty. A confidence value of 1 is reserved to indicate 'very likely'. The best error is divided by $2^8$ because, in this embodiment, confidence values are stored in a single byte.

Second Pass

Figure 17:
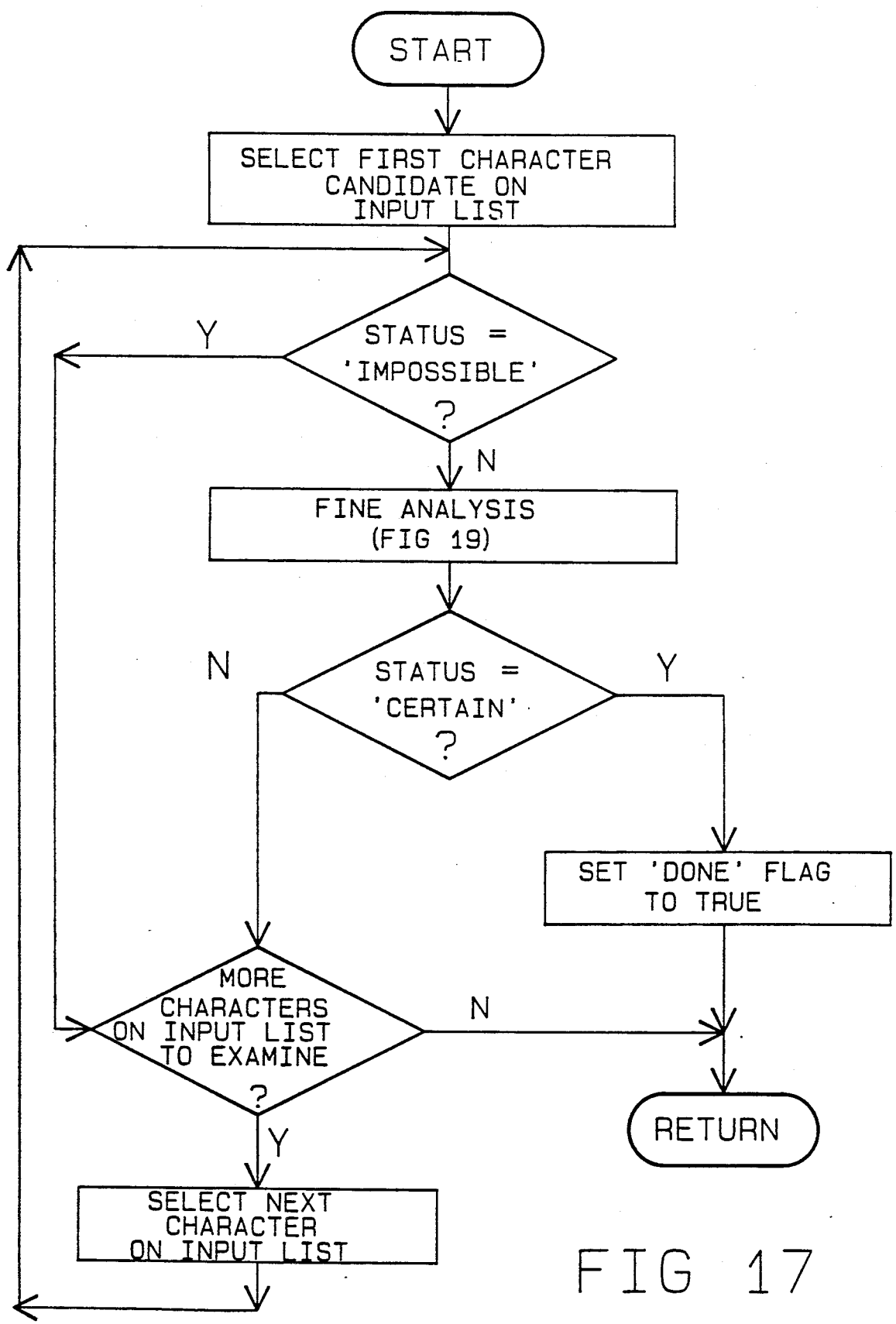
FIG. 17 is a flowchart depicting one embodiment of a second pass operation used in accordance with the teachings of this invention in order to classify unknown input characters.

FIG. 17 is a flow chart depicting in greater detail the second pass operation previously described in conjunction with the compute one possibility set operation of FIG. 13. The input is a list of character candidates to be examined. This list was generated by the get character candidate lists operation (FIG. 15) and filtered by the initial pass operation (FIG. 16). Those character candidates whose status value was changed to 'IMPOSSIBLE' by the initial pass operation are not examined by the second pass operation. Of importance, at this stage none of the characters on the input character candidate list was deemed 'CERTAIN' during the initial pass operation, since otherwise the compute possibility set operation of FIG. 13 would have terminated immediately after the initial pass operation.

The second pass operation begins by selecting the first character on the input character candidate list. If the status value of the character candidate is 'IMPOSSIBLE', that is, if it has been previously decided that it is impossible for the unknown input character to be the character candidate, then there is no further examination of this character candidate and the second pass operation continues by examining the next character on the input character candidate list.

Figure 25:
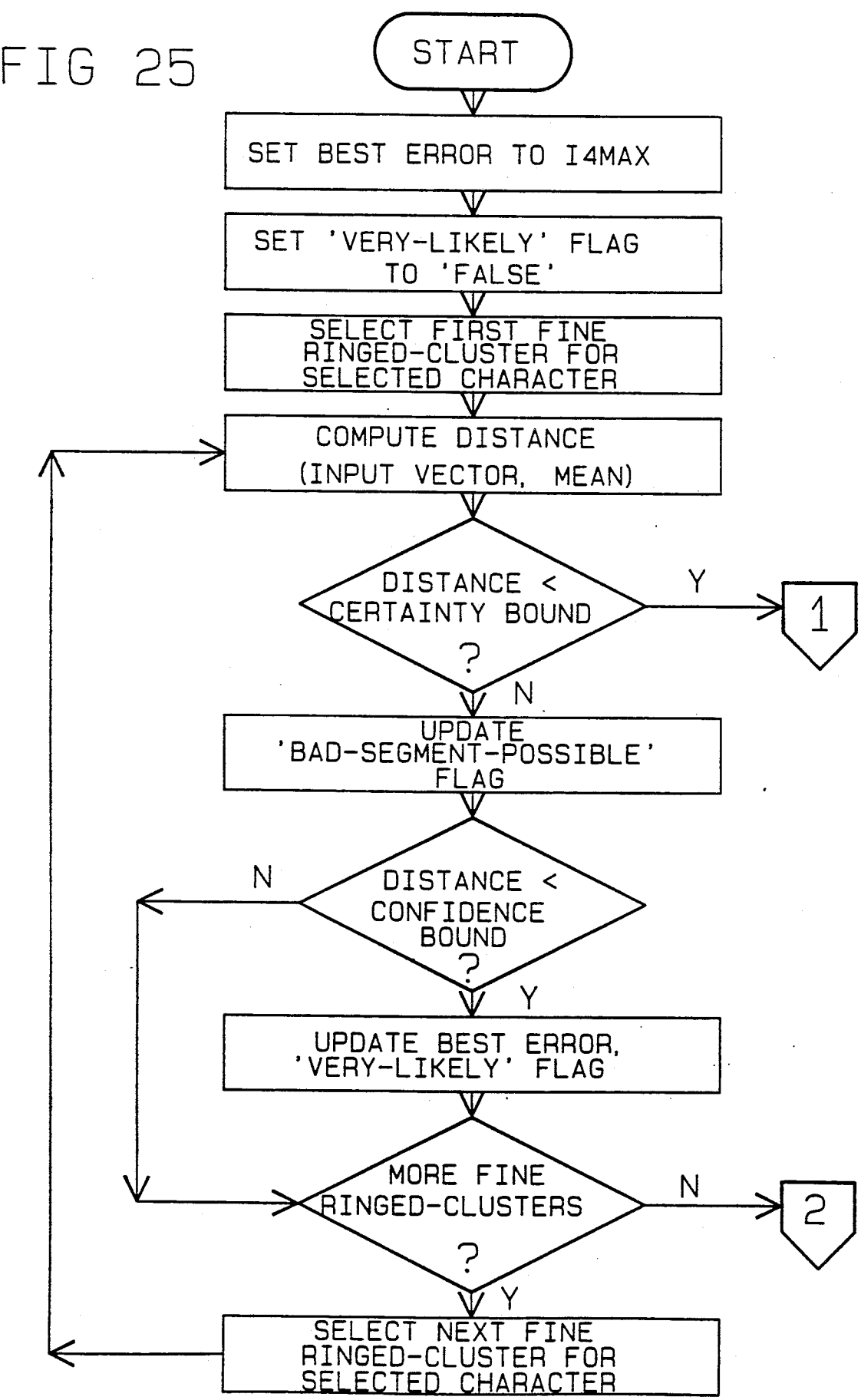

If the status value of the character candidate is not 'IMPOSSIBLE', then a fine analysis operation is performed, as is described in conjunction with the flow chart of FIG. 25. The fine analysis operation uses the precalculated fine ringed-clusters for the character candidate to attempt to classify the unknown input character. If the feature vector of the unknown character lies inside one of the fine certainty spheres associated with the selected character candidate, the fine analysis operation creates a possibility set containing the character candidate and resets the status value of the character candidate to 'CERTAIN'. If the feature vector of the unknown character does not lie in any of the fine certainty spheres, the fine analysis operation may alter the confidence value for the character candidate.

If, after the fine analysis operation, the status value for the current character candidate has been changed to 'CERTAIN', the 'done' flag is set to 'TRUE', indicating that the unknown input character has been recognized with certainty and the possibility set has been made, and a return is made to the compute possibility set operation of FIG. 13.

If, on the other hand, the status value for the current character candidate is not 'CERTAIN', it is next determined if there are more character candidates on the input character candidate list to examine. If not, the second pass operation is complete. If there are more character candidates, the next character candidate on the input character candidate list is selected and examination of that character candidate begins with the step of checking to see if its status value is 'IMPOSSIBLE'.

Fine Analysis Operation

The input to the fine analysis operation (FIG. 25) is a character candidate whose current status value is 'POSSIBLE'. The fine analysis operation uses the fine ringed-clusters associated with this character candidate to reevaluate the status of the character candidate. As previously discussed, associated to each character candidate is a set of precalculated fine ringed-clusters (in one embodiment, typically 30 to 100). The fields of the fine ringed-clusters, stored in memory, which are used during the fine analysis operation are:

mean
certainty bound
confidence bound
alien distance
bad segment distance

There are three possible relationships that can exist between the feature vector of the unknown character and the fine ringed-clusters for the character candidate. In the first case, the unknown character feature vector falls within one or more fine certainty spheres. As earlier defined, the fine certainty sphere corresponding to a fine ringed-cluster is the sphere whose center is the mean of the fine ringed-cluster and whose radius is the certainty bound of that fine ringed-cluster. The fine certainty spheres for a character candidate are constructed to cover the space of all reference vectors for that character candidate and to contain no alien reference vectors. If the unknown character feature vector falls within at least one fine certainty sphere, then it is determined with certainty that the unknown character is the character candidate.

In the second case, the unknown character feature vector falls outside all fine confidence spheres for the character candidate. As earlier defined, the fine confidence sphere corresponding to a fine ringed-cluster is the sphere whose center is the mean of the fine ringed-cluster and whose radius is the confidence bound of that fine ringed-cluster. Values for the confidence bounds are set during the cluster-post-processing stage to take into account the fact that the reference set was not all-inclusive. If the unknown character feature vector lies outside all confidence spheres, then the confidence value assigned to the character candidate during the medium filter operation is not altered by the fine analysis operation.

In the third case, the unknown character feature vector falls inside some fine confidence annulus, but not inside any fine certainty sphere. As earlier described, the fine confidence annulus corresponding to a fine ringed cluster is the set of all feature vectors that fall within the confidence sphere corresponding to the fine ringed-cluster, but outside its certainty sphere. In this case, a fine confidence value is calculated using the method described in the discussion of the medium filter operation. In the event that this fine confidence value is less than (i.e. shows more confidence than) the confidence value obtained during the medium filter operation, the confidence value for the character candidate, stored in the confidence array, is updated to equal the fine confidence value.

Referring to the flow chart of FIG. 25, the fine analysis operation begins with three initialization steps. The first initialization step sets a best error variable to the maximum number which may be stored in a four byte field. The second initialization step sets the 'very-likely' flag to 'FALSE'. The third initialization step sets the next fine ringed-cluster to be examined to the first fine ringed-cluster for the character candidate.

Next, the distance between the feature vector of the unknown character and the mean of the fine ringed-cluster is calculated. If the distance is less than the certainty bound of the fine ringed-cluster, it has been determined with certainty that the unknown character is the character candidate. In this event, the status value for the character candidate is reset to 'CERTAIN', a possibility set is made containing the character candidate, the quicklist is updated, the font information is updated, and a return is made to the second pass operation of FIG. 17.

If the distance is not less than the certainty bound of the fine ringed-cluster, the operation continues by updating the bad-segment-possible flag. If the mean distance is less than the bad segment distance corresponding to the selected fine ringed-cluster, the bad-segment-possible flag is set to 'FALSE'. Next, the mean distance is compared with the confidence bound of the fine ringed-cluster. If the mean distance is less than this confidence bound, then the best error field and very-likely flag are updated, as was described in conjunction with FIG. 23.

Following this possible update of the best error field and very-likely flag, or if it was determined that the mean distance was not less than the confidence bound, it is determined if there are additional fine ringed-clusters for the character candidate to be examined.

If there are additional fine ringed-clusters to be examined, the next fine ringed-cluster is selected and the fine analysis process is reiterated, beginning with the step of computing the distance between the feature vector of the unknown input character and the mean of the current fine ringed-cluster.

On the other hand, if there are no more fine ringed-clusters for the character candidate to be examined, the fine analysis operation has not succeeded in classifying the unknown character with certainty. A new confidence value is computed, as was described in conjunction with the flow chart of FIG. 24, previously described, using the best error field and very-likely flag. If this new confidence is less than the confidence value set during the initial pass operation and stored in the confidence array, the stored confidence value is updated to equal to this new confidence value.

Make Poset-Uncertain

The make possibility set-uncertain operation is used to create a possibility set in the event that, after all character candidates on the lists provided by the get character candidate lists operation have been examined by the initial pass and second pass operations, none has been deemed 'CERTAIN'.

FIG. 18 is a flow chart depicting the make possibility set-uncertain operation. The first step is to create a candidate list of character candidates. This list consists of all character candidates whose status, as stored in the status array, is 'POSSIBLE' and whose confidence, as stored in the confidence array, is less than the initialized maximum confidence value. Next, the number of character candidates on this list is checked. If the number of character candidates is equal to zero, then a nonrecognition possibility set containing a predefined nonrecognition character is created, indicating that the unknown character has not been classified. If the number of character candidates is equal to one, then a possibility set is created containing that single character candidate, together with the confidence value for that candidate stored in the confidence array.

If the number of candidates is greater than one, the next step is to sort the candidate list by order of increasing confidence values such that those candidates having the highest confidence (i.e. those candidates having the lowest confidence values) are at the head of the candidate list. Next, the candidate list is truncated in two steps. The first step truncates the candidate list so that the candidates will fit within a possibility set. In one embodiment of this invention, the maximum number of possible candidates that can be stored in a possibility set is ten. Thus, if there are more than ten candidates on the stored candidate list, the candidate is truncated after the tenth character candidate. The second step truncates the candidate list so as to eliminate candidates having confidences which are much lower than (i.e. confidence values which are greater than) the confidence associated with the candidate at the top of the sorted confidence list. In one embodiment of this invention, this truncation is performed by using the following equation.

$$K_{truncate} = 1.5 K_0 + 5;$$

where $K_0$ is the confidence value of the character candidate at the head of the candidate list; and $K_{truncate}$ is the truncation value. Character candidates having confidence values greater than or equal to $K_{truncate}$ are truncated from the candidate list.

After the candidate list is sorted and truncated, or if the candidate list contains only one character candidate, a possibility set is made containing the character candidates on the character candidate list together with associated confidences.

Figure 26:
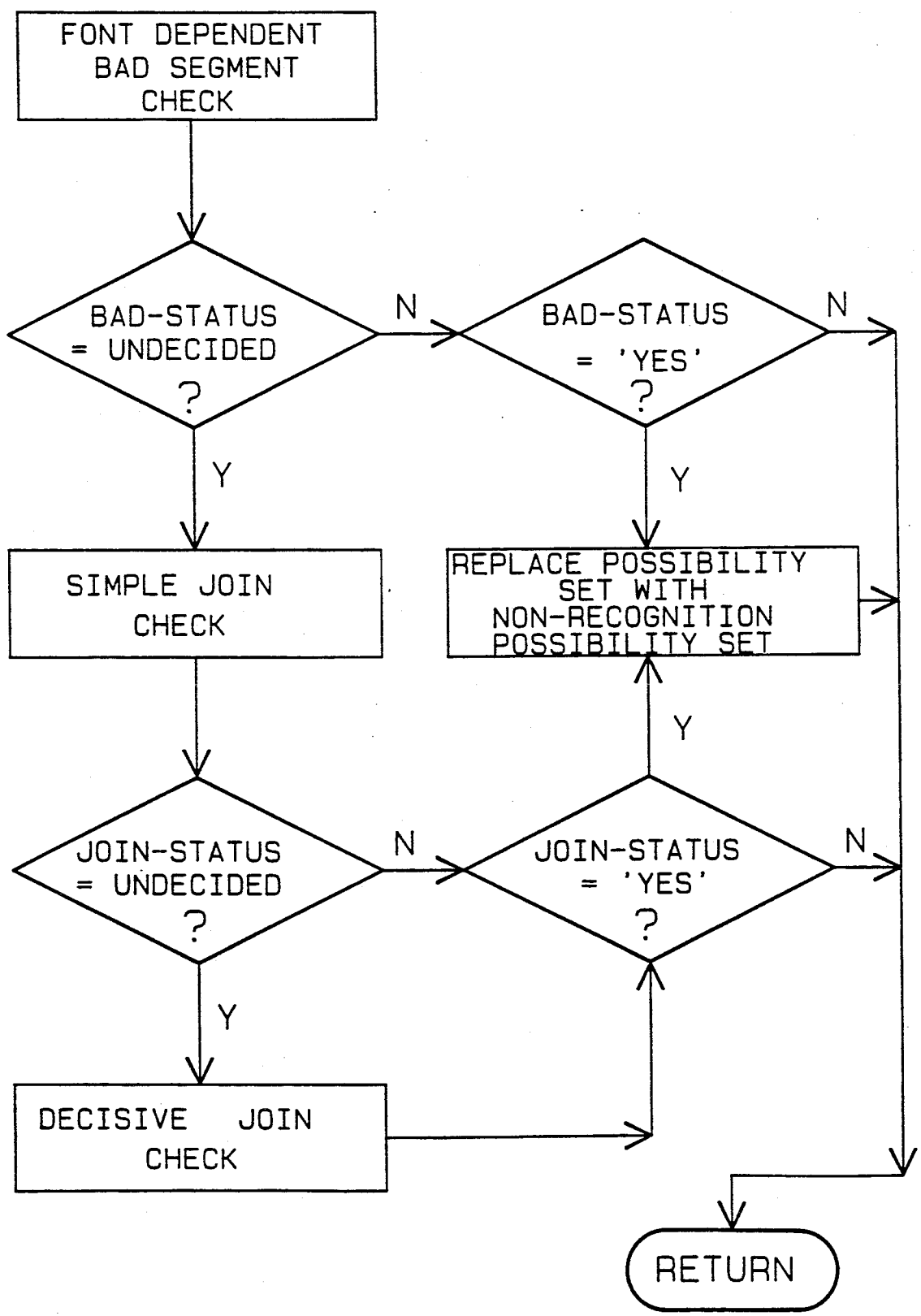
FIG. 26 is a flowchart depicting one embodiment of a font dependent bed segment check.

In one embodiment, the possibility set just created is sent on to a bad segment check operation (FIG. 26). The purpose of the bad segment check operation is to decide if the unknown character is, in fact, not a single, properly segmented character. If the decision is yes, then a nonrecognition possibility set is created which can, if desired, flag additional devices to process the improperly segmented character.

Bad Segment Check

The bad segment check operation, referred to in the make possibility set-uncertain operation of FIG. 18, is used to decide, for a given unknown input character which has not been classified with certainty, whether the input character is 'bad', i.e. is not a single, properly segmented character. If it does decide that the unknown input is 'bad', then it replaces the possibility set created by the make possibility set-uncertain operation of FIG. 18 with a nonrecognition possibility set.

The decision is made as follows. If the bad-segment-possible flag is set to 'FALSE', then it is decided that the unknown character is not 'bad' and the possibility set is not modified. If the bad-segment-possible flag is set to 'TRUE', then it is decided that the unknown character is 'bad' and the possibility set is replaced with a nonrecognition possibility set.

The rationale for making the decision on the basis of the bad-segment-possible flag is as follows. As earlier discussed, the bad-segment-possible flag is initialized to 'TRUE' during the make possibility set operation. Its value would have been reset to 'FALSE' only if it was found, during the coarse filter, medium filter, or fine analysis operation, that for some ringed-cluster, the distance from the feature vector of the unknown character to the mean of the ringed-cluster was less than the bad segment distance of that ringed-cluster. As earlier described, the precalculated bad segment distance is the distance from the mean of the ringed-cluster to its nearest bad segment reference vector in the bad segment reference set B. Therefore, if the bad-segment-possible flag is set to 'FALSE', the feature vector of the unknown character lies in a sphere in feature vector space that contained no bad segment reference feature vectors, and so it is concluded that the unknown character is not a bad segment. If, on the other hand, the bad-segment-possible flag is still set to 'TRUE' no sphere in feature vector space was found containing the feature vector of the unknown character that did not overlap the bad segment subspace, and so it is concluded that the unknown input is 'bad'.

Additional Bad Segment Check Techniques

If the bad segment reference set B is not sufficiently complete, then three other techniques can be used in conjunction with the bad segment check technique just described. These are:

1. font dependent bad segment check
2. simple join check
3. decisive join check

As is the case with the bad segment check technique earlier described, these techniques are applied only to those unknown input characters which were not classified with certainty. The second two techniques listed above, the simple join check and the decisive join check, are less general than the bad segment check operation earlier described or the font dependent bad segment check in that they are designed to determine whether or not the unknown character is a join as opposed to determining whether or not the unknown character is 'bad'. However, most 'bad' input characters are joins, and so the join check techniques are useful for a majority of the 'bad' inputs. The font dependent bad segment check operation sets a bad-status flag to either 'YES', 'NO', or 'UNDECIDED'. The bad-status flag is set to 'YES' to indicate that it has decided the unknown character is in fact 'bad' and that its possibility set should be replaced with a nonrecognition possibility set. The bad-status flag is set to 'NO' to indicate that it has decided that the unknown character is not 'bad' and that the possibility set should therefore not be altered. The bad-status flag is set to 'UNDECIDED' to indicate that it had insufficient information to make a decision. Similarly, the simple join check operation sets a join-status flag to either 'YES', 'NO', or 'UNDECIDED'. The decisive join check operation sets the join-status to either 'YES' or 'NO'.

One method of combining these three operations is as depicted in the flowchart of FIG. 26. The simple join check operation is called if the font dependent bad segment check operation sets the bad-status flag to "UNDECIDED". The decisive join check operation is called if the simple join check operation sets the join status flag to "UNDECIDED". The decisive join check always sets the join-status flag to either "yes" or "no". If either the bad-status flag or join-status flag is set to "yes" by one of these operations, then the possibility set is replaced with a nonrecognition possibility set.

The decisive join check operation uses probabalistic information to make its best guess as to whether or not the unknown input character is a join. In one embodiment, due to the possibility of error in this best guess, the decisive join check operation is not used. If both the font dependent bad segment check operation and the simple join check operation are "UNDECIDED", then the unknown input character is "conditionally recirculated". That is, a copy of the possibility set is stored in memory. A nonrecognition possibility set is output, so as to flag other processors (not shown) such as noise removal processors or segment cleavage processors, to work on the segment from which the possibility set was made. The feature vector(s) corresponding to this reprocessed segment is then returned to the classification module. The classification process then decides whether the new possibility set(s) look better than the old, in which case the new possibility set(s) are output. Otherwise the old possibility set is output.

Font-Dependent Bad Segment Check

The font-dependent bad segment check operation sets a bad-segment flag to either 'YES', 'NO', or 'UNDECIDED'. This operation uses information about the current type font being read in order to make a decision. If, for example, the possibility set for the current unknown character, which has not been classified with certainty, contains the character candidate 'n' and if a previous input was classified with certainty as 'n', and it is believed that there has not been a type font change since that last 'n' was classified with certainty, then information about that last 'n' is compared with information pertaining to the current unknown input character to determine whether or not it is plausible that the current unknown input character is an 'n'. In one embodiment, the information used about input characters classified with certainty is their height and width. As previously discussed, the height and width values corresponding to a character candidate, stored in the height and width arrays, are the height and width of the last unknown input character that was classified with certainty as that character candidate. The font-dependent bad segment check operation uses the height and width of the current unknown input character together with the stored height and width values of character candidates in the possibility set and checks for consistency. The height-width error corresponding to two sets of height-width values, (height1, width1) and (height2, width2), is defined by the equation:

$$\text{error} = |\text{height1} - \text{height2}| + |\text{width1} - \text{width2}|$$

Two sets of height-width values are said to be 'consistent' if the height-width error is less than some preestablished consistency threshold value (in one embodiment, 6).

If the width and height of the unknown input character is consistent with the stored height and width values of at least one member of the possibility set, then the bad-segment flag is set to 'NO'. If the width and height of the unknown input character are inconsistent with the stored height and width values of all members of the possibility set, then the bad-segment status flag is set to 'YES'. If there are no members of the possibility set whose width and height are consistent with the width and height of the unknown character, but there is at least one member of the possibility set which does not have any width and height values yet assigned, then this operation reserves judgement and sets the bad-status flag to 'UNDECIDED'.

In one embodiment, members of the possibility set which are deemed inconsistent with the unknown character are flagged as 'suspicious'. If the possibility set is not replaced with a nonrecognition possibility set, these flags can be used by postprocessing modules, such as a subline checker or context module (not shown), to make a more informed decision about which member of the possibility set to choose.

Some examples to illustrate:

| | |
|---|---|
| height of unknown character: | 20 |
| width of unknown character: | 25 |
| height of last 'n' classified with certainty: | 20 |
| width of last 'n' classified with certainty: | 15 |
| height of last 'r' classified with certainty: | 21 |
| width of last 'r' classified with certainty: | 13 |
| height of last 'm' classified with certainty: | 20 |
| width of last 'm' classified with certainty: | 26 |
| height of last '+' classified with certainty: | no value yet assigned |
| width of last '+' classified with certainty: | no value yet assigned |

| possibility set | set bad segment status |
|---|---|
| {n,r} | Yes |
| {n,m} | No |
| {m,+} | No |
| {n,+} | Undecided |

In order to avoid incorrect judgements due to a type font change, the stored type font information is erased when there is evidence of a type font change. In one embodiment, a decision that there has been a type font change is made as follows. If an input character is classified with certainty as some particular character candidate, and the height and width of the input character are inconsistent (as defined above) with the stored height and width for the character candidate, then a flag is set indicating that there is suspicion of a type font change. If the height and width of the next input character classified with certainty as some particular character candidate is also inconsistent with the stored height and width information for that character candidate, then it is concluded that there has been a type font change and the height and width arrays are reinitialized to values indicating "no value yet assigned". As a conservative measure, the consistency threshold value used to determine whether there has been a type font change is lower than the consistency threshold value used by the font-dependent bad-segment check operation. In one embodiment, the consistency threshold value used to determine whether there has been a type font change is 4. In this manner, the font-dependent bad-segment check operation and the join check operation, described below, use previously stored type font information only if it is fairly certain that the stored type font information is applicable to the current unknown character.

Simple Join Check Operation

The simple join check operation technique sets a join-status flag to either 'YES', 'NO', or 'UNDECIDED'. The first step of this operation is to establish two landmark width values: the wide-single landmark value and the narrow-join landmark value. The method used to establish these values is described below. The wide-single landmark value is a width value which, for the current type font, is the width of a very wide single character. The narrow-join landmark value is a width value which, for the current type font, is the width of the narrowest two-character join. These values are determined by using width information about the current type font, stored in the width array. If that information is not available, the values are determined based on precalculated and stored type font-independent aspect ratio information. In general, the wide-single landmark value is larger than the narrow-join landmark value, although this operation is not necessary for proper operation of the simple join check operation.

Figure 27A:
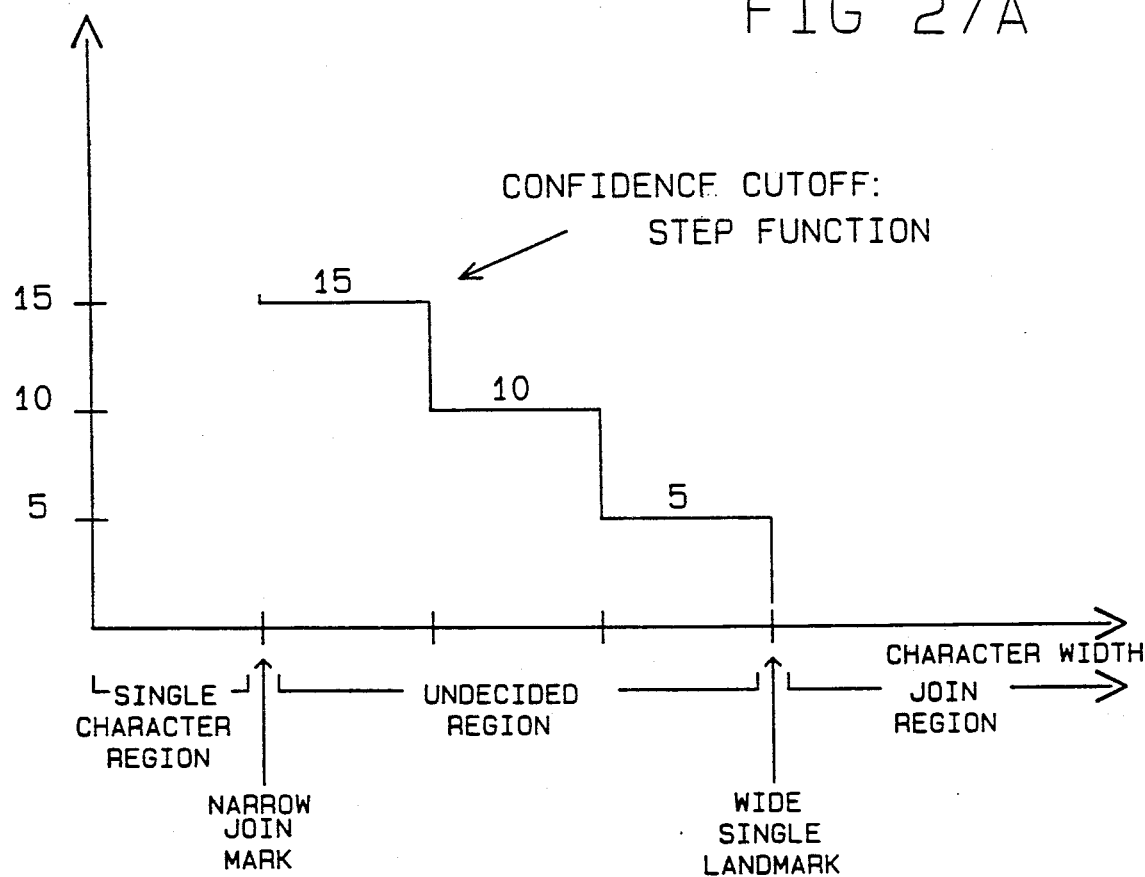
FIGS. 27a and 27b depict the relationship between confidence values and narrow-join landmark and wide-single landmarks used in accordance with two separate embodiments of the bed segment check of FIG. 26.

The two landmark values are used to partition all width values into three categories. This is illustrated in FIG. 27a. The set of widths larger than the wide-single landmark value is the 'join region'. The set of widths narrower than the narrow-join landmark value is the 'single character region'. The set of widths which fall in between the narrow-join landmark value and the wide-single landmark value is the 'undecided width region'. If the width of the unknown character falls into the 'join region' (i.e. its width is greater than the wide-single landmark value) then it is decided that the unknown character is a join, and the join-status flag is set to 'YES'. If the width of the unknown character falls into the 'single character region' (i.e. its width is less than the narrow-join landmark value) then it is decided that the unknown character is a single character, and the join-status flag is set to 'NO'. If the width of the unknown character falls into the 'undecided' region, then it is decided that there is insufficient information to determine whether or not the unknown character is a join, and the join-status flag is set to 'UNDECIDED'.

Set Landmark Values

The purpose of the set landmark values operation, used by the simple join check technique, is to set values for the wide-single landmark value and the narrow-join landmark value. The wide-single landmark value is the width of a wide single character. The narrow-join landmark value is the width of a narrow join. Two methods are presented for setting those values.

The first method uses width information collected from unknown input characters that have been classified with certainty, and thus is font-dependent. The second method is font-independent and uses precalculated aspect-ratio information. Since the first method is sensitive to the current type font being read, it is preferable because it sets tighter, and hence more useful, bounds. However, if the relevant width information needed for the first technique is not available, then the second technique is used.

Font-Dependent Method

The wide-single landmark value is set to the width of previous input character which was classified with certainty as a 'wide' character. In one embodiment, the following characters are considered 'wide':

'm', 'w', 'M', 'W'

If the subline type of the unknown character is the 'A' type or the 'q' type, it is preferably to use the width value of an upper-case 'wide' character, otherwise it is preferable to use the width value of a lower-case 'wide' character. To be conservative, after the wide-single landmark value is set to the width value of a wide character, it is incremented by some small amount. In one embodiment, if the unknown character is an 'A'-type or "q'-type character and if the wide-single landmark value is set to a lower-case 'wide' character, the wide-single landmark value is incremented by 6; otherwise it is incremented by 3. The narrow-join landmark value is set to the sum of the widths of two 'narrow' characters which have width entries in the width array. For example, if the unknown character is an 'A' or 'q' type character and the width of the character 'l' is known, the narrow-join landmark value is set to twice that width.

Font-Independent Method

The font-independent method of establishing landmark values uses precalculated aspect-ratio information instead of font-dependent width information. The first type of aspect ratio information used gives, for different character types, the minimum join aspect ratio, which is the aspect ratio below which the unknown character is guaranteed to be a single character. The minimum join aspect ratios are previously determined by computing the minimum aspect ratio of a large number of joined segments for each character type. In one embodiment, the minimum join aspect ratio of an 'A'-type character is 0.55; for a non-'A' character type, 1.25.

The second type of aspect-ratio information used is the maximum single character aspect ratio, which is the aspect ratio of a character above which the character is guaranteed to be a join. The maximum single character aspect ratio is computed as the largest aspect ratio of all single characters in the reference set (except dash).

In one embodiment, the wide-single landmark value is obtained by multiplying the maximum single character aspect ratio by the height of the unknown character, since aspect ratio is defined as width/height. Similarly, the narrowjoin landmark value is obtained by multiplying the minimum join aspect ratio of the character type of the unknown character by the height of the unknown character.

Decisive Join Check Technique

The decisive join check technique is used if the simple join check operation has set the join-status flag to 'UNDECIDED', indicating that the unknown character is neither wide enough to be clearly a join nor narrow enough to clearly be a single character. The decisive join check technique sets the join-status flag to 'YES' or 'NO' depending on both the width of the unknown character and the confidence value of the first (most likely) candidate in the possibility set ("possibility set confidence value").

If the unknown character is fairly wide, then it is deemed to be a join unless its possibility set confidence value is very low (i.e. very confident). If the unknown character is fairly narrow, then it is deemed to be a single character unless its possibility set confidence value is very high (i.e. very lacking in confidence).

Figure 27B:
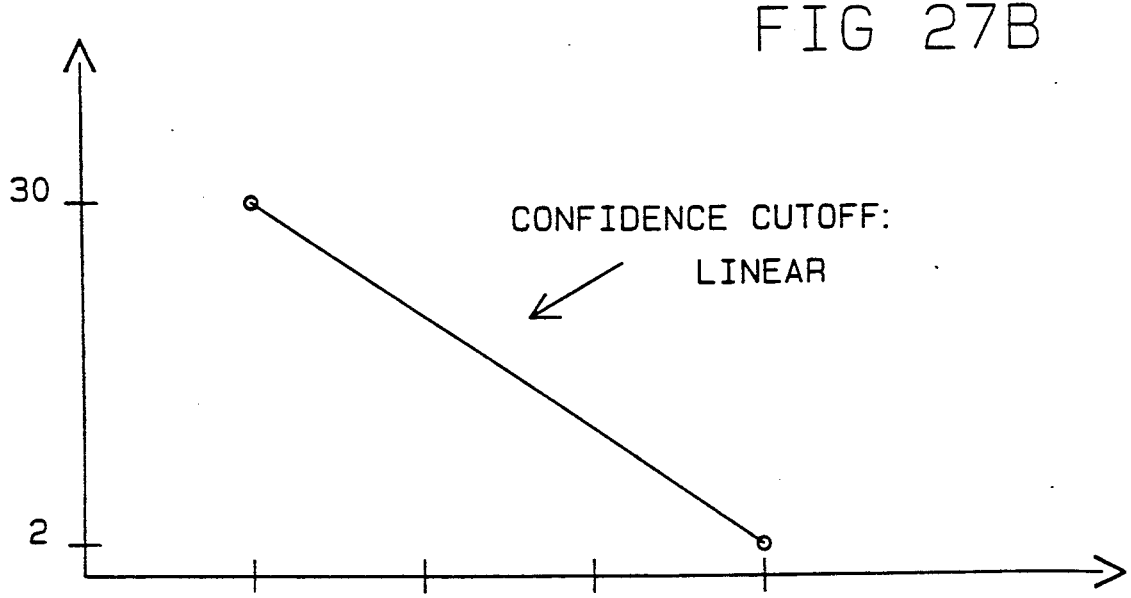

The first step of this operation is to associate a confidence cut-off value to the width of the unknown character. FIGS. 27a and 27b depict two similar methods for determining these confidence cut-off values. Referring to FIG. 27a, the 'undecided region' (as computed by the simple join check operation) is subdivided into a preestablished number of subregions. In the embodiment of FIG. 27a, the region is subdivided into three equal subregions. Corresponding to each subregion is a confidence cut-off value, forming a step function. In general, confidence cut-off values decrease (i.e. become more stringent) as width values increase.

Referring now to FIG. 27b, a second method of assigning confidence cut-off values uses, rather than a step function, a straight line formed by setting a low confidence cut-off value for the wide-single landmark value and a high confidence cut-off value for the narrow-join landmark value. In one embodiment, as in FIG. 27b, the cut-off value associated with the wide-single landmark value is 2 and the cut-off value associated with the narrow-join landmark value is 30.

After the confidence cut-off value associated with the width of the unknown character is determined, a decision is made as to whether or not the unknown character is a join. If the confidence value of the first member of the possibility set is less than the confidence cut-off value, it is decided that the unknown character is a join and the join-status flag is set to 'YES'. Otherwise, it is decided that the unknown character is not a join and the join-status flag is set to 'NO'.

The specific embodiments of this invention described in this specification are intended to serve by way of example and are not a limitation on the scope of my invention. Numerous other embodiments of this invention will become apparent to those of ordinary skill in the art in light of the teachings of this specification.

I claim:

1. A method using a computer for obtaining classification information useful in classifying an unknown pattern as belonging to an associated pattern class comprising the steps of:

predefining a plurality of pattern classes;

providing to said computer a set of input data associated with a set of reference patterns, each reference pattern belonging to one of said predefined pattern classes;

causing said computer to manipulate said input data to obtain a collection of reference features vectors, each reference feature vector representing one of said reference patterns;

associating with each class in said plurality of predefined classes all reference feature vectors representing reference patterns which belong to that class;

for each selected class in said plurality of predefined classes, forming an associated set of certainty regions, wherein:

the number of certainty regions in said associated set is significantly less than the number of reference feature vectors belonging to said selected class:

each certainty region of said associated set contains a plurality of reference feature vectors belonging to said selected class and does not contain reference feature vectors which do not belong to said selected class: and substantially all reference feature vectors belonging to said selected class are contained in at least one certainty region of said associated set of certainty regions, and wherein said steps of forming an associated set of certainty regions comprises the steps of:

(a) determining approximately the largest region which can be formed to contain one or more of said reference feature vectors of said selected class and not contain reference feature vectors which are not of said selected class;

(b) determining approximately the largest region which can be formed to contain one or more of said reference feature vectors of said selected class which are not contained in a previously formed region and not contain reference feature vectors which are not of said selected class; and (c) repeating step (b) until substantially all of said reference vectors of said selected class are contained in one or more of said regions; and storing for each predefined pattern class of said plurality of pattern classes a set of classification information representing said set of certainty regions formed for said class.

2. The method of claim 1 wherein said set of forming an associated set of certainty regions further comprises the step of selecting, for each class, a number of reference feature vectors belonging to said selected class such that each reference feature vector of said number of reference feature vectors forms the center of one certainty region of the set of certainty regions associated with said selected class.

3. The method of claim 1 wherein for each class, each certainty region in its associated set of certainty regions has an associated confidence region which is formed by enlarging said certainty region.

4. The method of claim 3 wherein each said certainty region is enlarged by the same factor to create its associated confidence region.

5. The method of claim 3 wherein each said certainty region is enlarged by one of a selected set of factors to create its associated confidence region.

6. The method of claim 3 wherein a confidence region contains at most relatively few reference feature vectors not of said associated class.

7. The method of claim 6 wherein said relatively few reference feature vectors not of said associated class represent patterns similar to those of said associated class.

8. The method of claim 2 wherein said number of said reference feature vectors is selected to be approximately equal to the minimum number required to create said certainty regions.

9. The method as in claim 2 wherein said regions are selected from the group consisting of N-dimensional polygons and N-dimensional ellipses, where N is any integer.

10. The method as in claim 9 wherein N is defined as the number of features contained in each said reference feature vector.

11. The method of claim 2 wherein a region is determined to be largest when it contains the largest number of said reference feature vectors of said selected class.

12. The method of claim 2 wherein a region is determined to be largest when it encloses the largest N dimensional volume, where N is defined as the number of features contained in each said reference feature vector.

13. The method as in claim 2 wherein said steps of determining approximately the largest region comprise the steps of:

(a) determining the reference feature vector of said selected class which is not yet contained in a previously formed region which has approximately the largest distance from its nearest reference feature vector not of said selected class;

(b) using said reference feature vector of step (a) as a center; and (c) forming the substantially largest possible region around said center which does not contain reference feature vectors which are not of said selected class.

14. The method as in claim 13 which further comprises the steps of:

(a) determining the center of mass of the reference feature vectors of said selected class which are contained in said region;

(b) determining the reference feature vector of said selected class which is contained in said region and which is closest to said center of mass;

(c) using said reference feature vector which is closest to said center of mass as a center of region;

(d) forming the substantially largest possible region around said center of region which does not contain reference feature vectors which are not of said selected class;

(e) repeating steps (a), (b), (c) and (d) until either a predefined number of iterations is performed or said center of region is equal to said center of mass; and (f) selecting as said region, the region formed by step (d) which is either the last such region formed by step (d) or the largest of such regions formed by step (d).

15. The method of claim 14 wherein said center of mass is determined using said reference feature vectors of said selected class which are contained in said region and which are not contained in a previously formed region.

16. The method of claim 14 wherein said center of mass is determined using said reference feature vectors of said selected class which are contained in said region and including those reference feature vectors contained in said region which are also contained in a previously formed region.

17. The method as in claim 2 wherein said reference feature vectors include a plurality of reject feature vectors, each reject feature vector representing a pattern which does not belong to any of said predefined classes.

18. The method as in claim 2 wherein said predefined classes are characters.

19. The method as in claim 18 wherein said reject feature vectors include feature vectors representing improperly segmented characters.

20. The method as in claim 18 wherein said reject feature vectors include feature vectors representing the most common pairs of characters.

21. The method as in claim 18 wherein said reject feature vectors include feature vectors representing noise patterns.

* * * * *